US012729978B2

(12) United States Patent
Orendovici et al.

(10) Patent No.: US 12,729,978 B2
(45) Date of Patent: Sep. 8, 2026

(54) MAP UPDATES

(71) Applicant: NVIDIA Corporation, Santa Clara, CA (US)

(72) Inventors: Razvan Orendovici, Munich (DE); Vladimir Shestak, Boulder, CO (US); James Denney, Olalla, WA (US); Galen Collins, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

(21) Appl. No.: 18/538,558

(22) Filed: Dec. 13, 2023

(65) Prior Publication Data

US 2025/0198797 A1 Jun. 19, 2025

(51) Int. Cl.
*G01C 21/00* (2006.01)

(52) U.S. Cl.
CPC ....... *G01C 21/387* (2020.08); *G01C 21/3841* (2020.08)

(58) Field of Classification Search
CPC .......................... G01C 21/387; G01C 21/3841
See application file for complete search history.

(56) References Cited

U.S. PATENT DOCUMENTS 10,531,004 B2 1/2020 Wheeler et al.
10,962,366 B2 3/2021 Zhang et al.
11,512,964 B2 11/2022 Chen
11,566,903 B2 1/2023 Colgate et al.
11,594,014 B2 2/2023 Zeng et al.
11,698,272 B2 7/2023 Kroepfl et al.
11,775,570 B2 10/2023 Wheeler
11,867,515 B2 1/2024 Zeng et al.
2018/0188037 A1* 7/2018 Wheeler et al. .. B60W 30/0956
2020/0393265 A1 12/2020 Piao et al.
2025/0198796 A1 6/2025 Orendovici et al.
2025/0198798 A1 6/2025 Orendovici et al.

OTHER PUBLICATIONS

Orendovici, Razvan; Notice of Allowance for U.S. Appl. No. 18/538,558, filed Dec. 13, 2023, mailed Apr. 27, 2026, 7 pgs.

* cited by examiner

*Primary Examiner* — Brodie J Follman
(74) *Attorney, Agent, or Firm* — IRON SUMMIT IP LLP

(57) ABSTRACT

In various examples, segmented map creation for autonomous and semi-autonomous systems and applications is described herein. For instance, systems and methods described herein may segment a map into various portions, where the systems and methods then update the map based at least on the segmentation. For instance, based at least on receiving instances of data from machines navigating with an environment associated with the HD map, the instances of data may be associated with various portions of the map. Additionally, metrics associated with the portions of the map may be updated, such as by indicating the numbers of instances of data that are associated with the portions of the map. As such, when a metric associated with a portion of a map is satisfied, such as by reaching a threshold, the portion of the map may be updated without updating one or more other portions of the map.

20 Claims, 31 Drawing Sheets

MAP 302

| | | | | | | | |
|---|---|---|---|---|---|---|---|
| 304(1) | 304(2) | 304(3) | 304(4) | 304(5) | 304(6) | 304(7) | 304(8) |
| 304(9) | 304(10) | 304(11) | 304(12) | 304(13) | 304(14) | 304(15) | 304(16) |
| 304(17) | 304(18) | 304(19) | 304(20) | 304(21) | 304(22) | 304(23) | 304(24) |
| 304(25) | 304(26) | 304(27) | 304(28) | 304(29) | 304(30) | 304(31) | 304(32) |
| 304(33) | 304(34) | 304(35) | 304(36) | 304(37) | 304(38) | 304(39) | 304(40) |
| 304(41) | 304(42) | 304(43) | 304(44) | 304(45) | 304(46) | 304(47) | 304(48) |
| 304(49) | 304(50) | 304(51) | 304(52) | 304(53) | 304(54) | 304(55) | 304(56) |
| 304(57) | 304(58) | 304(59) | 304(60) | 304(61) | 304(62) | 304(63) | 304(64) |

MAP 302

| | | | | | | | |
|---|---|---|---|---|---|---|---|
| | 304(2) | 304(3) | 304(4) | 304(5) | 304(6) | 304(7) | 304(8) |
| | 304(10) | 304(11) | 304(12) | 304(13) | 304(14) | 304(15) | 304(16) |
| | 304(18) | 304(19) | 304(20) | 304(21) | 304(22) | 304(23) | 304(24) |
| | 304(26) | 304(27) | 304(28) | 304(29) | 304(30) | 304(31) | 304(32) |
| | 304(34) | 304(35) | 304(36) | 304(37) | 304(38) | 304(39) | 304(40) |
| | 304(42) | 304(43) | 304(44) | 304(45) | 304(46) | 304(47) | 304(48) |
| 304(49) | 304(50) | 304(51) | 304(52) | 304(53) | 304(54) | 304(55) | 304(56) |
| 304(57) | 304(58) | 304(59) | 304(60) | 304(61) | 304(62) | 304(63) | 304(64) |

ASSOCIATION 402(6)
ASSOCIATION 402(5)
ASSOCIATION 402(4)
ASSOCIATION 402(3)
ASSOCIATION 402(2)
ASSOCIATION 402(1)
DRIVE 206(1)

700

1300

RECEIVE, USING A SYSTEM THAT IS ASSOCIATED WITH A FIRST AREA OF AN ENVIRONMENT THAT IS DIFFERENT THAN A SECOND AREA OF THE ENVIRONMENT, ONE OR MORE INSTANCES OF DATA GENERATED USING ONE OR MORE MACHINES NAVIGATING WITHIN THE FIRST AREA OF THE ENVIRONMENT
B1302

DETERMINE, USING THE SYSTEM AND BASED AT LEAST ON THE ONE OR MORE INSTANCES OF DATA, TO PERFORM AN UPDATE TO AT LEAST A PORTION OF A MAP CORRESPONDING TO THE FIRST AREA OF THE ENVIRONMENT
B1304

CAUSE, USING THE SYSTEM AND BASED AT LEAST ON THE ONE OR MORE INSTANCES OF DATA, THE UPDATE TO THE AT LEAST THE PORTION OF THE MAP
B1306

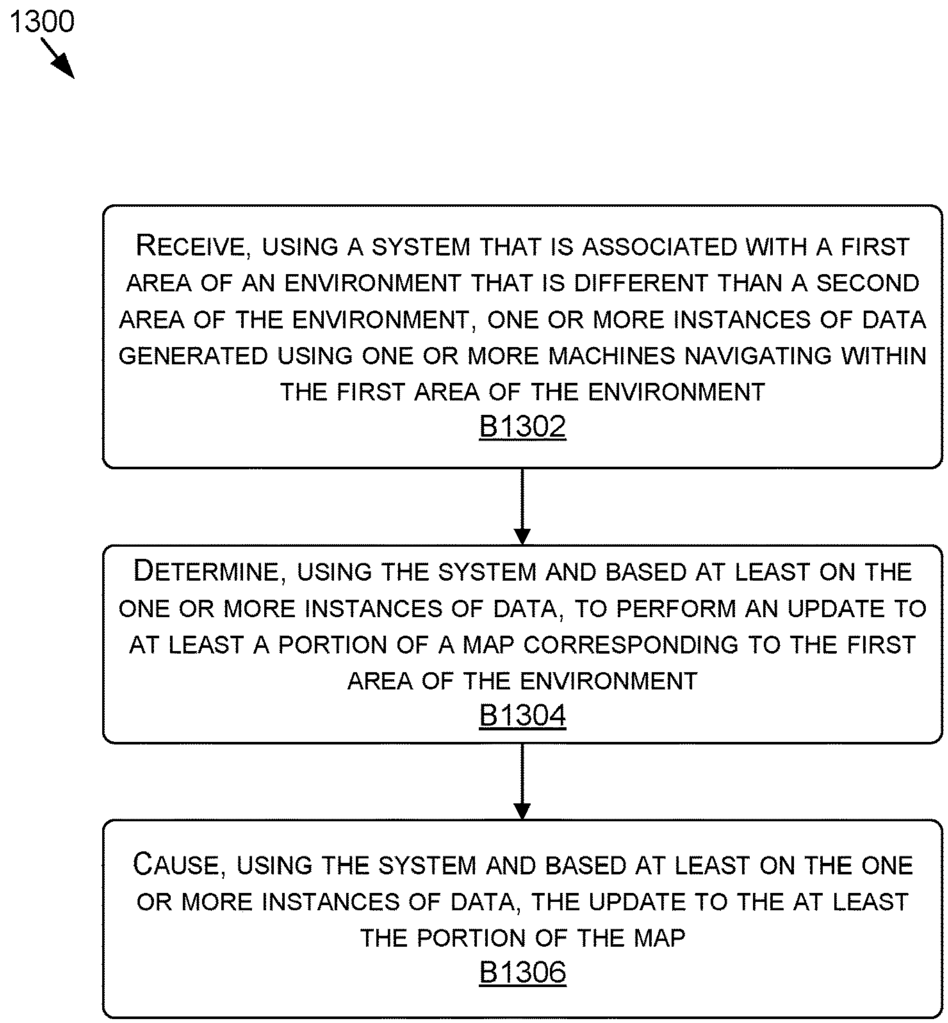

FIGURE 13

MAP 302

304(1) 304(2) 304(3) 304(4) 304(5) 304(6) 304(7) 304(8)

304(9) 304(16)

304(17) 304(24)

304(25) 304(32)

304(33) 304(40)

304(41) 304(48)

304(49) 304(56)

304(57) 304(58) 304(59) 304(60) 304(61) 304(62) 304(63) 304(64)

PORTION 1602

PORTION 1604

PORTION 1606

| | 1702(1) | 1702(2) | 1702(3) | 1702(4) | 1702(5) | 1702(6) | 1702(7) | 1702(8) | 1702(9) | 1702(10) | 1702(11) | 1702(12) | 1702(13) | 1702(14) | 1702(15) | 1702(16) | 1702(17) | 1702(18) | 1702(19) | 1702(20) | 1702(21) | 1702(22) | 1702(23) | 1702(24) |
|---|---|---|---|---|---|---|---|---|---|---|---|---|---|---|---|---|---|---|---|---|---|---|---|---|
| T(1) | | | | | A | A | A | A | | | | | | | | | B | B | B | B | | | | |
| T(2) | | | RA | RA | RA | RA | RA | RA | RA | RA | | | | | RB | RB | RB | RB | RB | RB | RB | RB | | |
| T(3) | | LA | LA | LA | LA | LA | LA | LA | LA | LA | LA | | | LB | LB | LB | LB | LB | LB | LB | LB | LB | LB | |
| T(4) | | | | | | | | | C | C | C | C | | | | | | | | | D | D | D | D |
| T(5) | | | | | | | RC | RC | RC | RC | RC | RC | RC | RC | | | | | RD | RD | RD | RD | RD | RD |
| T(6) | | | | | | LC | LC | LC | LC | LC | LC | LC | LC | LC | LC | | | LD | LD | LD | LD | LD | LD | LD |
| T(7) | E | E | E | E | | | | | | | | | F | F | F | F | | | | | | | | |
| T(8) | RE | RE | RE | RE | RE | RE | | | | | RF | RF | RF | RF | RF | RF | RF | RF | | | | | | |
| T(9) | LE | LE | LE | LE | LE | LE | LE | | | LF | LF | LF | LF | LF | LF | LF | LF | LF | LF | | | | | |

FIGURE 17A

| | 1702(1) | 1702(2) | 1702(3) | 1702(4) | 1702(5) | 1702(6) | 1702(7) | 1702(8) | 1702(9) | 1702(10) | 1702(11) | 1702(12) | 1702(13) | 1702(14) | 1702(15) | 1702(16) | 1702(17) | 1702(18) | 1702(19) | 1702(20) | 1702(21) | 1702(22) | 1702(23) | 1702(24) |
|---|---|---|---|---|---|---|---|---|---|---|---|---|---|---|---|---|---|---|---|---|---|---|---|---|
| T(1) | | | | | A | A | A | A | | | | | B | B | B | B | | | | | C | C | C | C |
| T(2) | | | RA | RA | RA | RA | RA | RA | RA | RA | RB | RB | RB | RB | RB | RB | RB | RB | RC | RC | RC | RC | RC | RC |
| T(3) | | | LCA | LCA | LCA | LCA | LCA | LCA | LCA | LCA | LCB | LCB | LCB | LCB | LCB | LCA | LCB | LCB | LCC | LCC | LCC | LCC | LCC | LCC |
| T(4) | | LMA | LMA | LMA | LMA | LMA | LMA | LMA | LMA | LMA | LMA | | | | | | | | | | | | | |
| T(5) | | | | | | | | | | LMB | LMB | LMB | LMB | LMB | LMB | LMB | LMB | LMB | LMB | | | | | |
| T(6) | | | | | | | | | | | | | | | | | | LMC | LMC | LMC | LMC | LMC | LMC | LMC |
| T(7) | D | D | D | D | | | | | E | E | E | E | | | | | F | F | F | F | | | | |
| T(8) | RD | RD | RD | RD | RD | RD | RE | RE | RE | RE | RE | RE | RE | RE | RF | RF | RF | RF | RF | RF | RF | RF | | |
| T(9) | LCD | LCD | LCD | LCD | LCD | LCD | LCE | LCE | LCE | LCE | LCE | LCE | LCE | LCD | LCF | LCF | LCF | LCF | LCF | LCF | LCF | LCF | | |
| T(10) | LMD | LMD | LMD | LMD | LMD | LMD | LMD | | | | | | | | | | | | | | | | | |
| T(11) | | | | | | LME | LME | LME | LME | LME | LME | LME | LME | LME | LME | | | | | | | | | |
| T(12) | | | | | | | | | | | | | | LMF | LMF | LMF | LMF | LMF | LMF | LMF | LMF | LMF | LMF | |

FIGURE 17B

MAP
1808

1806(2)
1806(3)
1806(5)
1806(7)
1806(9)
1806(10)
1806(11)
1806(13)
1806(14)
1806(15)
1806(16)
1806(17)
1806(18)
1806(20)
1806(21)
1806(23)
1806(24)
1806(25)
1806(26)
1806(27)
1806(28)
1806(29)
1806(30)
1806(31)
1806(32)
1806(33)
1806(34)
1806(35)
1806(36)

Map
1808

1806(2)
1806(4)
1806(7)
1806(9)
1806(10)
1806(11)
1806(14)
1806(16)
1806(18)
1806(19)
1806(20)
1806(21)
1806(22)
1806(23)
1806(24)
1806(26)
1806(28)
1806(30)
1806(31)
1806(32)
1806(33)
1806(34)
1806(35)
1806(36)

CAUSE, DURING A FIRST TIME INTERVAL, AT LEAST A FIRST PORTION AND A SECOND PORTION OF A MAP TO BE UPDATED
B2002

CAUSE, DURING A SECOND TIME INTERVAL, FIRST DATA ASSOCIATED WITH THE FIRST PORTION TO BE UPDATED TO INDICATE THAT THE FIRST PORTION AS UPDATED IS COMPATIBLE WITH THE SECOND PORTION
B2004

CAUSE, DURING A THIRD TIME INTERVAL, SECOND DATA ASSOCIATED WITH THE SECOND PORTION TO BE UPDATED TO INDICATE THAT THE SECOND PORTION AS UPDATED IS COMPATIBLE WITH THE FIRST PORTION
B2006

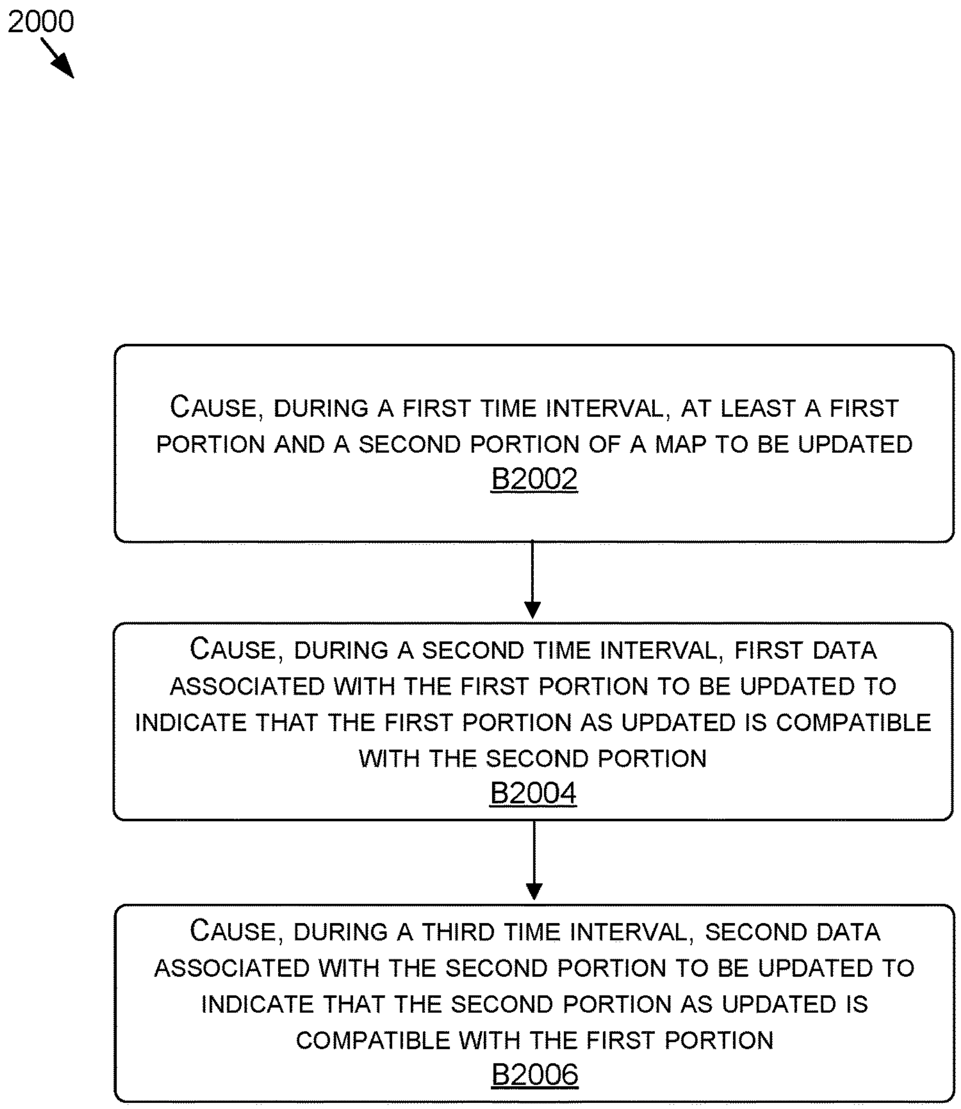

FIGURE 20

SERVER(S) 2178

CPU 2180(A)
CPU 2180(B)
PCIE SWITCH 2182(A)
PCIE SWITCH 2182(B)
PCIE SWITCH 2182(C)
PCIE SWITCH 2182(D)
2186
GPU 2184(A)
GPU 2184(B)
GPU 2184(C)
GPU 2184(D)
GPU 2184(E)
GPU 2184(F)
GPU 2184(G)
GPU 2184(H)
2188
NETWORK(S) 2190
2192
2194
2100

MAP UPDATES

BACKGROUND

For an autonomous or semi-autonomous vehicle to safely navigate through an environment, the vehicle may rely on maps—such as navigational, standard definition (SD), and/or high-definition (HD) maps—corresponding to an environment in which the vehicle intends to operate. Due to the detailed, three-dimensional, high precision nature of an HD map, navigating according to the HD map has proven effective for safe navigation of environments where HD map information is available. However, in some circumstances, an environment associated with a HD map may change, such as by changing locations of roads, lanes, traffic signals, traffic signs, parking spots, construction, static barriers or objects, and/or any other features associated with the environment. In such circumstances, it may be important for the HD map to be updated in order to reflect the changes to the environment.

However, conventional systems that generate such HD maps may only update the HD maps at an expiration of given time intervals, such as every six months or once a year. As such, during the given time intervals, the HD maps may not correctly represent environments that have been updated. Additionally, conventional systems that generate such HD maps update an entirety of the maps (e.g., perform batch rebuilds) using large amounts of data. For example, the conventional systems may perform the batch rebuilds using sensor data generated using data collection vehicles that have traveled upwards of millions of miles within the environments. As such, updating the HD maps using such a process may require large amounts of time, such as days, weeks, and/or months, as well as extensive compute resources. Based on these drawbacks, the HD maps generated and/or provided by these conventional systems may be outdated, which may cause these HD maps to be less reliable for performing various operations using vehicles that rely on the HD maps.

Additionally, these conventional systems may be configured to centrally receive and/or store all of the data that is then used to generate the HD maps. For instance, if a conventional system is located within a specific location, such as Washington State, the conventional system may still receive and/or store sensor data generated by vehicles located in other locations, such as New York, Florida, and/or even Europe. This way, the conventional system is able to generate an HD map that covers each of the locations. However, sending such large amounts of data over long distances to a central system may require a large amount of network resources, such as network bandwidth. Additionally, storing and/or processing such large amounts of data at the central system may require a large amount of computing resources be available at a single location, such as processing resources and/or storage resources.

SUMMARY

Embodiments of the present disclosure relate to segmented map creation for autonomous and semi-autonomous systems and applications. For instance, systems and methods described herein may segment a map (e.g., a navigational map, a SD map, a HD map, etc.) into various portions (e.g., cells, regions, area, tiles, etc.), where the systems and methods then update the map based at least on the segmentation. For instance, based at least on receiving instances of data (e.g., mapstreams, such as sensor data, processed data, etc.) from machines navigating with an environment associated with the map, the instances of data may be associated with various portions of the map. Additionally, metrics associated with the portions of the map may be updated, such as by indicating the numbers of instances of data (e.g., the number of drives) that are associated with the portions of the map. As such, when a metric associated with a portion of the map is satisfied, such as by reaching a threshold, the portion of the map may be updated without updating one or more other portions of the map. This way, the map may be continuously updated, in segments, when there is sufficient data to perform the updates to the portion of the map.

In contrast to conventional systems, the current systems, in some embodiments, are able to update a map using smaller time periods between updates by updating the map when one or more updating criteria are met. As such, if a portion of an environment is updated, such as by changing locations of roads, lanes, and/or traffic objects, the portion of the map that corresponds to the portion of the environment may update more quickly as compared to the conventional systems. For instance, rather than waiting for a time interval to elapse (e.g., 6 months, one year, etc.) before updating the entire map, as performed by the conventional systems, the current systems may update the map as soon as there is a sufficient amount of data for the update. Additionally, in contrast to the conventional systems, the current systems, in some embodiments, perform segmented updates to the map at the edge—e.g., using discrete compute nodes for individual discretized cells or areas of the environment that may be as small as cells of a cellular network (as a non-limiting example). As such, these edge compute nodes may manage only a small cell or area (e.g., an area that is $1/10^{th}$ of a city or municipality), thereby reducing the processing requirement for each individual node and decreasing the latency in the update process due to the proximity of the compute nodes to the mapped region. In other words, performing the segmented updates may also decrease the amount of time it takes to perform updates to the map and/or may decrease the amount of computing resources and time required to perform individual updates.

Additional embodiments of the present disclosure relate to segmented data storage and processing for autonomous and semi-autonomous systems and applications. For instance, systems and methods are described herein that segment an environment into various areas, where respective systems that are located and/or deployed within the individual areas are then used to store and/or process data that is generated within the individual areas. For example, and for an area of the environment, one or more systems that are located within the area may receive instances of data that are generated using one or more machines navigating within the area. The system(s) may then be configured to process the instances of data, such as by updating a map associated with the area using the instances of data. Additionally, in order to synchronize data processing between the systems, the systems may be configured to communicate with one another to at least replicate a portion of the data processing that is performed by the respective systems.

In contrast to conventional systems, such as those described above, the current systems, in some embodiments, are configured to store and process data—that is generated using machines navigating within an environment—at a location (e.g., local or edge compute node) that is closer to the physical location corresponding to the data. As described herein, the current systems are able to perform such processes by segmenting the environment into various areas and then using more closely located systems—rather than one centrally located data center for all regions—within the areas to perform the data storage and/or processing. As such, the current systems may save on computing resources, such as processing resources, memory resources, and/or network resources (e.g., bandwidth) as compared to the conventional systems that perform all of the data storage and processing at a central location. Additionally, in contrast to the conventional systems, the current systems, in some embodiments, may reduce the latency associated with updating a map by performing the updates locally where less data needs to be communicated and/or processed to perform the updates. In some embodiments, the compute nodes may be distributed at a granularity similar to that of a cell towers of a cellular network—such that each compute node manages the updates for a cell or region of similar or comparable size to a cell of a cellular network.

Further embodiments of the present disclosure relate to multiple stage map creations for autonomous and semi-autonomous systems and applications. For instance, systems and methods are described herein that update portions of a map in multiple stages in order to ensure that updates between different portions of the map are synchronized with respect to one another and/or ensure that updates to portions of the map are compatible with portions of the map that are not updated. For instance, a determination may be made to update a portion of a map, such as by using one or more of the processes described herein. The portion the map, along with one or more neighboring portions of the map, may then be updated in order to synchronize the updates to the portion of the map with the current layout of the neighboring portion(s) (e.g., connecting roads between the portions of the map). Additionally, data, such as data representing one or more compatibility matrices, may be updated to indicate that one or more additional portions of the map that were not updated are still compatible with the updated portion(s) of the map. In some examples, the systems and methods may use multiple states for the portion(s) when performing the updates, such as a first state (e.g., a locked state) when updating the portion(s) and a second state (e.g., an unlocked state, which may include a normal state) when not performing an update on the portion(s). While the examples herein describe the unlocked portions as being in a "second state," in other examples, the portions may just be unlocked when no updates are being performed to the portions (e.g., there may not be a state)

As described above, in contrast to the conventional systems, the current systems, in some embodiments, are able to update a map in portions rather than performing a complete rebuild of the map, which provides the improvements described herein. Additionally, in order to ensure that the updates to various portions are synchronized and/or compatible with other portions of the map that are not updated, the current systems may perform the updates using multiple stages and/or using multiple state changes.

BRIEF DESCRIPTION OF THE DRAWINGS

The present systems and methods for map creation and updating for autonomous and semi-autonomous systems and applications are described in detail below with reference to the attached drawing figures, wherein:

FIG. 13 illustrates a flow diagram showing a method for updating a portion of a map using a local system(s) associated with an area of an environment, in accordance with some embodiments of the present disclosure;

FIG. 17A illustrates an example of updating a portion of a map using a single stage of locking, in accordance with some embodiments of the present disclosure;

FIG. 17B illustrates an example of updating a portion of a map using multiple stages of locking, in accordance with some embodiments of the present disclosure;

FIG. 20 illustrates a flow diagram showing a method for updating portions of a map using multiple stages of locking, in accordance with some embodiments of the present disclosure;

DETAILED DESCRIPTION

Figure 1:
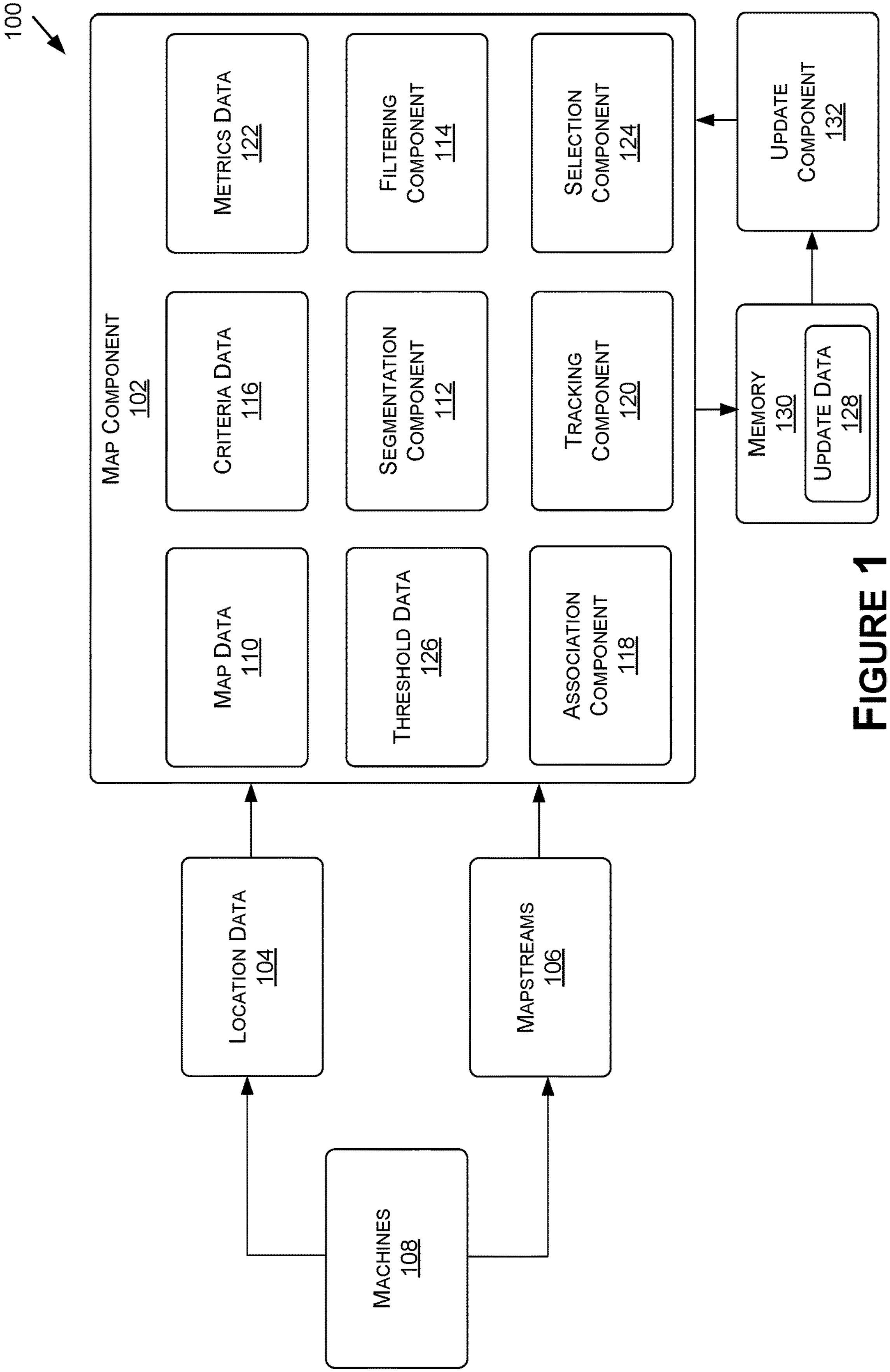
FIG. 1 illustrates an example data flow diagram for a process of causing a map corresponding to an environment to be updated, in accordance with some embodiments of the present disclosure.

Systems and methods are disclosed related to map creation and updating for autonomous and semi-autonomous systems and applications. Although the present disclosure may be described with respect to an example autonomous or semi-autonomous vehicle or machine 2100 (alternatively referred to herein as "vehicle 2100," "ego-vehicle 2100," "machine 2100," or "ego-machine 2100," this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to map creation and updating for vehicle or machine applications, this is not intended to be limiting, and the systems and methods described herein may be used in augmented reality, virtual reality, mixed reality, robotics, security and surveillance, autonomous or semi-autonomous machine applications, and/or any other technology spaces where object detection and/or map creation may be used.

For instance, a system(s) may receive location data from machines navigating within an environment. As described herein, the location data may include, but is not limited to, Global Positioning System (GPS) Data, Global Navigation Satellite System (GNSS) data, pose data (e.g., representing locations and/or orientations of the machines), coordinates data, trajectory data (e.g., indicating the trajectories of the machines), and/or any other type of data that may be used to determine locations and/or orientations of the machines within the environment. Additionally, the system(s) may receive instances of data (e.g., referred to, in some examples, as "mapstreams") generated using the machines while navigating within the environment. As described herein, a mapstream may include, but is not limited to, a stream of sensor data (e.g., image data, LiDAR data, RADAR data, etc.), perception outputs from one or more neural networks, and/or any other data generated by a machine and during a drive. For example, a mapstream may indicate at least one or more locations and/or orientations of one or more objects detected using a machine when navigating within the environment. As described herein, an object may include, but is not limited to, a road, a lane line, a traffic sign, a traffic light, a wait condition, a parking location, a surface (e.g., a building surface), and/or any other type of object that may be located within the environment.

As described herein, the system(s) may use the mapstreams to cause a map associated with the environment to be updated. To cause the map to be updated, the system(s) may initially segment the map into different portions (e.g., cells, regions, tiles, etc.). In some examples, each of the portions may represent a similar sized area of the environment, such as a 600 meter by 600 meter area (and/or any other sized area) of the environment. In some examples, one or more of the portions may represent a different sized area of the environment as compared to one or more other portions of the environment. For example, a first portion may represent a 600 meter by 600 meter area of the environment while a second portion may represent a 700 meter by 700 meter area of the environment. In some examples, the map is segmented using a pattern, such as a grid patter (and/or any other type of pattern). As described in more detail herein, by segmented the map into portions, the system(s) may thus update various portions of the map at various instances in time rather than performing a complete update (e.g., a complete rebuild) of the map at a single instance of time.

For instance, the system(s) may use the location data to associate the mapstreams with one or more portions of the map. For a first example, if the location data indicates that a machine was navigating in an area of the environment that corresponds to a portion of the map when generating a mapstream, then the system(s) may associate the mapstream with the portion of the map. For a second example, if the location data indicates that a machine was navigating in an area of the environment that corresponds to two portions of the map when generating a mapstream, then the system(s) may associate at least a first portion of the mapstream with a first portion of the map and at least a second portion of the mapstream with a second portion of the map. In any example, associating a mapstream with a portion of the map may include at least generating and/or storing data representing an indication that the mapstream is associated with the portion of the map.

While performing the associations, the system(s) may also use a tracker to track one or more metrics that are associated with the various portions of the map. As described herein, a metric associated with a portion of the map may include, but is not limited to, a number of drives (e.g., a number of mapstreams) associated with the portion, a distance traveled within the portion, a density of the drives within the portion, a time period since a last update associated with the portion, and/or any other metric that measures how well the data represents the area of the environment that corresponds to the portion of the map. The system(s) may then use the metric(s) to identify portions of the map that are ready to be updated. For instance, the system(s) may determine that a portion of the map is ready to be updated based at least on a metric value associated with the portion of the map satisfying a threshold. For a first example, if a metric is associated with a number of drives, then the system(s) may determine that the portion of the map is ready to be updated based at least on the number of drives being equal to or greater than a threshold number of drives (e.g., 1 drive, 10 drives, 100 drives, 1,000 drives, 10,000 drives, etc.). For a second example, if a metric is associated with a distance traveled, then the system(s) may determine that the portion of the map is ready to be updated based at least on the distance being equal to or greater than a threshold distance (e.g., 100 miles, 1,000 miles, 100,000 miles, 1,000,000 miles, etc.).

Based at least on determining that a portion of the map is ready to be updated, the system(s) may then cause the portion of the map to be updated. In some examples, the system(s) may cause the portion of the map to be updated by storing at least a portion of the mapstreams associated with the portion of the map in one or more memories (e.g., a queue) and/or sending the at least the portion of the mapstreams associated with the portion of the map to one or more systems that are configured to perform the update. Additionally, in some examples, the system(s) may perform one or more additional processes to ensure that an update to one portion of the map does not cause problems with one or more other portions of the map. For a first example, when causing a portion of the map to be updated, the system(s) may further cause one or more neighboring portions (e.g., neighboring portions that surround the portion) to also be updated, such as to connect roads that stretch between the portions. For a second example, and again when causing a portion of the map to be updated, the system(s) may cause the portion and/or one or more neighboring portions to be "locked" such that another system and/or component is not also able to concurrently update the portion of the map.

In some examples, the system(s) may then receive an indication that the update to the portion of the map is complete. Based at least on receiving the indication, the system(s) may perform one or more processes with respect to the mapstreams that are stored in association with the portion of the map. For example, the system(s) may remove all of the mapstreams associated with the portion of the map, remove at least a portion of the mapstreams associated with the portion of the map, and/or maintain the mapstreams associated with the portion of the map. As described in more detail herein, by removing all the mapstreams (and/or at least a portion of the mapstreams), then a next update associated with the portion of the map may use updated mapstreams that better represent the current layout of the environment. Additionally, by maintaining at least a portion of the mapstreams, then a next update associated with the portion of the map may ensure that the mapstreams represent a high density of the area of the environment that corresponds to the portion of the map. In any example, the system(s) may also cause the tracker to restart the tracking associated with the portion of the map, such as by indicating that no data is now stored in association with the portion of the map.

As described herein, by performing these processes, the system(s) is able to update a map using smaller time periods between updates by updating the map when one or more updating criteria are met. As such, if a portion of an environment is updated, such as by changing locations of roads, lanes, and/or traffic objects, the portion of the map that corresponds to the portion of the environment may update more quickly as compared to the conventional systems. For instance, rather than waiting for a time interval to elapse before updating the entire map, as performed by conventional systems described herein, the system(s) may update the map as soon as there is a sufficient amount of data for the update. Additionally, and as described herein, the system(s) is able to perform segmented updates to the map. In some examples, performing the segmented updates may also decrease the amount of time it takes to perform updates to the map and/or may decrease the amount of computing resources and time required to perform individual updates.

As further described herein, such as to save computing resources and/or reduce latencies associated with updating maps, the system(s) may segment the environment into various areas. In some examples, the system(s) may segment the environment into the areas such that the areas are associated with the portions of the map. For example, the system(s) may determine that an area of the environment corresponds to one or more portions of the map. In some examples, the system(s) may segment the environment using any other technique, such as based on sizes of the areas (e.g., maintain a threshold size for the areas, etc.), densities (e.g., machine densities, data densities, etc.) associated with the areas, locations of local systems within the environment, and/or using any other technique.

The system(s) may then associate different systems (e.g., also referred to, in some examples, as "local systems") with the areas, where the local systems are located within the areas for which the local systems are associated. For example, one or more first local systems may be physically located within a first area of the environment, one or more second local systems may be physically located within a second area of the environment, one or more third local systems may be physically located within a third area of the environment, and/or so forth. Additionally, in some examples, the system(s) may determine one or more central systems associated with the environment. For a first example, the environment may include a central system(s) that communicates with each of the local systems associated with each of the areas. For a second example, a first central system(s) may communicate with two local systems associated with two areas of the environment, a second central system(s) may communicate with two other local systems associated with two other areas of the environment, and/or so forth.

The system(s) may then use the local systems to perform local storage and/or processing associated with data generated within the various areas. For instance, and for an area, a local system(s) may receive and/or store mapstreams generated using the machines while navigating at least partially within the area. Additionally, such as when one or more machines are navigating proximate (e.g., within a threshold distance) to a border between two areas, the local system(s) may further receive one or more mapstreams generated using the machine(s). As such, instead of the machines located within the environment just sending the mapstreams to a central system(s), which may require large amounts of computing resources to perform, the machines may send the mapstreams to the local systems that are spread across the environment and within the various areas.

In some examples, the local systems may then use the mapstreams to update portions of the map that correspond to the areas for which the local systems are associated. For instance, and again for a local system(s) associated with (e.g., located within) an area, the local system(s) may perform one or more of the processes described herein to determine when to update at least a portion of the map that corresponds to the area and/or cause the at least the portion of the map to be updated. Additionally, since the local systems may update the portions of the map corresponding to the areas of the environment separately, the local systems and/or the central system(s) may perform one or more processes to synchronize the updates (e.g., replicate at least a portion of the updates between the local systems).

For a first example, after updating a portion of the map, a local system(s) may (1) send data indicating that the portion of the map has been updated, (2) send data (e.g., the mapstreams) used to update the portion of the map, and/or (3) update a log to indicate that the portion of the map has been updated. In such an example, one or more other local systems, such as a local system(s) that is associated with an additional area that is located proximate to the area that was updated, may use the data to update a corresponding map. For a second example, and as further described in more detail herein, when a local system(s) updates a portion of a map associated with an area, the local system(s) may cause one or more other local systems to refrain from updating one or more other portions of the map that are associated with one or more other areas of the environment, such as areas that share a border with and/or are proximate to the area corresponding to the portion of the map that is being updated. As described herein, the local system(s) may cause the other portion(s) of the map to be locked at least during a time interval for which the portion of the map is being updated.

In some examples, the local systems may send at least a portion of the data received from the machines to the central system(s). For example, the local systems may send at least a portion of the sensor data, at least a portion of the processed data representing the locations of objects within the environment, and/or any other data received from the machines to the central system(s) for storage. In some examples, the local systems may process at least a portion of the data in order to send processed data to the central system(s). For example, if the central system(s) is requesting a specific type of data, such as images that depict a specific type of object (e.g., traffic signs), then the local systems may process the mapstreams in order to identify portions of the mapstreams (e.g., images) that depict the specific type of object. The local systems and then send just the portions of the mapstreams to the central system(s) without sending other portions of the mapstreams. This way, the central system(s) is able to receive important data while refraining from receiving all of the data from the local systems, which may again save computing resources.

As described herein, in some examples, the central system(s) (and/or another system, such as one or more local systems) may store log data representing a log associated with processing performed by the local systems. For example, the log may indicate portions of the map that have been updated, an order associated with the updates to the portions of the map, version numbers associated with the portions of the map, portions of the map that are ready to be updated (e.g., are in queue for updates), and/or any other information associated with updating the map. As such, the local systems and/or newly generated local systems may use the log data to generate and/or update respective maps of the environment. For example, a new local system(s) may use the log data to determine an order for generating and/or updating portions of the map in order to recreate at least a portion of the map corresponding to the area for which the new local system(s) is located.

As such, the system(s) is configured to store and process data—that is generated using machines navigating within an environment—at a location (e.g., a data center) that is closer to the physical location corresponding to the data. As described herein, system(s) is able to perform such processes by segmenting the environment into various areas and then using more closely located systems (e.g., data centers) within the areas to perform the data storage and/or processing. As such, the system(s) may save on computing resources, such as processing resources, memory resources, and/or network resources (e.g., bandwidth) as compared to the conventional systems that perform all of the data storage and processing at a central location. Additionally, in contrast to the conventional systems, the system(s) may reduce the latency associated with updating a map by performing the updates locally where less data needs to be communicated and/or processed to perform the updates.

As further described herein, in some examples, a system(s) that is causing updates to occur with portions of a map and/or updating the portions of the map may perform the updating using one or more stages, such as to ensure that the updates are synchronized and/or the updated portions are still compatible with one or more other portions of the map that are not updated. For instance, the system(s) may perform one or more of the processes described herein to determine that a portion of the map is ready to be updated. In order to ensure that the updated portion is still compatible with one or more related portions, such as neighboring portions that surround the portion to be updated, the system(s) may further determine to update the related portion(s). For example, if a road stretches from the updated portion to a related portion, then the system(s) may cause the related portion to also be updated in order to ensure that a connection of the road between the portions of the map is accurate.

In some examples, the system(s) may then cause the portions of the map to switch from being associated with a first state to being associated with a second state. As described herein, in some examples, the first state for a portion of the map may include an unlocked state in which the system(s) is not able to update the portion of the map and/or other systems and/or components are able to retrieve the portion of the map for updating. Additionally, the second state for the portion of the map may include a locked state in which the system(s) is able to update the portion of the map and/or other systems and/or components are not able to retrieve the portion of the map for updating. For example, while the portions of the map are in the second state, other system(s) and/or components may not retrieve the portions of the map to also update the portions of the map. Additionally, the system(s) may cause the update to the portions of the map, such as by using one or more of the processes described herein. After updating the portions of the map, the system(s) may release the update portions and/or cause the portions of the map to switch from being associated with the second state to being associated with the first state.

In some examples, the system(s) may also determine one or more additional portions of the map for which data, such as data representing one or more compatibility matrices, also should be updated. For example, if the related portions of the map surround the portion of the map determined to be updated, then the additional portion(s) of the map may at least partially surround the related portions of the map. In some examples, before updating the data associated with the additional portion(s) of the map, the system(s) may cause the data to switch from being associated with the first state to being associated with the second state. As described herein, the system(s) may cause the data to be associated with the second state such that the system(s) is able to update the data associated with the additional portion(s) of the map and/or to ensure that the additional system(s) and/or components do not update the data associated with the additional portion(s) of the map.

The system(s) may then update the data associated with the additional portion(s) of the map. For instance, and as described herein, updating data associated with a portion of the map may include updating a compatibility matrix to indicate that the portion of the map is compatible with at least one surrounding portion of the map. For example, if the compatibility matrix is associated with an additional portion of the map that was not updated, the system(s) may still update the compatibility matrix to indicate that the additional portion of the map is still compatible with an updated, neighboring portion of the map. As described herein, such an update may be made to the data since a part of the neighboring portion of the map that borders the additional portion of the map may not have been updated such that any content that extends between the portions, such as roads, are synchronized between the portions.

In some examples, such as to reduce the overall time required to update the map, the system(s) may concurrently perform similar processes with respect to one or more additional portions of the map. For example, the system(s) may perform one or more of the processes described herein to determine to update a first portion of the map using first data (e.g., first location data, first mapstreams, etc.) generated using one or more first machines as well as update a second portion of the map using second data (e.g., second location data, second mapstreams, etc.) generated using one or more second machines. The system(s) may then determine one or more first related portions of the map that at least partially surround the first portion of the map and/or one or more first additional portions of the map that at least partially surround the first related portion(s). Additionally, the system(s) may then determine one or more second related portions of the map that at least partially surround the second portion of the map and/or one or more second additional portions of the map that at least partially surround the second related portion(s).

The system(s) may also cause the first portion of the map, the first related portion(s) of the map, the second portion of the map, and/or the second related portion(s) of the map to be updated at least partially during a first time interval. Additionally, the system(s) may cause data (e.g., data representing compatibility matrices) associated with the first portion of the map, the first related portion(s) of the map, and/or the first additional portion(s) of the map to be updated during a second time interval that is after the first time interval. Furthermore, the system(s) may cause data (e.g., data representing compatibility matrices) associated with the second portion of the map, the second related portion(s) of the map, and/or the second additional portion(s) of the map to be updated during the second time interval and/or during a third time interval that is after the second time interval. As will be described in more detail herein, by performing such processes, the system(s) may avoid deadlocks associated with updating of the map, reduce the latency associated with updating the map, and/or provide one or more additional improvements associated with updating the map.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of causing a map corresponding to an environment to be updated, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 2100 of FIGS. 21A-21D, example computing device 2200 of FIG. 22, and/or example data center 2300 of FIG. 23.

The process 100 may include a map component 102 receiving location data 104 and mapstreams 106 from machines 108 navigating within an environment. As described herein, the location data 104 may include, but is not limited to, GPS Data, GNSS data, pose data, coordinates data, trajectory data, and/or any other type of data that may be used to determine locations and/or orientations of the machines 108 within the environment. Additionally, a mapstream may include, but is not limited to, a stream of sensor data (e.g., image data, LiDAR data, RADAR data, etc.), perception outputs from one or more neural networks, and/or any other data generated by a machine 108 during a drive. For example, a mapstream 106 may indicate at least locations, orientations, dimensions, types, and/or any other information associated with objects detected using a machine 108 when navigating within the environment. As described herein, the objects may include, but are not limited to, roads, lane lines, traffic signs, traffic lights, wait conditions, parking locations, surfaces (e.g., building surfaces), and/or any other type of object that may be located within the environment. While the example of FIG. 1 illustrates the location data 104 as being separate from the mapstreams 106, in other examples, the mapstreams 106 may include the location data 104. For example, the mapstreams 106 may be used to determine the locations and/or orientations of the machines 108 when navigating within the environment.

In some examples, the machines 108 may continuously send the location data 104 and/or the mapstreams 106 to the map component 102 as the machines 108 are navigating around the environment. In some examples, the machines 108 may send the location data 104 and/or the mapstreams 106 to the map component 102 based at least on one or more occurrences of one or more events, such as time periods elapsing and/or threshold distances being traveled. For instance, a mapstream 106 may represent a given distance associated with the environment, such as 1 mile, 2 miles, 5 miles, 10 miles, and/or any other distance associated with the environment.

Figure 2:
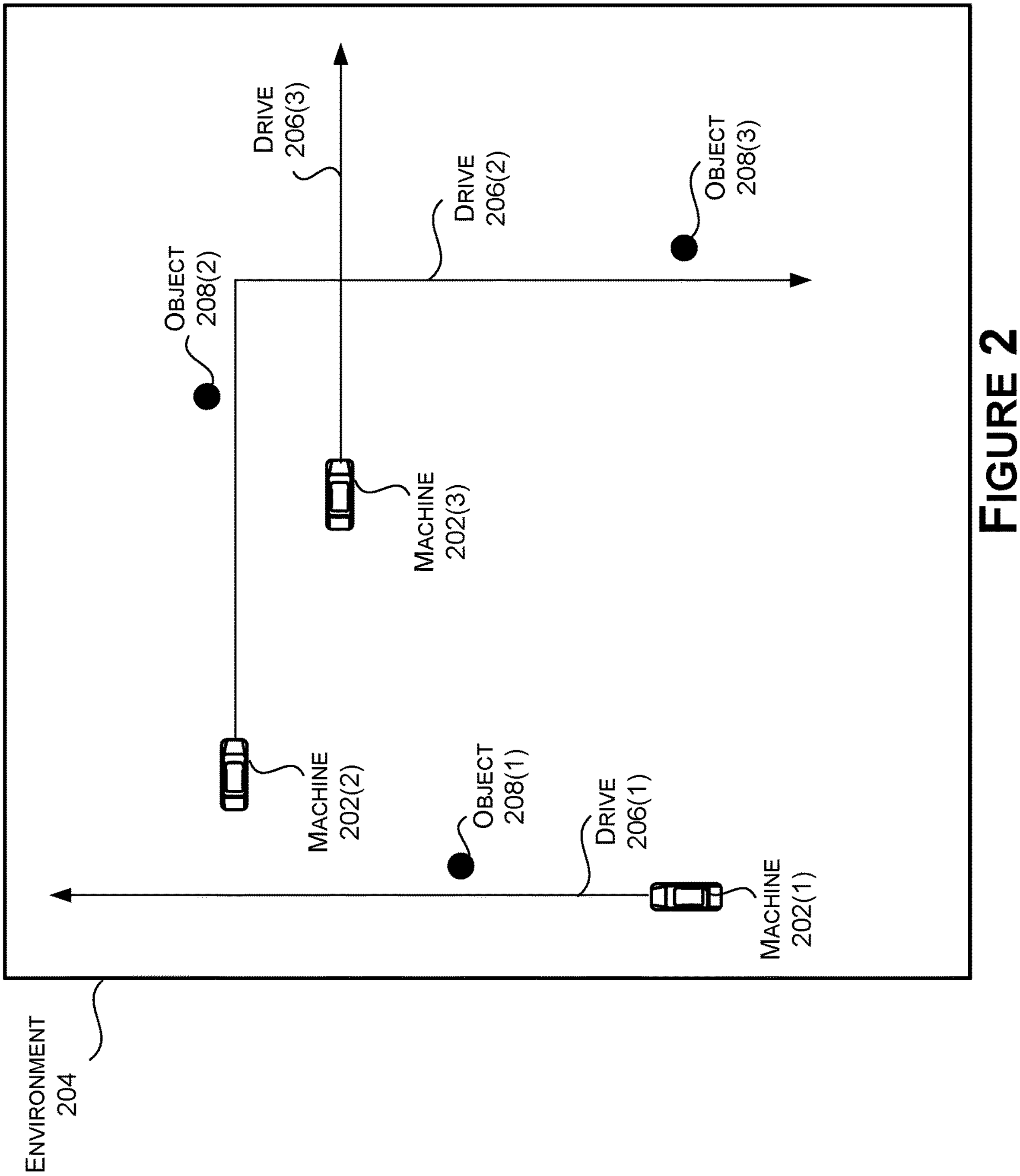
FIG. 2 illustrates an example of machines generating mapstreams while navigating within an environment, in accordance with some embodiments of the present disclosure.

For instance, FIG. 2 illustrates an example of machines 202(1)-(3) (also referred to singularly as "machine 202" or in plural as "machines 202") generating mapstreams while navigating within an environment 204, in accordance with some embodiments of the present disclosure. In the example of FIG. 2, the first machine 202(1) may perform a first drive 206(1) within the environment 204. While performing the first drive 206(1), the first machine 202(1) may generate a first mapstream (e.g., a mapstream 106) representing at least first information associated with a first object 208(1) located within the environment 204. Additionally, the second machine 202(2) may perform a second drive 206(2) within the environment 204. While performing the second drive 206(2), the second machine 202(2) may generate a second mapstream (e.g., a mapstream 106) representing at least second information associated with a second object 208(2) located within the environment 204. Furthermore, the third machine 202(3) may perform a third drive 206(3) within the environment 204. While performing the third drive 206(3), the third machine 202(3) may generate a third mapstream (e.g., a mapstream 106) representing at least third information associated with a third object 208(3) located within the environment 204.

While the example of FIG. 2 illustrates three machines 202 performing three drives 206(1)-(3) to generate three mapstreams representing the information associated with three objects 208(1)-(3), in other examples, any number of machines may perform any number of drives to generate any number of mapstreams representing information associated with any number of objects located within the environment 204. Additionally, while the example of FIG. 2 illustrates the objects 208(1)-(3) as including circular objects, such as traffic poles that include traffic signs, in other examples, the objects 208(1)-(3) may include any other type of object.

Referring back to the example of FIG. 1, the process 100 may include the map component 102 using the location data 104 and/or the mapstreams 106 to update a map associated with the environment, where the map is represented by map data 110. As described herein, the map component 102 may update one or more portions of the map at one or more time instances. For instance, the process 100 may include the map component 102 using a segmentation component 112 to segment the map into a number of portions (e.g., cells, regions, tiles, etc.). In some examples, each of the portions may represent a similar sized area of the environment, such as a 600 meter by 600 meter area (and/or any other sized area) of the environment. In some examples, one or more of the portions may represent a different sized area of the environment as compared to one or more other portions of the environment. For example, a first portion may represent a 600 meter by 600 meter area of the environment while a second portion may represent a 700 meter by 700 meter portion of the environment. In some examples, the segmentation component 112 may segment the map using a pattern, such as a grid patter (and/or any other type of pattern).

Figure 3:
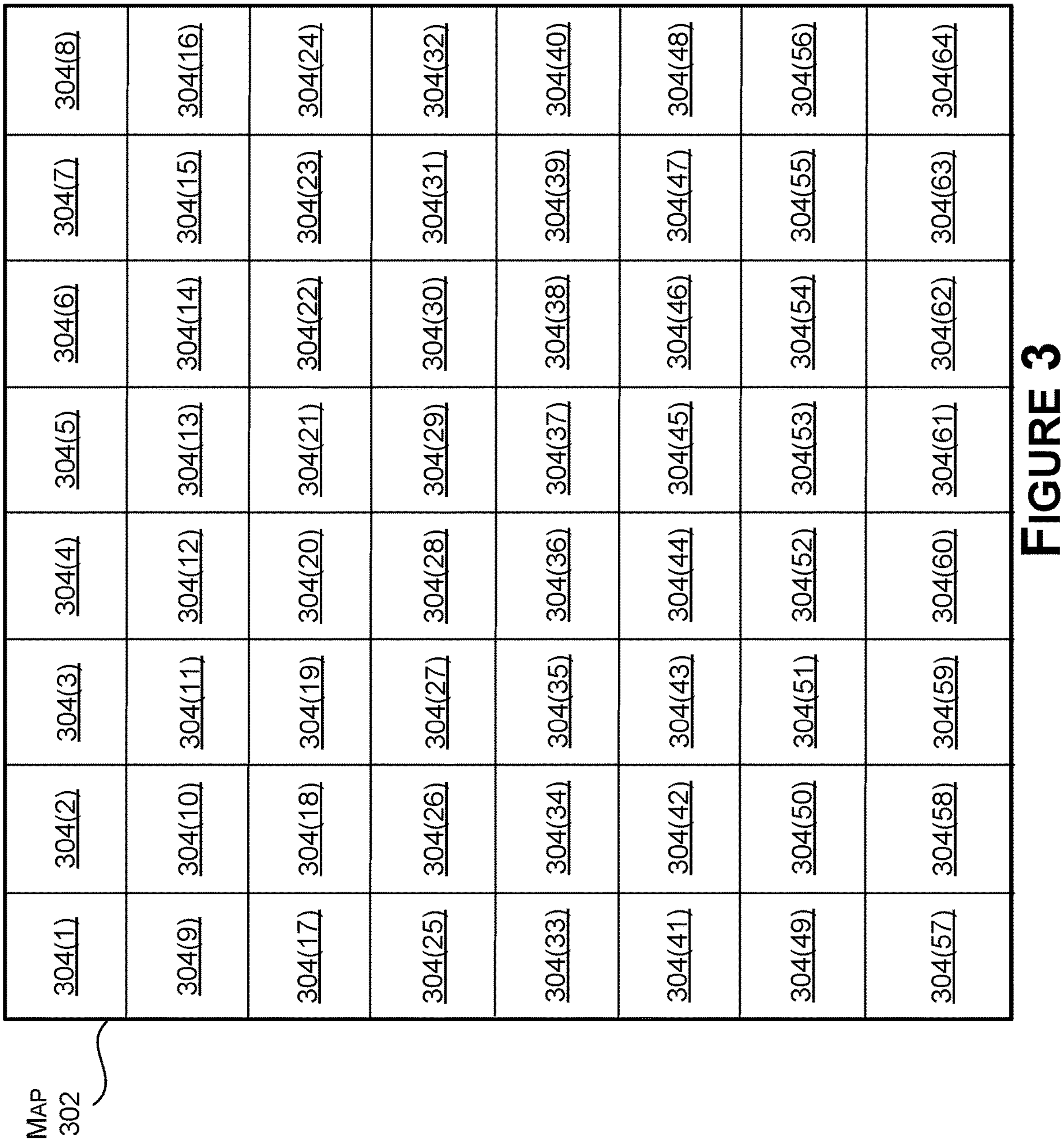
FIG. 3 illustrates an example of segmenting a map into a number of portions, in accordance with some embodiments of the present disclosure.

For instance, FIG. 3 illustrates an example of segmenting a map 302 into a number of portions 304(1)-(64) (also referred to singularly as "portion 304" or "cell 304", or in plural as "portions 304" or "cells 304"), in accordance with some embodiments of the present disclosure. As shown by the example of FIG. 3, the segmentation component 112 may segment the map 302 into sixty-four different portions 304, where each portion 304 represents a similar sized area of the environment 204. However, in other examples, the segmentation component 112 may segment the map 302 into any other number of portions (e.g., 2 portions, 100 portions, 1,000 portions, 10,000 portions, etc.). Additionally, the segmentation component 112 segments the map 302 using a specific pattern, such as a grid pattern in the example of FIG. 3. However, in other examples, the segmentation component 112 may segment the map 302 using any other type of pattern and/or technique.

While the examples described herein are directed to a "portion" of a map, when referencing a portion, the examples may be describing a single portion 304 or a group of portions 304. For a first example, examples that describe determining metrics for a portion and/or causing a portion to be updated may be referencing just a single portion 304, such as the portion 304(28) of the map 302. For a second example, examples again describing metrics for a portion and/or causing a portion to be updated may be referencing a group of portions 304, such as the portions 304(28), 304(29), 304(36), and 304(37) of the map 302. In other words, when referencing a portion of a map, the examples may be describing an area that is less than an entirety of the map.

Referring back to the example of FIG. 1, the process 100 may include the map component 102 using a filtering component 114 to filter at least a portion of the mapstreams 106 received from the machines 108. For instance, the filtering component 114 may filter the mapstreams 106 using one or more criteria, where the criteria may be represented by criteria data 116. As described herein, the criteria may include, but is not limited to, types of the machines 108 that generated the mapstreams 106, versions of software executing on the machines 108 that generated the mapstreams 106, types of the mapstream 106 (e.g., types of sensor data, types of processed data etc.), one or more details associated with the mapstreams 106 (e.g., types of objects represented by the mapstreams 106, whether new objects are represented by the mapstreams 106, etc.), ages of the mapstreams 106, and/or any other criteria. Based at least on the filtering, the filtering component 114 may identify at least a portion of the mapstreams 106 that may be used for updating the map.

The process 100 may include the map component 102 using an association component 118 to associate the mapstreams 106 (and/or the mapstreams 106 identified based at least on the filtering) with the portions of the map. In some examples, the association component 118 may use the location data 104 to associate the mapstreams 106 with the portions of the map. For a first example, if the location data 104 indicates that a machine 108 was navigating in an area of the environment that corresponds to a portion of the map when generating a mapstream 106, then the association component 118 may associate the mapstream 106 with the portion of the map. For a second example, if the location data 104 indicates that a machine 108 was navigating in an area of the environment that corresponds to two portions of the map when generating a mapstream 106, then the association component 118 may associate at least a first portion of the mapstream 106 with a first portion of the map and at least a second portion of the mapstream 106 with a second portion of the map.

Figure 4:
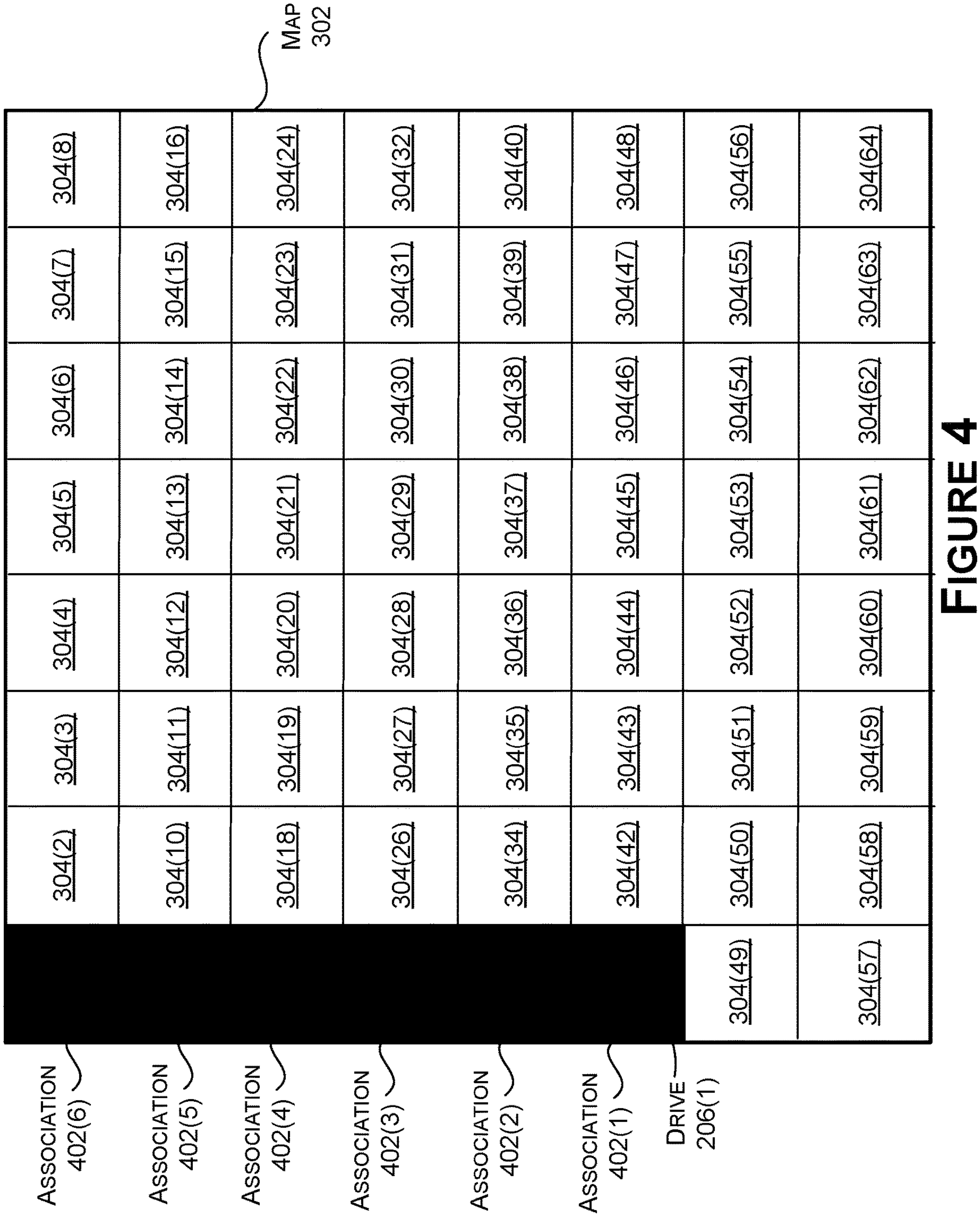
FIG. 4 illustrates an example of associating a mapstream with one or more portions of a map, in accordance with some embodiments of the present disclosure.

For instance, FIG. 4 illustrates an example of associating a mapstream with one or more of the portions 304 of the map 302, in accordance with some embodiments of the present disclosure. As shown, the association component 118 may use location data (e.g., the location data 104) associated with the first machine 202(1) to determine that, during the first drive 206(1), the first machine 202(1) was located within an area of the environment 204 that corresponds to the portion 304(41) of the map 302, the portion 304(33) of the map 302, the portion 304(25) of the map 302, the portion 304(17) of the map 302, the portion 304(9) of the map 302, and the portion 304(1) of the map 302, which is indicated by the grey shading. As such, the association component 118 may associate a first portion of the mapstream that the first machine 202(1) generated while navigating in the area of the environment 204 that corresponds to the portion 304(41) of the map 302 with the portion 304(41) of the map 302, which is indicated by association 402(1). Additionally, the association component 118 may associate a second portion of the mapstream that the first machine 202(1) generated while navigating in the area of the environment 204 that corresponds to the portion 304(33) of the map 302 with the portion 304(33) of the map 302, which is indicated by association 402(2). The association component 118 may then continue to perform these processes to further associate other portions of the mapstream with the portions 304(25), 304(17), 304(9), and 304(1) of the map 302, which are indicated by associations 402(3)-(6).

In some examples, the association component 118 may perform similar processes with the mapstream associated with the second drive 206(2), the mapstream associated with the third drive 206(3), and/or any other mapstream associated with any other drive. Additionally, in some examples, and as represented by the example of FIG. 4, the map 302 may operate similar to a heatmap where the portions 304 of the map 302 are updated as more data is associated with the portions 304 of the map 302. For instance, and as shown, the portions 304(41), 304(33), 304(25), 304(17), 304(9), and 304(1) may have been updated based on the first drive 206(1) to indicate that new data has been associated with the portions 304(41), 304(33), 304(25), 304(17), 304(9), and 304(1).

Referring back to the example of FIG. 1, in some examples, based at least on the associations, the association component 118 may store the mapstreams 106 and/or data that identifies the mapstreams 106 in association with data that identifies the portions of the map. Additionally, the association component 118 may store additional data with the mapstreams 106. For example, the association component 118 may store the location data 104 in association with the mapstreams 106, data representing timestamps of when the mapstreams 106 were generated, data identifying the machines 108 that generated the mapstreams 106, and/or any other type of data.

The process 100 may include the map component 102 using a tracking component 120 that is configured to track metrics that are associated with the portions of the map, where the metrics are represented by metrics data 122. As described herein, a metric associated with a portion of the map may include, but is not limited to, a number of drives (e.g., a number of mapstreams 106) associated with the portion, a distance traveled within the portion (e.g., a distance associated with the drives), a density of the drives within the portion (e.g., a percentage of the area of the portion that is covered by the drives), a time period since a last update associated with the portion, and/or any other metric that measures how well the data represents the area of the environment corresponding to the portion of the map. For a first example, if the association component 118 associates fifty mapstreams 106 with a portion of the map (e.g., fifty drives associated machines 108 navigating through an area of the environment that corresponds to the portion of the map), then the tracking component 120 may update a metric associated with the portion of the map to indicate fifty drives. For a second example, if the association component 118 associates fifty miles of mapstreams 106 with a portion of the map (e.g., drives associated with machines 108 navigating fifty miles through an area of the environment that corresponds to the portion of the map), then the tracking component 120 may update a metric associated with the portion of the map to indicate fifty miles.

Figure 5:
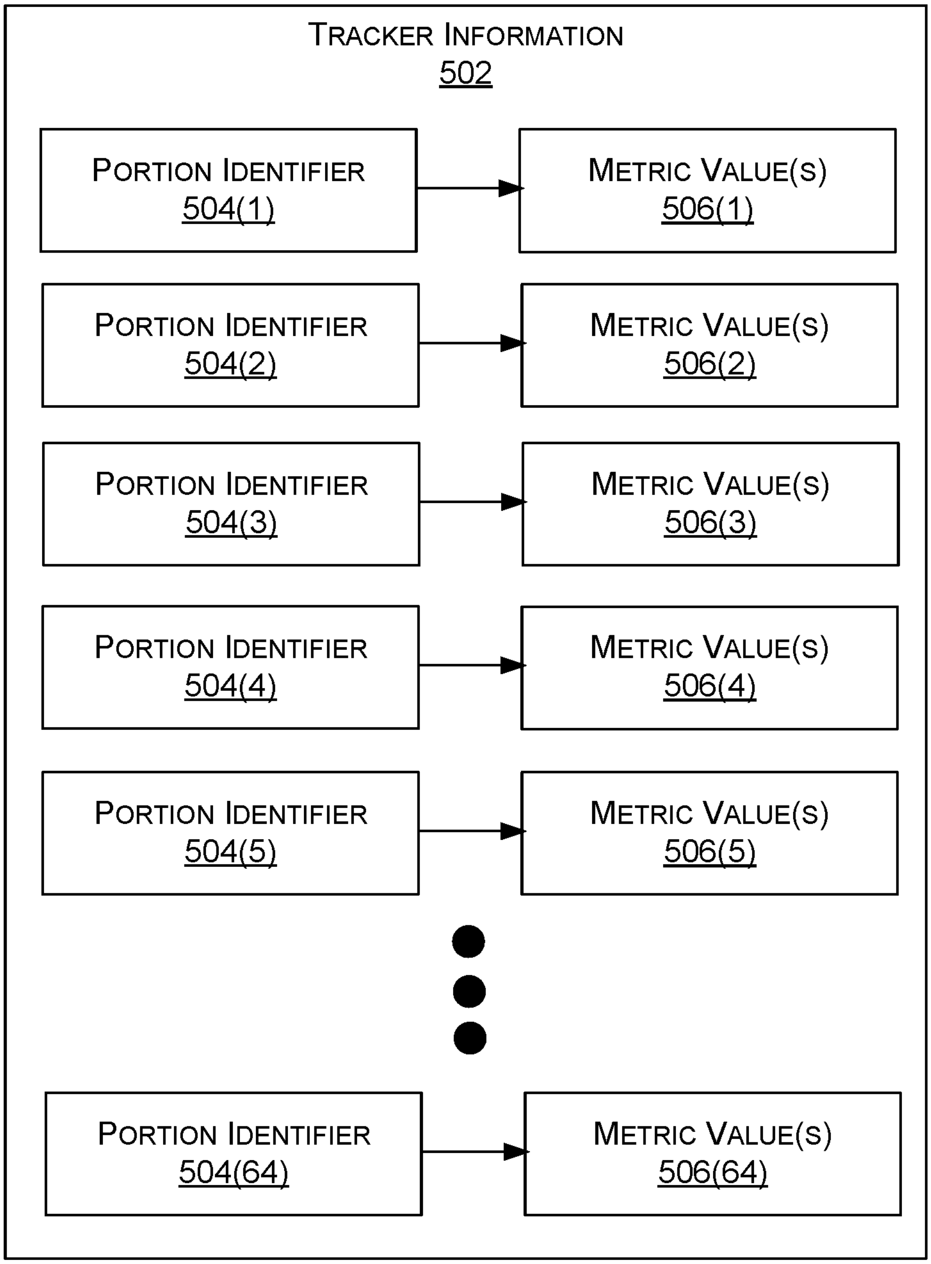
FIG. 5 illustrates an example of tracking metrics that are associated with portions of a map, in accordance with some embodiments of the present disclosure.

For instance, FIG. 5 illustrates an example of tracking metrics that are associated with the portions 304 of the map 302, in accordance with some embodiments of the present disclosure. As shown, the tracking component 120 may generate and/or update data representing tracking information 502 associated with the portions 304 of the map 302. As shown, the tracking information 502 may include at least identifiers 504(1)-(64) (also referred to singularly as "identifier 504" or in plural as "identifiers 504") associated with the portions 304 of the map 302. For example, the first identifier 504(1) may be used to identify the first portion 304(1) of the map 302, the second identifier 504(2) may be used to identify the second portion 304(2) of the map 302, the third identifier 504(3) may be used to identify the third portion 304(3) of the map 302, and/or so forth. As described herein, an identifier 504 may include, but is not limited to, a name, an alphabetic identifier, a numerical identifier, an indicated location, an indicated area, and/or any other type of identifier that may be used to identify a portion 304 of the map 302.

The tracking information 502 may further include one or more metric values 506(1)-(64) (also referred to singularly as "value 506" or in plural as "values 506") that are associated with the identifiers 504. For example, the first value(s) 506(1) may be associated with the first identifier 504(1) (as indicated by the arrow), the second value(s) 506(2) may be associated with the second identifier 504(2) (as indicated by the arrow), the third value(s) 506(3) may be associated with the third value 504(3) (as indicated by the arrow), and/or so forth. As described herein, the value(s) 506 may be associated with one or more tracked metrics associated with the portions 304. For a first example, the first value(s) 506(1) may indicate a number of drives that are associated with the first portion 304(1) of the map 302, where the tracking component 120 may update the first value(s) 506(1) with one or more (e.g., each) of the drives associated with the first portion 304(1) of the map 302. For a second example, the second value(s) 506(2) may indicate a distance traveled that is associated with the second portion 304(2) of the map 302, where the tracking component 120 may update the second value(s) 506(2) with one or more (e.g., each) of the drives associated with the second portion 304(2) of the map 302.

While the example of FIG. 5 describes storing the metric value(s) 506 for the individual portions 304 of the map 302, as described herein, in some examples, the map component 102 may perform similar processes using one or more groups that include one or more of the portions 304 of the map. For example, a portion identifier 504 may represent a group, such as a group that includes the portions 304(28), 304(29), 304(36), and 304(37). The metric value(s) 506 associated with the group may then be associated with one or more (e.g., each) of the portions 304 included in the group. For example, and using the example above, the metric value(s) 506 associated with the group that includes the portions 304(28), 304(29), 304(36), and 304(37) may indicate a total number of drives for the group, a total distance traveled for the group, a total density of the drives associated with the group, a time period since a last update associated with the group, and/or the like.

Referring back to the example of FIG. 1, the process 100 may include the map component 102 using a selection component 124 that is configured to determine whether to update one or more portions of the map. As described herein, in some examples, the selection component 124 may determine whether to update a portion of the map based at least on comparing the metric value(s) associated with the portion of the map to one or more thresholds, where the threshold(s) may be represented by threshold data 126. For a first example, if a metric is associated with a number of drives, then the selection component 124 may determine that a portion of the map is ready to be updated based at least on the number of drives satisfying (e.g., being equal to or greater than) a threshold number of drives or determine that the portion of the map is not ready to be updated based at least on the number of drives not satisfying (e.g., being less than) the threshold number of drives. In such an example, the threshold number of drives may include, but is not limited to, 1 drive, 100 drives, 1,000 drives, 10,000 drives, and/or any other number of drives.

For a second example, if a metric is associated with a distance traveled, then the selection component 124 may determine that a portion of the map is ready to be updated based at least on the distance traveled satisfying (e.g., being equal to or greater than) a threshold distance or determine that the portion of the map is not ready to be updated based at least on the distance traveled not satisfying (e.g., being less than) the threshold distance. In such an example, the threshold distance may include, but is not limited to, 100 miles, 1,000 miles, 10,000 miles, 100,000 miles, 1,000,000 miles, and/or any other distance. For a third example, if a metric is associated with a coverage density, then the selection component 124 may determine that a portion of the map is ready to be updated based at least on the coverage density satisfying (e.g., being equal to or greater than) a threshold density or determine that the portion of the map is not ready to be updated based at least on the coverage density not satisfying (e.g., being less than) the threshold density. In such an example, the threshold density may include, but is not limited to, 50%, 75%, 90%, 95%, 99%, and/or any other percentage of the area of the environment corresponding to the portion of the map. While these are just a few example techniques of how the selection component 124 may determine when to update a portion of the map, in other examples, the selection component 124 may use one or more additional and/or alternative techniques.

In some examples, the selection component 124 may use one or more additional and/or alternative criteria when determining whether to update a portion of the map, where the criteria is again represented by the criteria data 116. For example, the selection component 124 may determine not to update a portion of the map until a threshold period of time has elapsed since a last update to the portion of the map. The threshold period of time may include, but is not limited to, one day, one week, one month, six months, one year, and/or any other time period. In some examples, the selection component 124 may use the threshold period of time since some portions of the map, such as portions that are associated with specific areas of the environment (e.g., highways), may constantly receive large numbers of mapstreams 106. As such, the selection component 124 may not want to update such a portion of the map each time the metric value(s) satisfies a threshold(s) since the area of the environment is not likely to have been updated within the threshold period of time.

The process 100 may then include the selection component 124 causing an update to occur to a portion (e.g., a group of portions) of the map. In some examples, to cause the update, the selection component 124 may store update data 128 associated with the update in a memory 130, such as a queue, that is associated with performing the updates. The update data 128 may include, but is not limited to, data representing an identifier associated with the portion of the map, data representing an area of the environment that corresponds to the portion, the mapstreams 106 associated with the portion, the location data 104 associated with the portion, and/or any other data needed to perform the update. In some examples, such as when the selection component 124 determines to update more than one portion, the selection component 124 may further store update data 128 indicating an order for performing the updates. For example, the update data 128 may indicate that a first portion of the map is to be updated, followed by a second portion of the map, followed by a third portion of the map, and/or so forth.

In some examples, rather than the selection component 124 using an entirety of the mapstreams 106 when causing an update to a portion of the map, the selection component 124 may use only a portion of the mapstreams 106. For example, the filtering component 114 may filter at least a portion of the mapstreams 106 received from the machines 108. For instance, the filtering component 114 may filter the mapstreams 106 using one or more criteria, where the criteria may again be represented by criteria data 116. As described herein, the criteria may include, but is not limited to, types of the machines 108 that generated the mapstreams 106, versions of software executing on the machines 108 that generated the mapstreams 106, types of the mapstream 106 (e.g., types of sensor data, types of processed data etc.), one or more details associated with the mapstreams 106 (e.g., types of objects represented by the mapstreams 106, whether new objects are represented by the mapstreams 106, etc.), ages of the mapstreams 106, a density coverage associated with the mapstreams 106, and/or any other criteria.

For a first example, and for a portion of the map, the filtering component 114 may filter the mapstreams 106 associated with the portion in order to identify one or more mapstreams 106 that were generated within a most recent time period, such as within the last month, week, day, and/or the like. The selection component 124 may then use the identified mapstream(s) 106 for updating the portion of the map (e.g., the update data 128 may represent the identified mapstream(s) 106). For a second example, and for a portion of the map, the filtering component 114 may filter the mapstreams 106 associated with the portion in order to identify the most recent threshold number of mapstreams 106, such as the most recent 10 mapstreams, 50 mapstreams, 100 mapstreams, 1,000 mapstreams, and/or the like. The selection component 124 may then use the identified mapstreams 106 for updating the portion of the map. Still, for a third example, and again for a portion of the map, the filtering component 114 may filter the mapstreams 106 associated with the portion in order to identify one or more mapstreams 106 that adequately cover an entirety of the area of the environment corresponding to the portion of the map. The selection component 124 may then use the identified mapstream(s) 106 for updating the portion of the map.

As further illustrated by the example of FIG. 1, the process 100 may include an update component 132 updating the portion of the map using the update data 128. As described herein, the update component 132 may use any technique to update the portion of the map using the update data 128. For instance, in some examples, the update component 132 may update the portion of the map by performing a batch rebuild. However, in other examples, the update component 132 may update the portion of the map by updating information associated with the objects. For example, the update component 132 may update locations of objects that have moved within the environment, add locations of objects that are new to the environment, remove locations of objects that have also been removed from the environment, and/or perform any other type of update.

In some examples, and as described in more detail herein, the process 100 may include the map component 102 performing one or more additional processes that help improve the updating of the map. For instance, when causing an update to occur to a portion of the map, the selection component 124 may further cause one or more additional portions to update in order to synchronize the map updates associated with the portion with the map as depicted by the additional portion(s). For example, the selection component 124 may cause portions of the map that at least partially surround the portion of the map that is being updated to also be at least partially updated. For example, when causing a portion of the map to update, the selection component 124 may further cause a neighboring portion of the map to update in order to synchronize one or more objects (e.g., one or more roads) as represented by the updated portion to match one or more corresponding objects as represented by the neighboring portion.

For an example, and referring back to the example of FIG. 3, the selection component 124 may determine to cause a group that includes the portions 304(28), 304(29), 304(36), and 304(37) of the map 302 to update. Additionally, based at least on that determination, the selection component 124 may determine to cause one or more of the portions 304 (19)-(22), 304(27), 304(30), 304(35), 304(38), and 304(43)-(46) of the map to at least partially update. As described herein, a partial update may include updating at least part of a portion 304 that is located next to a neighboring portion 304. For example, and using the example above, since the selection component 124 is causing the portion 304(37) of the map to update, then the selection component 124 may further cause at least part of the portion 304(28) of the map 302 to update that is located next to the portion 304(37) in order to synchronize the updated portion 304(37) with the portion 304(38) (e.g., such as to attach a road the is located between the portion 304(37) and the portion 304(38).

Additionally, or alternatively, in some examples, when causing an update to a portion 304 of the map 302, the selection component 124 may cause one or more other portions 304 of the map 302 to "lock" such that the other portion(s) 304 of the map 302 is not updated during the update to the portion 304 of the map 302. The locking of portions 304 is described in more detail herein.

Referring back to the example of FIG. 1, the process 100 may include the map component 102 receiving, from the update component 132, (1) an indication that the update associated with the portion of the map is complete and/or (2) the updated portion of the map, which may be illustrated by the arrow from the update component 132 to the map component 102. Based at least on receiving the update and/or the indication, the map component 102 may perform one or more processes with respect to the mapstreams 106 that are stored in association with the portion of the map. For instance, in some examples, based at least on receiving the update and/or the indication, the map component 102 may remove all of the mapstreams 106 associated with the portion of the map. In such examples, the map component 102 may remove all of the mapstreams 106 in order to cause a next update associated with the portion of the map to include only new mapstreams 106 that may better represent the environment, such as changes that occur to the environment (e.g., objects that are moved, added, removed, etc.).

Additionally, or alternatively, in some examples, based at least on receiving the update and/or the indication, the map component 102 may remove some and/or none of the mapstreams 106 associated with the portion of the map. In such examples, the map component 102 may maintain at least some of the mapstreams 106 in case the mapstreams 106 are needed to perform a subsequent update associated with the portion of the map. For example, if the map component 102 performs the processes described herein to determine to again update the portion of the map, but the map component 102 has not received a new mapstream 106 that represents at least part of the area of the environment that corresponds to the portion of the map, then the map component 102 may use one or more older mapstreams 106 that represent the part of the area in order to perform the update.

In some examples, based at least on causing the update to occur, receiving the update, and/or receiving the indication that the update is complete, the process 100 may include the tracking component 120 updating the metric value(s) associated with the portion of the map. For instance, the tracking component 120 may restart the metric value(s), such as to indicate that the map component 102 does not include any data (e.g., drives, mapstreams 106, etc.) associated with the portion of the map. For example, and referring back to the example of FIG. 5, if the selection component 124 causes an update to occur with the first portion 304(1) of the map 302 that is associated with the first identifier 504(1), then the tracking component 120 may also cause the first metric value(s) 506(1) to update, such as by restarting the first metric value(s) 506(1) to indicate that no data is stored in association with the first portion 304(1) of the map 302. The map component 102 may then perform one or more of the processes described herein to again determine when a next updated should occur with the portion of the map.

Figure 6:
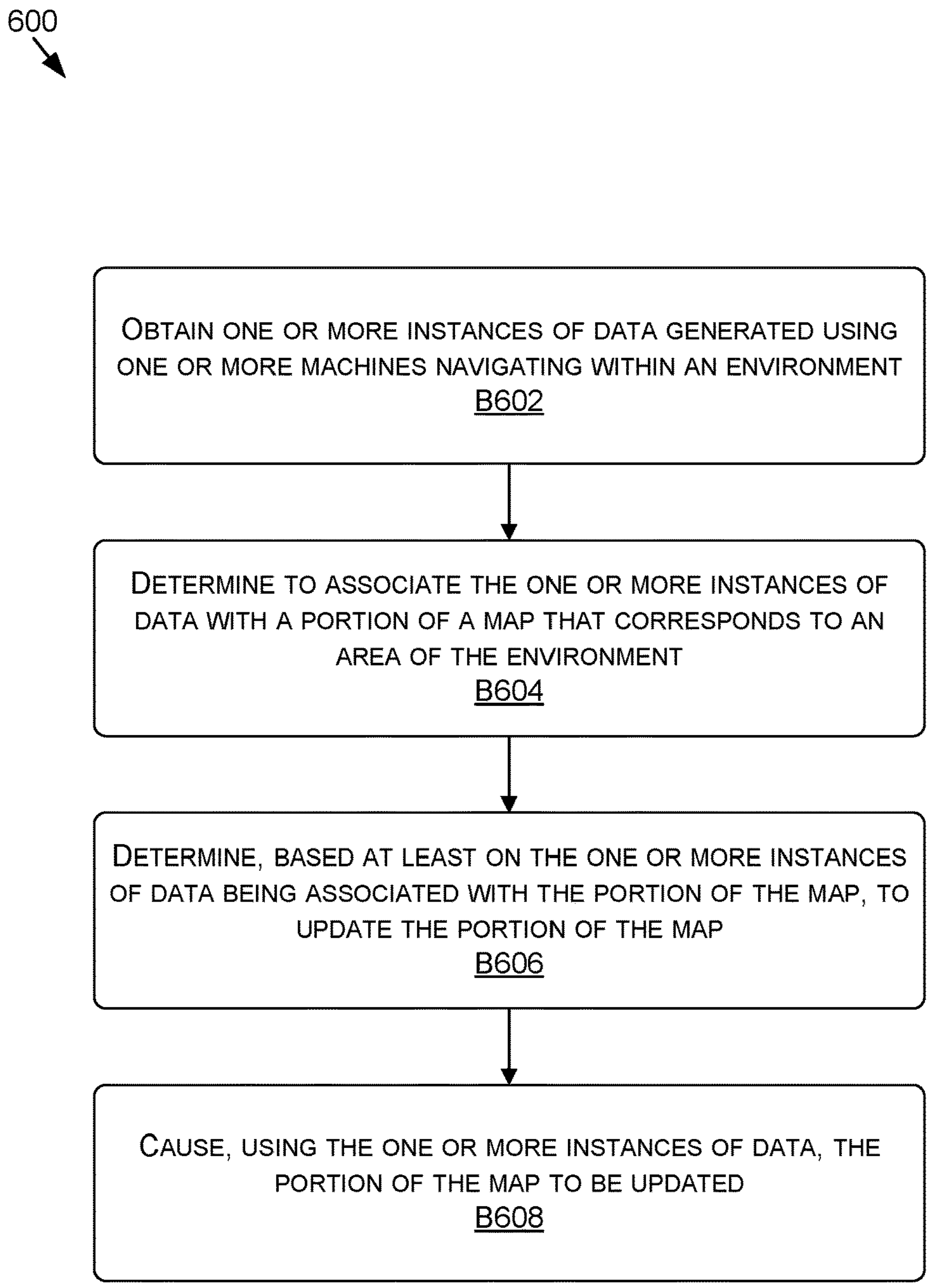
FIG. 6 illustrates a flow diagram showing a method for causing one or more segmented updates associated with a map, in accordance with some embodiments of the present disclosure.
Figure 7:
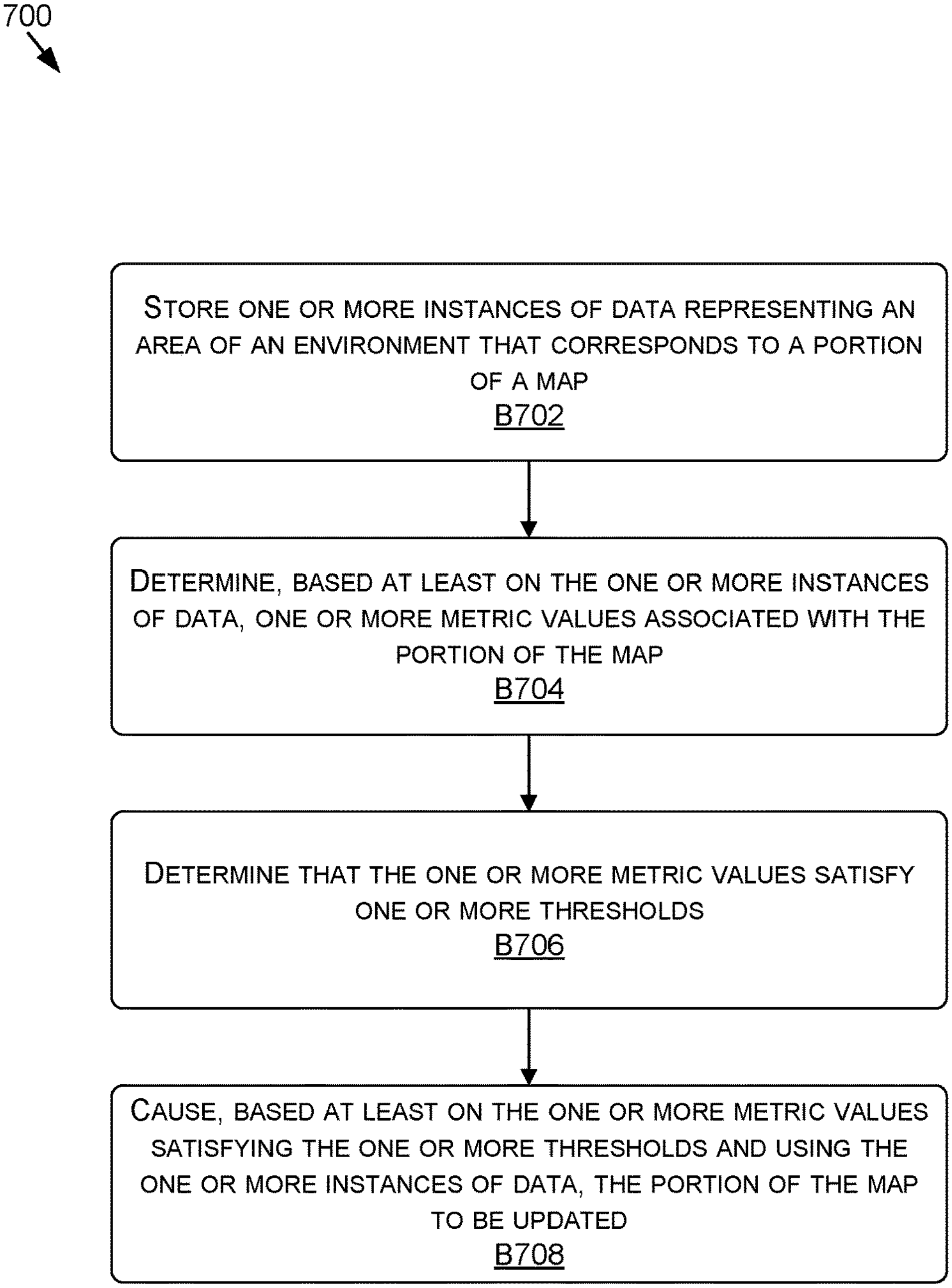
FIG. 7 illustrates a flow diagram showing a method for determining when to update a portion of a map, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, the methods 600 and 700 are described, by way of example, with respect to FIG. 1. However, these methods 600 and 700 may additionally or alternatively be executed by any one system, or any combination of systems, including, but not limited to, those described herein.

FIG. 6 illustrates a flow diagram showing a method 600 for causing one or more segmented updates associated with a map, in accordance with some embodiments of the present disclosure. The method 600, at block B602, may include obtaining one or more instances of data generated using one or more machines navigating within an environment. For instance, the map component 102 may receive at least the mapstream(s) 106 (e.g., the one or more instances of data) from the machine(s) 108. As described herein, the machine(s) 108 may generate the mapstream(s) 106 while performing one or more drives thought the environment. In some examples, the map component 102 may further receive the location data 104 from the machine(s) 108.

The method 600, at block B604, may include determining to associate the one or more instances of data with a portion of a map that corresponds to an area of the environment. For instance, the map component 102 (e.g., the association component 118) may associate the mapstream(s) 106 with the portion of the map, where the map is represented by the map data 110. As described herein, in some examples, the map component 102 may associate the mapstream(s) 106 with the portion of the map using the location data 104. For example, the map component 102 may determine, based at least on the location data 104, that the machine(s) 108 was navigating in the area of the environment when generating the mapstream(s) 106. Additionally, the map component 102 may determine that the area of the environment corresponds to the portion of the map. Based at least on those determinations, the map component 102 may associate the mapstream(s) 106 with the portion of the map.

The method 600, at block B606, may include determining, based at least on the one or more instance of data being associated with the portion of the map, to update the portion of the map. For instance, the map component 102 (e.g., the selection component 124) may determine to update the portion of the map based at least on the mapstream(s) 106. As described herein, in some examples, to make the determination, the map component 102 may track one or more metrics that are associated with the portion of the map. As described herein, a metric associated with the portion may include, but is not limited to, a number of drives (e.g., a number of mapstreams 106) associated with the portion, a distance traveled within the portion, a density of the drives within the portion, a time period since a last update to the portion, and/or any other metric. The map component 102 may then determine to update the portion of the map based at least on one or more of the metric values satisfying one or more thresholds.

The method 600, at block B608, may include causing, using the one or more instances of data, the portion of the map to be updated. For instance, the map component 102 (e.g., the selection component 124) may cause the portion of the map to be updated. As described herein, to cause the update to occur, the map component 102 may store the update data 128 associated with the update in the memory 130, where the update data 128 may include at least data identifying the portion of the map and/or the mapstream(s) 106 to use to perform the update. In some examples, the map component 102 may perform one or more additional processes associated with the update, such as causing one or more neighboring portions of the map to be updated and/or locking one or more portions of the map from being updated.

FIG. 7 illustrates a flow diagram showing a method 700 for determining when to update a portion of a map, in accordance with some embodiments of the present disclosure. The method 700, at block B702, may include storing one or more instances of data representing an area of an environment that corresponds to a portion of a map. For instance, the map component 102 may receive the mapstream(s) 106 (e.g., the one or more instances of data) from the machine(s) 108, where the mapstream(s) 106 represents the area of the environment. In some examples, the map component 102 may further receive the location data 104 from the machine(s) 108. The map component 102 (e.g., the association component 118) may then determine, based at least on the location data 104, to associate the mapstream(s) 106 with the portion of the map.

The method 700, at block B704, may include determining, based at least on the one or more instances of data, one or more metric values associated with the portion of the map. For instance, the map component 102 (e.g., the tracking component 120) may determine the metric value(s) associated with the portion of the map based at least on the mapstream(s) 106 associated with the portion of the map. As described herein, a metric associated with the portion of the map may include, but is not limited to, a number of drives (e.g., a number of mapstreams 106) associated with the portion, a distance traveled within the portion, a density of the drives within the portion, a time period since a last update of the portion, and/or any other metric. In some examples, the map component 102 updates the metric value(s) each time the map component 102 associates a new mapstream 106 with the portion of the map.

The method 700, at block B706, may include determining that the one or more metric values satisfy one or more thresholds. For instance, the map component 102 (e.g., the selection component 124) may determine that the metric value(s) satisfies the threshold(s), where the threshold(s) is represented by the threshold data 126. For a first example, the map component 102 may determine that the number of drives is equal to or greater than a threshold number of drives. For a second example, the map component 102 may determine that the distance traveled associated with the mapstream(s) 106 satisfies a distance threshold. However, in other examples, the map component 102 may determine that any other metric value satisfies any other threshold.

The method 700, at block B708, may include causing, based at least on the one or more metric values satisfying the one or more thresholds and using the one or more instances of data, the portion of the map to be updated. For instance, the map component 102 (e.g., the selection component 124) may cause, based at least on the metric value(s) satisfying the threshold(s), the portion of the map to be updated. As described herein, to cause the update to occur, the map component 102 may store the update data 128 associated with the update in the memory 130, where the update data 128 may include data identifying the portion of the map and/or the mapstream(s) 106 to use to perform the update. In some examples, the map component 102 may perform one or more additional processes associated with the update, such as causing one or more neighboring portions of the map to be updated and/or locking one or more portions of the map from being updated.

Figure 8:
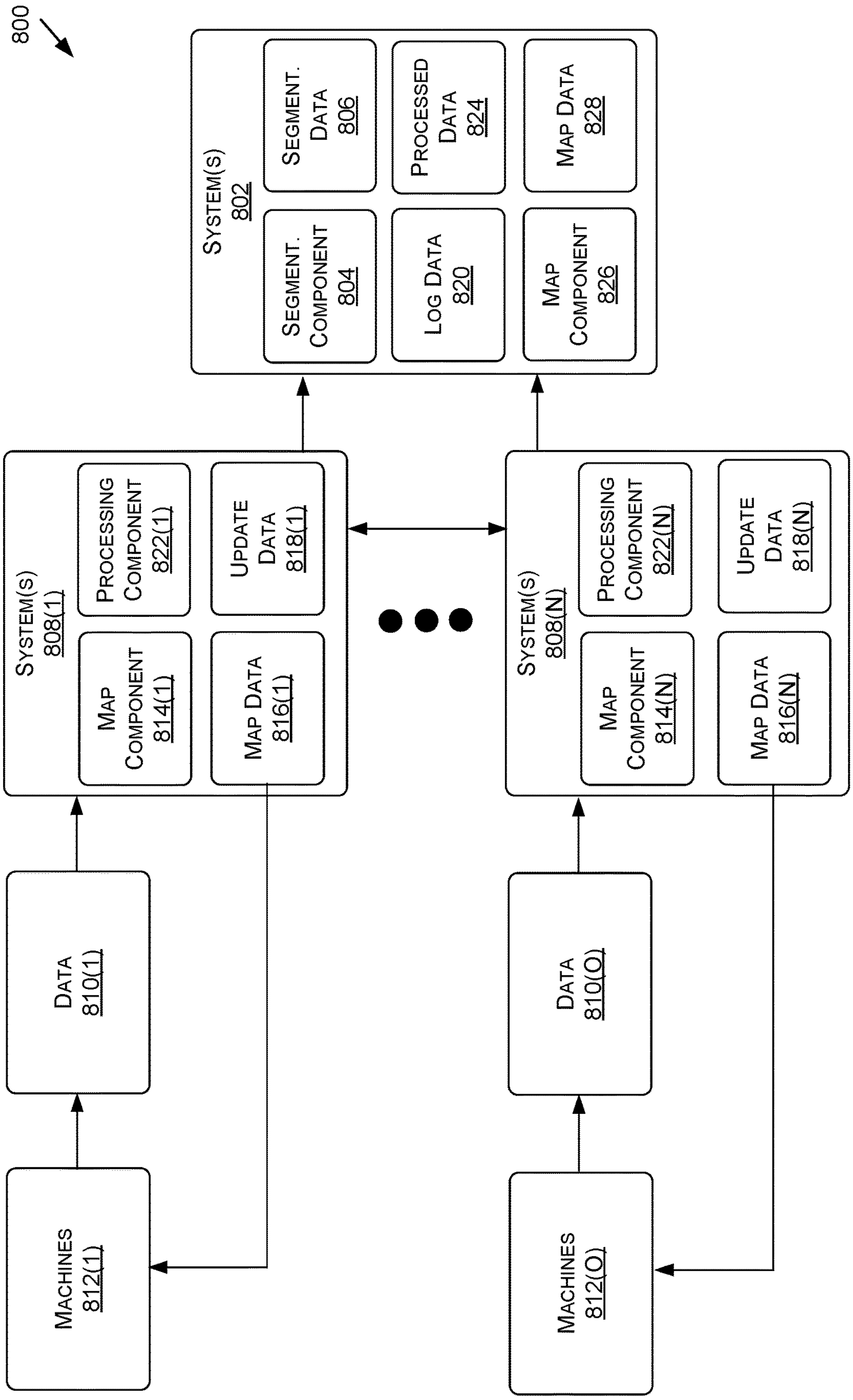
FIG. 8 illustrates an example data flow diagram for a process of performing segmented data storage and processing, in accordance with some embodiments of the present disclosure.

FIG. 8 illustrates an example data flow diagram for a process 800 of performing segmented data storage and processing, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 2100 of FIGS. 21A-21D, example computing device 2200 of FIG. 22, and/or example data center 2300 of FIG. 23.

The process 800 may include one or more systems 802 (also referred to as the "central system(s) 802") using a segmentation component 804 to segment an environment into different areas (e.g., regions), where the segmentation is represented by segmentation data 806. As described herein, the segmentation component 804 may use one or more techniques to segment the environment into the different areas. For instance, in some examples, the segmentation component 804 may segment the environment such that the areas include approximately similar sized areas of the environment. In some examples, the segmentation component 804 may segment the environment based at least on one or more densities, such as a machine density, a population density, and/or the like. For example, the segmentation component 804 may segment the environment such that each area includes substantially a similar number of machines that navigate within the areas over a period of time and/or a substantially similar population density. In some examples, the segmentation component 804 may segment the environment using geolocations, such as based on counties, cities, states, countries, and/or so forth.

Still, in some examples, the segmentation component 804 may segment the environment based at least on the current locations of other systems 808(1)-(N) (also referred to singularly as "local system(s) 808" or in plural as "local systems 808") located within the environment. For a first example, if the local system(s) 808(1) is located in a southern part of the environment and the local system(s) 808(N) is located in the northern part of the environment, and the segmentation component 804 wants to use the local systems 808 to perform one or more of the processes described herein, then the segmentation component 804 may segment the environment such that a first area includes the northern area of the environment that includes the location of the local system(s) 808(1) and a second area includes the southern area of the environment that includes the location of the local system(s) 808(N). For a second example, if the local system(s) 808(1) is associated with a first cellular tower and/or cellular network and the local system(s) 808(N) is associated with a second cellular tower and/or cellular network, then the segmentation component 804 may segment the environment such that the first area includes the network area covered by the local system(s) 808(1) and the second area includes the network area covered by the local system(s) 808(N). While these are just a few example techniques of how the segmentation component 804 may segment the environment into areas, in other examples, the segmentation component 804 may use additional and/or alternative techniques to segment the environment into areas.

The process 800 may further include the segmentation component 804 associating the local systems 808 with the segmented areas of the environment. In some examples, and as described herein, the segmentation component 804 may associate a local system(s) 808 with an area for which the local system(s) 808 is located. For example, if the segmentation component 804 segments the environment into at least three areas, then the segmentation component 804 may associate a first local system(s) 808 with a first area for which the first local system(s) 808 is located, associate a second local system(s) 808 with a second area for which the second local system(s) 808 is located, and associate a third local system(s) 808 with a third area for which the third local system(s) 808 is located. However, in other examples, the segmentation component 804 may associate a local system(s) 808 with an area for which the local system(s) 808 is not located, such as if the local system(s) 808 is located at least approximate to the area.

In some examples, the segmentation component 804 may then update the segmentation data 806 to represent the associations between the local systems 808 and the areas of the environment. As described herein, and for an association, the segmentation data 806 may represent at least an identifier of a local system(s) 808, a location of an area, a portion of the environment for which the area is located, a location of the local system(s) 808 within the area, and/or any other information. As described herein, an identifier may include, but is not limited to, a name, an alphabetic identifier, a numerical identifier, an indicated location, an indicated area, and/or any other type of identifier that may be used to identify a local system(s) 808. Additionally, the portion of the environment may include a boundary associated with the area, such as in the form of coordinates, that may be used to identify the area within the environment.

Figure 9A:
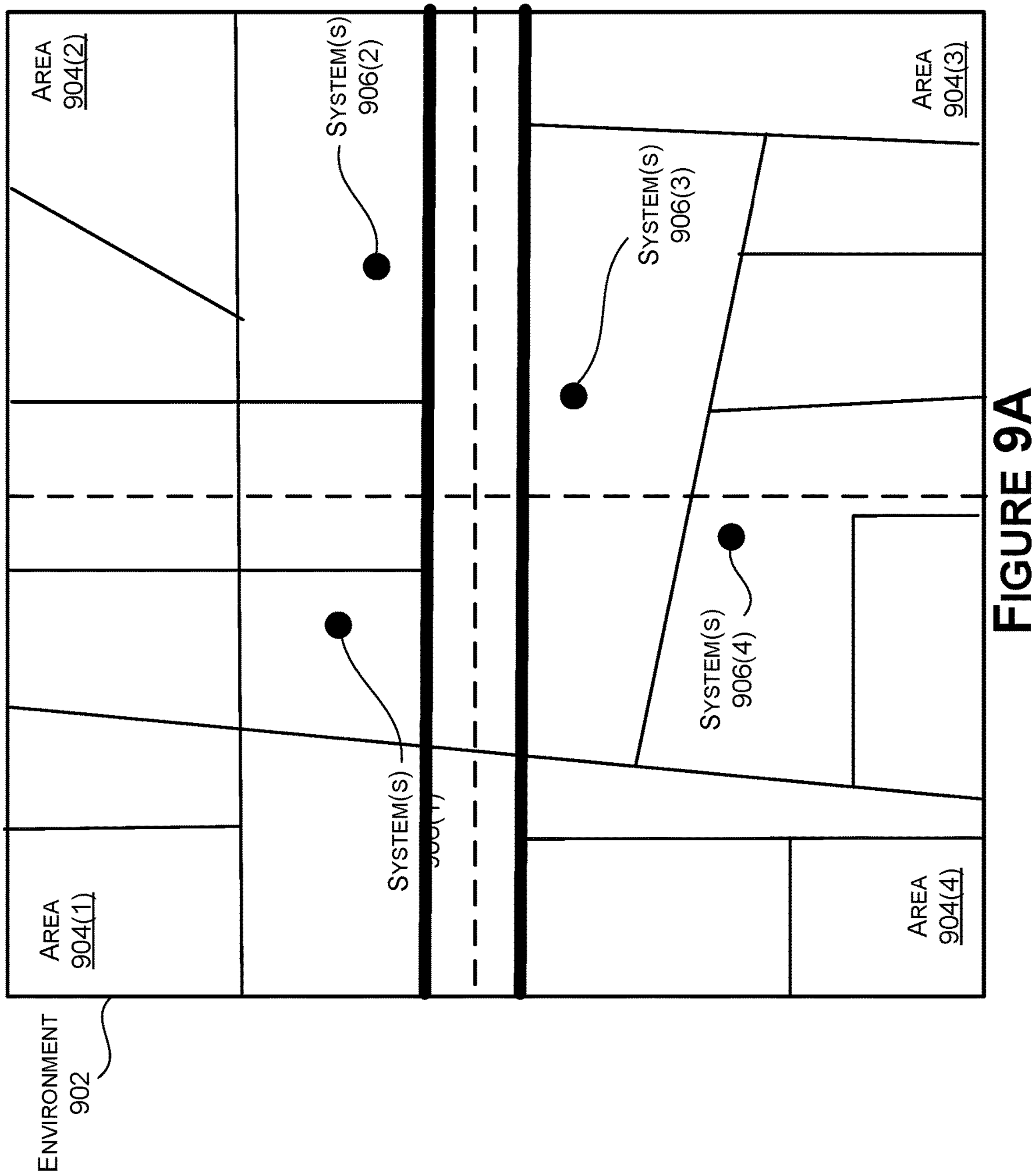
FIGS. 9A-9B illustrate an example of segmenting an environment into areas and then associating the areas with local systems, in accordance with some embodiments of the present disclosure.
Figure 9B:
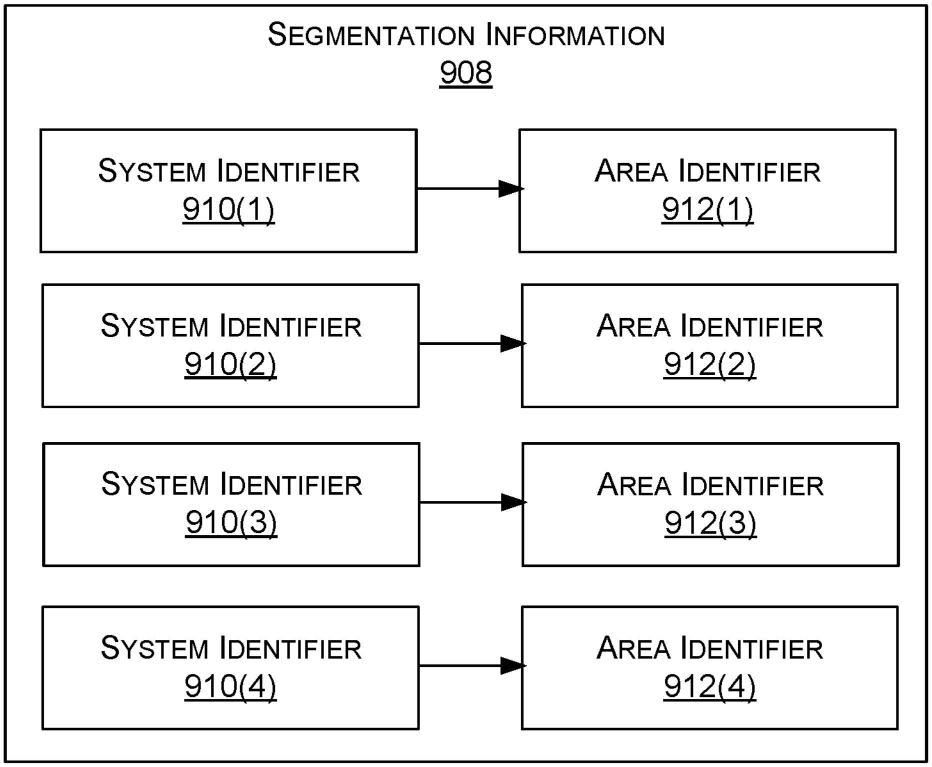

For instance, FIGS. 9A-9B illustrates an example of segmenting an environment 902 into areas 904(1-(4) (also referred to singularly as "area 904" or in plural as "areas 904") and then associating the areas 904 with local systems 906(1)-(4) (also referred to singularly as "local system(s) 906" or in plural as "local systems 906"), in accordance with some embodiments of the present disclosure. As shown by the example of FIG. 9A, the segmentation component 804 may segment the environment 902 into four areas 904 based at least on the locations of the local systems 906 and/or based at least on the areas 904 including substantially similar sizes. However, in other examples, the segmentation component 804 may segment the environment 902 using any other technique. For example, the segmentation component 804 may segment the environment 902 based at least on one or more densities associated with the environment 902, network areas covered by one or more cellular towers within the environment 902 (e.g., where the local systems 906 include the cellular towers and/or systems associated with the cellular towers, and/or using any other technique described herein. In the example of FIG. 9A, the environment 902 may include a city with multiple roads (as indicated by the grey lines). However, in other examples, the environment 902 may include any other type of area, such as the world, a continent, a country, a state, and/or the like.

In the example of FIG. 9A, the segmentation component 804 may then associate the first local system(s) 906(1) (which may represent, and/or include, one of the local systems 808) with the first area 904(1) based at least on the first local system(s) 906(1) being located within the first area 904(1), associate the second local system(s) 906(2) (which may represent, and/or include, one of the local systems 808) with the second area 904(2) based at least on the second local system(s) 906(2) being located within the second area 904(2), associate the third local system(s) 906(3) (which may represent, and/or include, one of the local systems 808) with the third area 904(3) based at least on the third local system(s) 906(3) being located within the third area 904(3), and associate the fourth local system(s) 906(4) (which may represent, and/or include, one of the local systems 808) with the fourth area 904(4) based at least on the fourth local system(s) 906(4) being located within the fourth area 904(4). While the example of FIG. 9A illustrates associating four local systems 906 with four areas 904, in other examples, the segmentation component 804 may associate any number of local systems with any number of areas.

As described herein, and as illustrated by the example of FIG. 9B, the segmentation component 804 may then generate segmentation data representing segmentation information 908 associated with the associations from the example of FIG. 9A. For instance, the segmentation information 908 may associate a first identifier 910(1) of the first local system(s) 906(1) with a first identifier 912(1) of the first area 904(1), a second identifier 910(2) of the second local system(s) 906(2) with a second identifier 912(2) of the second area 904(2), a third identifier 910(3) of the third local system(s) 906(3) with a third identifier 912(3) of the third area 904(3), and a fourth identifier 910(4) of the fourth local system(s) 906(4) with a fourth identifier 912(4) of the fourth area 904(4). As described herein, an identifier 910(1)-(4) may include, but is not limited to, a name, an alphabetic identifier, a numerical identifier, an indicated location, an indicated area, and/or any other type of identifier that may be used to identify a local system(s) 906. Additionally, an identifier 912(1)-(4) may indicate where the area 904 is located, such as in the form of boundaries and/or coordinates.

Referring back to the example of FIG. 8, the process 800 may include the local system 808(1) receiving data 810(1) (which may represent, and/or include, at least a portion of the location data 104 and/or at least a portion of the mapstreams 106) from machines 812(1) (which may represent, and/or include, at least a portion of the machines 108) and the local system(s) 808(N) receiving data 810(O) (which may represent, and/or include, at least a portion of the location data 104 and/or at least a portion of the mapstreams 106) from machines 812(O) (which may represent, and/or include, at least a portion of the machines 108). As described herein, the local systems 808 may receive the data 810(1)-(O) (also referred to as just "data 810") based at least on the locations of the machines 812(1)-(O) (also referred singularly as "machine 812" or in plural as "machines 812") when generating the data 810.

For example, the machines 812(1) may be navigating in an area that is associated with the local system(s) 808(1) when generating the data 810(1). As such, the machines 812(1) may send the data 810(1) to the local system(s) 808(1) without sending the data 810(1) to the local system(s) 808(N) and/or the central system(s) 802. Additionally, the machines 812(O) may be navigating in an area that is associated with the local system(s) 808(O) when generating the data 810(O). As such, the machines 812(O) may send the data 810(O) to the local system(s) 808(N) without sending the data 810(O) to the local system(s) 808(1) and/or the central system(s) 802. In some examples, the machines 812 may use the segmentation data 806 to determine which of the local systems 808 to send the data 810.

For example, and as described herein, the segmentation data 806 may associate the local systems 808 with the areas of the environment. As such, if the machines 812(1) determine that the area for which the machines 812(1) are navigating includes the area associated with the local system(s) 808(1), using the segmentation data 806, then the machines 812(1) may send the data 810(1) to the local system(s) 808(1). Additionally, if the machines 812(O) determine that the area for which the machines 812(O) are navigating includes the area associated with the local system(s) 808(O), using the segmentation data 806, then the machines 812(O) may send the data 810(O) to the local system(s) 808(N).

However, as further described herein, in some examples, such as when the machines 812 are navigating approximate to a border between two areas, then the machines 812 may send the data 810 to more than one of the local systems 808. In some examples, the machines 812 may be navigating approximate to a border based at least on the machines 812 navigating within a threshold distance (e.g., 0.1 miles, 0.5 miles, 1 mile, 5 miles, etc.) to the border when generating the data 810, the machines 812 crossing the border when generating the data 810, and/or based on one or more other factors. For example, if a machine 812(1) is navigating approximate to a border that is between an area associated with the local system(s) 808(1) and an area associated with the local system(s) 808(N), then the machine 812(1) may send the data 810(1) to both the local system(s) 808(1) and the local system(s) 808(N).

Figure 10:
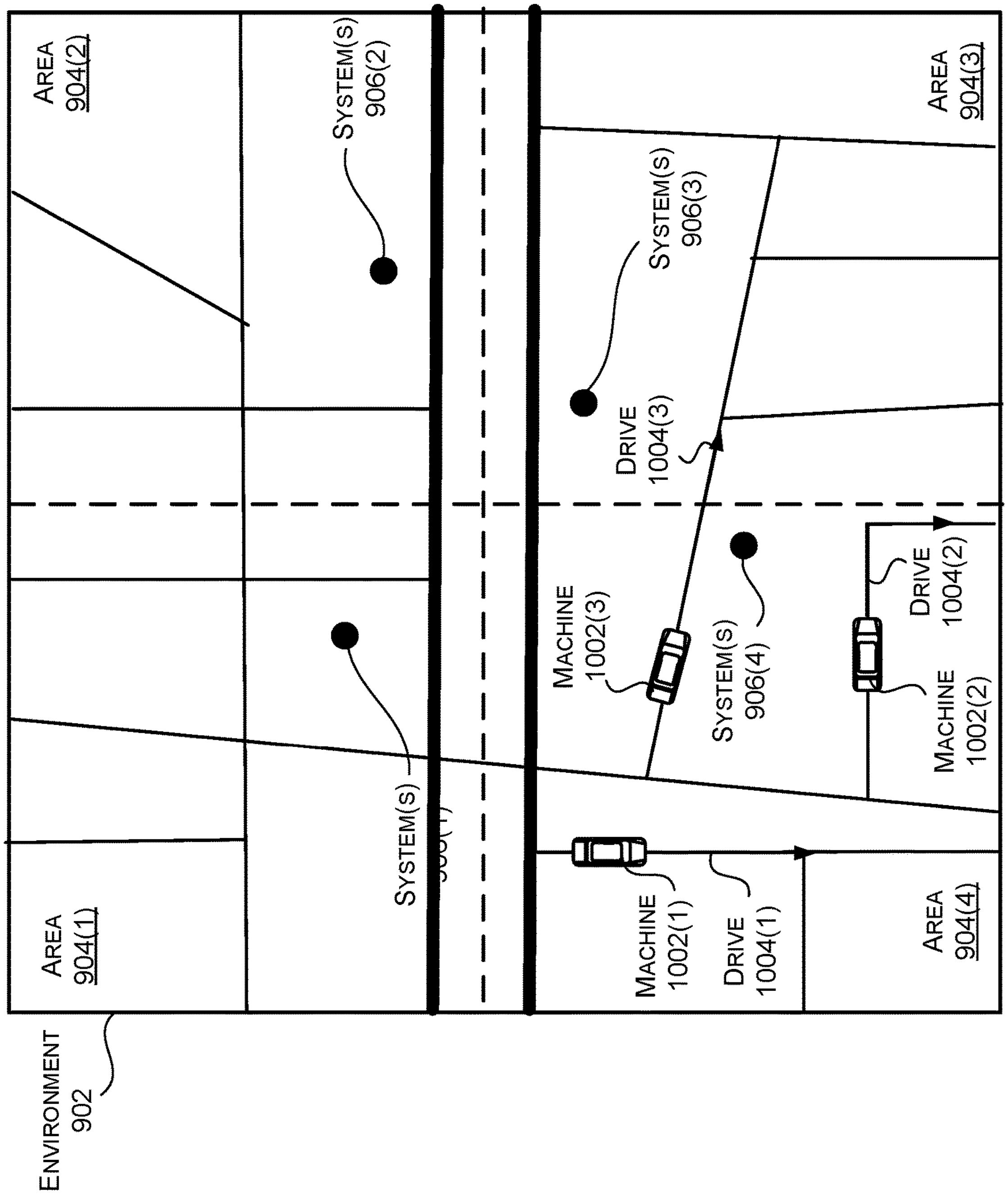
FIG. 10 illustrates an example of machines sending data to local systems when navigating through an environment, in accordance with some embodiments of the present disclosure.

For instance, FIG. 10 illustrates an example of machines 1002(1)-(3) (which may also be referred to singularly as "machine 1002" or in plural as "machines 1002") (which may represent, and/or include, one or more of the machines 812) sending data to the local systems 906(3)-(4) when navigating through the environment 902, in accordance with some embodiments of the present disclosure. As shown, the first machine 1002(1) may navigate around the fourth area 904(4) of the environment 902 while performing a first drive 1004(1). As such, the first machine 1002(1) may send data (e.g., location data, one or more mapstreams, etc.) generated during the first drive 1004(1) to the fourth local system(s) 906(4) without sending the data to the third local system(s) 906(3). Additionally, the second machine 1002(2) may navigate around the fourth area 904(4) and approximate to the third area 904(3) of the environment 902 when performing a second drive 1004(2). As such, the second machine 1002(2) may send data (e.g., location data, one or more mapstreams, etc.) generated during the second drive 1004(2) to the fourth local system(s) 906(4). Additionally, in some examples, the second machine 1002(2) may further send the data to the third local system(s) 906(3) since the second machine 1002(2) navigates approximate to the third area 904(3).

Furthermore, the third machine 1002(3) may navigate in the fourth area 904(4) and the third area 904(3) of the environment 902 while performing the third drive 1004(3). As such, the third machine 1002(3) may send data (e.g., location data, one or more mapstreams, etc.) generated during the third drive 1004(3) to the fourth local system(s) 906(4) and the third local system(s) 906(3). In some examples, the third machine 1002(3) may send all of the data to the fourth local system(s) 906(4) and the third local system(s) 906(3). In some examples, the third machine 1002(3) may only send a first portion of the data to the fourth local system(s) 906(4) and a second portion of the data to the third local system(s) 906(3). For example, the third machine 1002(3) may send the first portion of the data that is generated while the third machine 1002(3) is navigating in the fourth area 904(4) to the fourth local system(s) 906(4) and send the second portion of the data that is generated while the third machine 1002(3) is navigating in the third area 904(3) to the third local system(s) 906(3).

Referring back to the example of FIG. 8, the process 800 may include the local systems 808 processing the received data 810 using one or more processes. For instance, and as shown, the local system(s) 808(1) may include a map component 814(1), which may include and/or be similar to the map component 102, that the local system 808(1) uses to process the data 810(1) (e.g., location data, mapstreams, etc.) in order to generate and/or update a map (referred to, in some examples, as a "first map") associated with the environment, where the first map is represented by map data 816(1). As described herein, since the local system(s) 808(1) is associated with an area of the environment, the local system(s) 808(1) may generate and/or update at least a portion of the first map that corresponds to the area of the environment. Additionally, the local system(s) 808(N) may include a map component 814(2), which may include and/or be similar to the map component 102, that the local system(s) 808(N) uses to process the data 810(O) (e.g., location data, mapstreams, etc.) in order to generate and/or update a map (referred to, in some examples, as a "second map") associated with the environment, where the second map is represented by map data 816(N). As described herein, since the local system(s) 808(N) is associated with an additional area of the environment, the local system 808(N) may generate and/or update at least a portion of the second map that corresponds to the additional area of the environment.

In some examples, the first map stored and/or updated by the local system(s) 808(1) may represent a similar area of an environment as the second map stored and/or updated by the local system(s) 808(N). In such examples, and as described in more detail here, the local system(s) 808(1) may generate and/or update the portion of the first map that corresponds to the area associated with the local system(s) 808(1) while also replicating at least some of the updates performed by the local system(s) 808(N) to an additional portion of the second map that corresponds to the area associated with the local system(s) 808(N). Additionally, the local system(s) 808(N) may generate and/or update the portion of the second map that corresponds to the area associated with the local system(s) 808(N) while also replicating at least some of the updates performed by the local system(s) 808(1) to an additional portion of the first map that corresponds to the area associated with the local system(s) 808(1). However, in other examples, the first map may represent a different area of the environment as compared to the second map.

Figure 11:
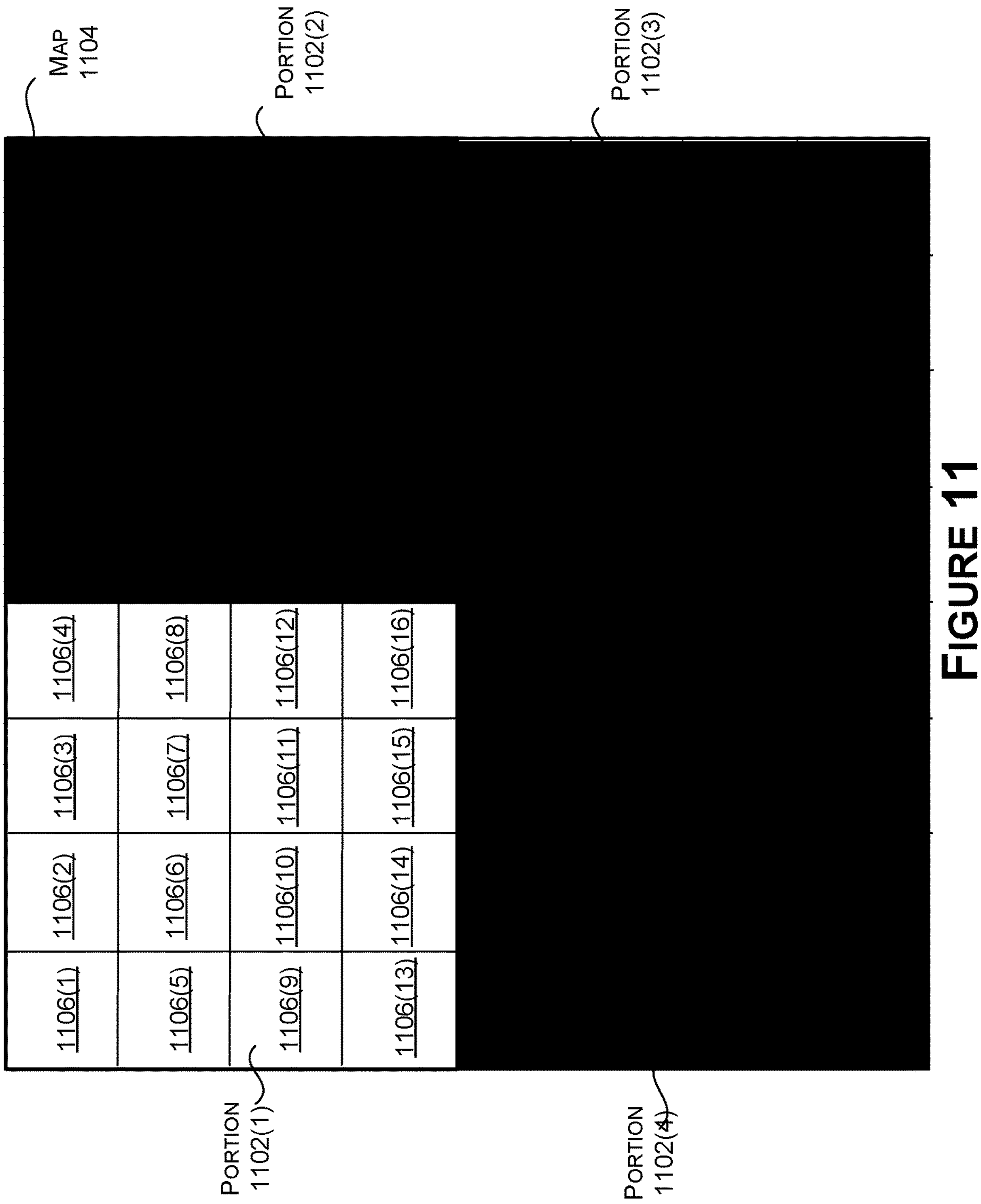
FIG. 11 illustrates an example of local systems updating portions of a map corresponding to areas of an environment, in accordance with some embodiments of the present disclosure.

For instance, FIG. 11 illustrates an example of the local systems 906 updating portions 1102(1)-(4) (also referred to singularly as "portion 1102" or in plural as "portions 1102") of a map 1104 corresponding to the areas 904 of the environment 902, in accordance with some embodiments of the present disclosure. As shown, the first local system(s) 906(1) may update the first portion 1102(1) (indicated by the white color) of the map 1004 corresponding to the first area 904(1) of the environment 902, where the first portion 1102(1) is associated with additional portions 1106(1)-(16). Additionally, the second local system(s) 906(2) may update the second portion 1102(2) (indicated by the light grey color) of the map 1104 corresponding to the second area 904(2) of the environment 902, where the second portion 1102(2) is associated with additional portions 1106(17)-(32). Furthermore, the third local system(s) 906(3) may update the third portion 1102(3) (indicated by the grey color) of the map 1104 corresponding to the third area 904(3) of the environment 902, where the third portion 1102(3) is associated with additional portions 1106(33)-(48). Moreover, the fourth local system(s) 906(4) may update the fourth portion 1102(4) (indicated by the dark grey color) of the map 1104 corresponding to the fourth area 904(4) of the environment 902, where the fourth portion 1102(4) is associated with additional portions 1106(49)-(64).

Referring back to the example of FIG. 8, and as described in more detail herein, in some examples, the map component 814(1) (and/or similarly the map component 814(N)) may perform one or more additional processes that help improve the updating of the first map. For instance, when causing an update to occur to a portion of the first map, the map component 814(1) may further cause one or more additional portions of the first map to update in order to synchronize the map updates associated with the portion of the first map with the first map as depicted by the additional portion(s). For example, the map component 814(1) may cause portions of the first map that at least partially surround the portion of the first map that is being updated to also be at least partially be updated. As such, if the map component 814(1) is updating a portion of the first map that is located proximate to a boundary between the area associated with the local system(s) 808(1) and the area associated with another local system(s), such as the local system(s) 808(N), then the map component 814(1) may cause the local system(s) 808(N) to also perform an update and/or cause at least a partial lock with respect to the local system(s) 808(N) when performing the update.

For instance, and referring back to the example of FIG. 11, in some examples, such as when the fourth local system(s) 906(4) is updating the portions 1106(40) and 1106(44) of the map 302, the fourth local system(s) 906(4) may cause the third local system 906(3) to also update at least the portions 1106(53) and 1106(57) of the map 1104. This way, the updates to the portions 1106(40) and 1106(44) of the map 1104 performed by the fourth local system(s) 906(4) may synchronize with the updates to the portions 1106(53) and 1106(57) of the map 1104 performed by the third local system(s) 906(3). However, in other examples, and again when the fourth local system(s) 906(4) is updating the portions 1106(40) and 1106(44) of the map 1104, the fourth local system(s) 906(4) may cause a lock on at least the portions 1106(53) and 1106(57) of the map 1104, which is described in more detail herein. This way, when the fourth local system(s) 906(4) is updating the portions 1106(40) and 1106(44) of the map 1104, which may include at least part of the portions 1106(53) and 1106(57) of the map 1104, the third local system(s) 906(3) is also not updating the portions 1106(53) and 1106(57) of the map 1104, which may cause problems.

Referring back to the example of FIG. 8, in some examples, the process 800 may include the local system(s) 8081(1) generating and sending update data 818(1) (and similarly the local system(s) 808(N) generating and sending update data 818(N)) to the central system(s) 802. As described herein, the update data 818(1) may represent at least one or more portions of the first map that are going to be updated, one or more portions of the first map that have been updated, one or more versions associated with the portion(s) of the first map that has been updated, one or more portions of the first map to lock from being updated, the portion(s) of the first map as updated, the data (e.g., the mapstreams) used to update the portion(s) of the first map, and/or any other data associated with updating the first map. In some examples, in addition to, or alternatively from, sending the update data 818(1) to the central system(s) 802, the local system(s) 808(1) may send the update data 818(1) directly to one or more other local systems, such as the local system(s) 808(N).

The process 800 may then include the central system(s) 802 updating log data 820 representing information associated with updates to maps. For example, the log data 820 may represent at least one or more portions of a map that are going to be updated, one or more portions of the map that have been updated, one or more versions associated with the portion(s) of the map that has been updated, one or more portions of the map to lock from being updated, the portion(s) of the map as updated, the data (e.g., the mapstreams) used to update the portion(s) of the map, and/or any other data associated with updating the map. In some examples, the log data 820 may represent the updates in an order such that other local systems 808 and/or new local systems 808 are able to replicate any updates to the map. For instance, the log data 820 may indicate that a first portion(s) of the map was updated and a version number associated with the first portion(s), followed by a second portion(s) of the map being updated and a version number associated with the second portion(s), followed by a third portion(s) of the map being updated and a version number associated with the third portion(s), and/or so forth.

Figure 12:
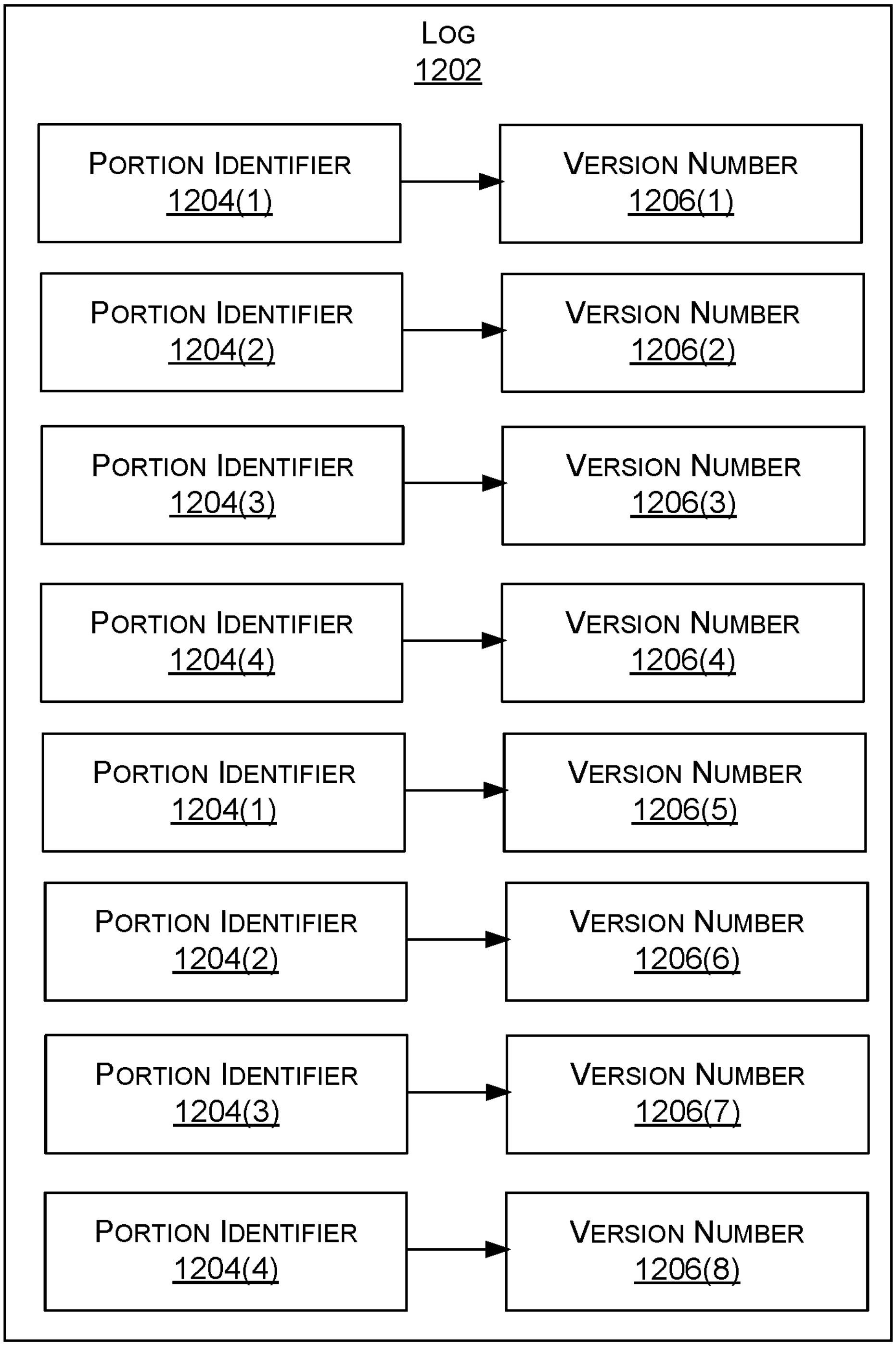
FIG. 12 illustrates an example of a log that may indicate updates to areas of a map corresponding to an environment, in accordance with some embodiments of the present disclosure.

For instance, FIG. 12 illustrates an example of a log 1202 that may indicate updates to areas of a map corresponding to an environment, in accordance with some embodiments of the present disclosure. As shown, the log 1202 may indicate that a first portion associated with a first identifier 1204(1) was updated and a first version number 1206(1) associated with the update, followed by a second portion associated with a second identifier 1204(2) being updated and a second version number 1206(2) associated with the update, followed by a third portion associated with a third identifier 1204(3) being updated and a third version number 1206(3) associated with the update, and followed by a fourth portion associated with a fourth identifier 1204(4) being updated and a fourth version number 1206(4) associated with the update. The log 1202 may also indicate an order at which the portions associated with the identifiers 1204(1)-(4) were again updated, but with new version numbers 1206(5)-(8) associated with the updates. For instance, the versions numbers 1206(1)-(8) may change, such as by being increased, with each update to a portion of a map.

Referring back to the example of FIG. 8, the process 800 may include at least the local system(s) 808(N) receiving an indication that the local system(s) 808(1) performed an update to a portion of the first map. In some examples, the local system(s) 808(N) may receive the indication from the central system(s) 802, such as when the central system(s) 802 receives the update data 818(1) from the local system(s) 808(1) and/or based on sending an inquiry to the central system(s) 802. In some examples, the local system(s) 808N) may receive the indication directly from the local system(s) 808(1), such as by receiving the update data 818(1). The local system(s) 808(N) may then determine whether to replicate the update to a portion of the second map. In some examples, the local system(s) 808(N) may always determine to replicate the update in order to ensure that an entirety of the second map is updated. In some examples, the local system(s) 808(N) may determine to replace the update based at least on the update affecting one or more portions of the second map that correspond to the area associated with the local system(s) 808(N). For example, the local system(s) 808(N) may determine to replicate updates that occur to portions of the second map that correspond to at least a portion of the area associated with the local system(s) 808(N) and/or at least a portion of neighboring areas that are proximate to the area associated with the local system(s) 808(N).

The local system(s) 808(N) may then receive the data needed to replicate the update to the second map, which may include at least a portion of the update data 818(1) and/or the log data 820. For a first example, the local system(s) 808(N) may receive the updated portion of the map, such as in the form of a snapshot. For a second example, the local system(s) 808(N) may receive the mapstreams and/or the location data used to update the portion of the first map. In any example, the process 800 may include the local system(s) 808(N) (e.g., the map component 814(N)) replicating the update to the second map using the received data. This way, even though the local system(s) 808(1) updated the portion of the first map corresponding to the area associated with the local system(s) 808(1), the local system(s) 808(N) is still able to replicate the update in order to ensure that the second map stored by the local system(s) 808(N) also includes the same updates.

For an example of replicating an update, and referring again to the example of FIG. 11, if the fourth local system(s) 906(4) updates the portions 1106(40) and 1106(44) of the map 1104, then the third local system 906(3) may be notified about the updates, such as from the fourth local system 906(4) and/or a central system(s) (e.g., the central system(s) 802). Based at least on the notification, the third local system(s) 906(3) may then receive the data necessary to also update the map 1106 as stored by the third local system(s) 906(3) since the portions 1106(40) and 1106(44) of the map 1104 correspond to the fourth area 904(4) of the environment 902 that is located proximate to the third area 904(3) associated with the third local system(s) 906(3). Additionally, the third local system(s) 906(3) may use the data to replicate the updates to the map 1104 that is stored by the third local system(s) 906(3).

Referring back to the example of FIG. 8, the process 800 may include the local systems 808 sending additional and/or alternative data to the central system(s) 802. For example, the local system(s) 808(1) may send at least a portion of the data 810(1) and/or the local system(s) 808(N) may send at least a portion of the data 810(O) to the central system(s) 802 for storage. This way, even if the local systems 808 remove the data 810, such as after updating the maps as described herein, then at least a portion of the data 810 may still be stored if later needed by the central system(s) 802 and/or at least one of the local systems 808. In other words, and in some examples, the central system(s) 802 may be configured to store the data 810 (and/or at least a portion of the data 810) for a longer period of time as compared to the local systems 808.

In some examples, the process 800 may include the local systems 808 sending additional and/or alternative data to the central system(s) 802. For instance, the local systems 808 may use processing components 822(1)-(N) (also referred to singularly as "processing component 822" or in plural as "processing components 822") to process at least a portion of the data 810 in order to generate processed data 824. In some examples, the local systems 808 generate the processed data 824 based on the occurrence of one or more events, such as based on receiving a request for the processed data 824 from the central system(s) 802. For a first example, if the central system(s) 802 is requesting a specific type of data, such as images that depict a specific type of object (e.g., traffic signs for training one or more models), then the local systems 808 may use the processing components 822 to process the data 810 in order to identify images that depict the specific type of object. The local systems 808 may then send the processed data 824 to the central system(s) 802, where the processed data 824 represents the images.

For a second example, the local systems 808 may automatically process the data 810 using the processing components 822 in order to determine one or more metrics associated with the machines 812 navigating within the environment. Additionally, the local systems 808 may continue to send processed data 824 to the central system(s) 802, where the processed data 824 represents the metrics. In any of these examples, by processing the data 810 at the local systems 808 and then only sending the processed data 824 associated with the processing to the central system(s) 802, the central system(s) 802 is still able to receive the requested processed data 824 with less data being sent to the central system(s) 802. As described throughout this application, this may provide improvements, such as reducing the amount of computing resources needed for the central system(s) 802 to still obtain the processed data 824.

The process 800 may further include the central system(s) 802 using a map component 826 (which may represent, and/or include, the map component 102) to generate and/or update a map (also referred to as a "central map") associated with the environment, where the central map is represented by map data 828. For instance, and as described herein, in some examples, the first map stored by the local system(s) 808(1) may only be partially updated, such that portions of the first map that correspond to the area associated with the local system(s) 808(1) and/or the surrounding area are updated. Additionally, the second map stored by the local system(s) 808(N) may only be partially updated, such that portions of the second map that correspond to the area associated with the local system(s) 808(N) and/or the surrounding area are updated. As such, the central map stored by the central system(s) 802 may include all of the updates for the maps stored by the local systems 808.

In some examples, the map component 826 may update the central map using at least a portion of the data 810 received by the central system(s) 802 and from the local systems 808. Additionally, or alternatively, in some examples, the map component 826 may update the central map using at least a portion of the update data 818 received by the central system(s) 802 and from the local systems 808. Still, in some examples, the central system(s) 802 may notify one or more of the local systems 808 based at least on the central map being updated. For a first example, the central system(s) 802 may notify the local system(s) 808(1) based at least on a portion of the central map being updated that is associated with a portion of the first map for which the local system(s) 808(1) keeps updated. For a second example, the central system(s) 802 may notify the local system(s) 808(N) based at least on a portion of the central map being updated that is associated with a portion of the second map for which the local system(s) 808(N) keeps updated.

As further illustrated in the example of FIG. 8, the process 800 may include the local system(s) 808(1) sending the map data 816(1) to at least a portion of the machines 812(1) navigating within the area associated with the local system(s) 808(1). The way, the machines 812(1) may have the most updated first map while navigating within the area. Additionally, the process 800 includes the local system(s) 808(N) sending the map data 816(N) to at least a portion of the machines 812(O) navigating within the area associated with the local system(s) 808(N). This way, the machines 812(O) may have the most updated second map while navigating within the area. Additionally, in some examples, by having the local systems 808 send the local maps to the local machines 812, the process 800 may again reduce the amount of computing resources (e.g., network resources) required to update the maps on the machines 812.

Figure 14:
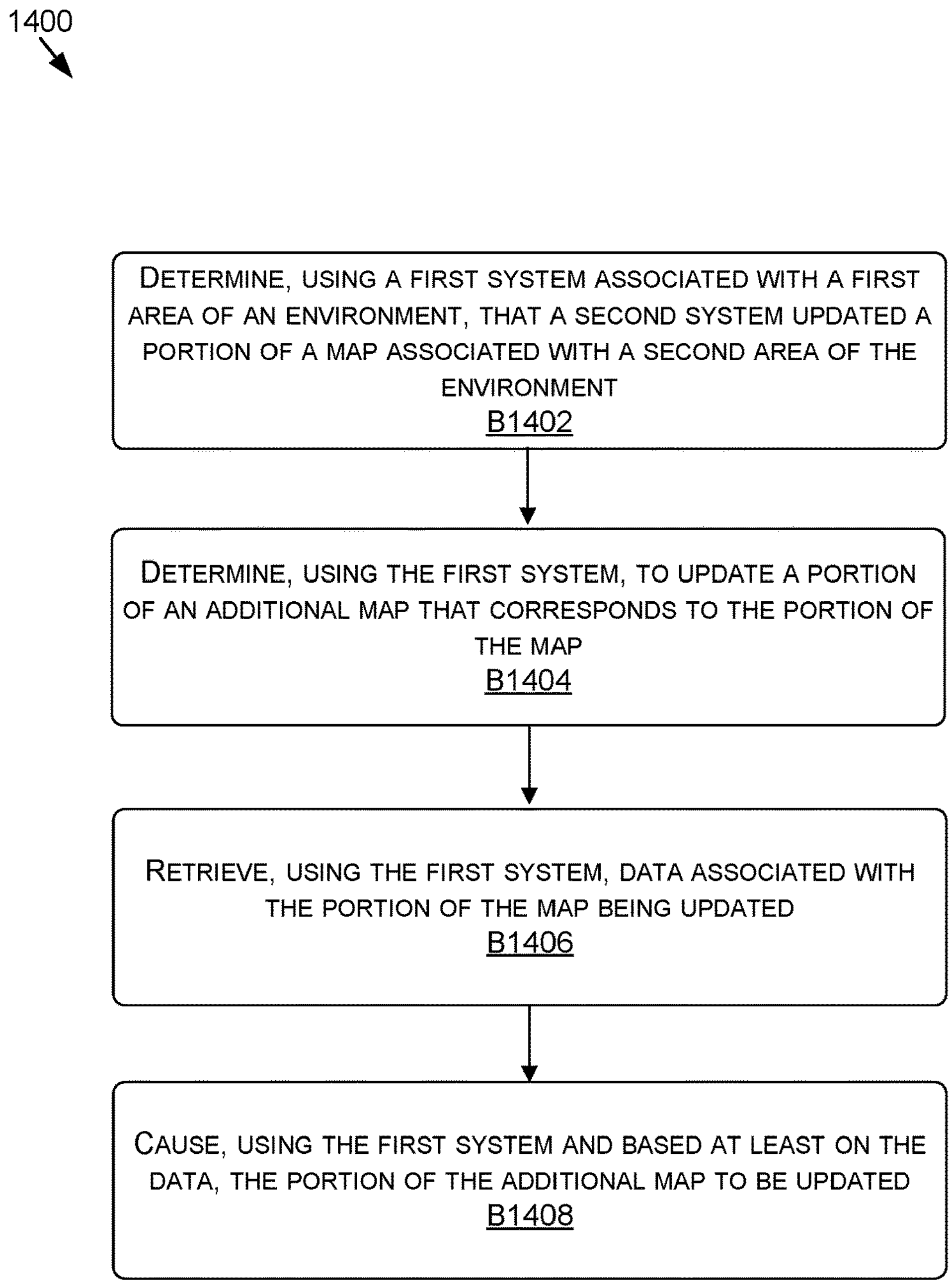
FIG. 14 illustrates a flow diagram showing a method for replicating an update associated with a portion of a map, in accordance with some embodiments of the present disclosure.

Now referring to FIGS. 13 and 14, each block of methods 1300 and 1400, described herein, comprises a computing process that may be performed using any combination of hardware, firmware, and/or software. For instance, various functions may be carried out by a processor executing instructions stored in memory. The methods 1300 and 1400 may also be embodied as computer-usable instructions stored on computer storage media. The methods 1300 and 1400 may be provided by a standalone application, a service or hosted service (standalone or in combination with another hosted service), or a plug-in to another product, to name a few. In addition, the methods 1300 and 1400 are described, by way of example, with respect to FIG. 8. However, these methods 1300 and 1400 may additionally or alternatively be executed by any one system, or any combination of systems, including, but not limited to, those described herein.

FIG. 13 illustrates a flow diagram showing a method 1300 for updating a portion of a map using a local system(s) associated with an area of an environment, in accordance with some embodiments of the present disclosure. The method 1300, at block B1302, may include receiving, using a system that is associated with a first area of an environment that is different than a second area of the environment, one or more instances of data generated using one or more machines navigating within the first area of the environment. For instance, the local system(s) 808(1) may receive the data 810(1) from one or more of the machines 812(1), where the data 810(1) includes the instance(s) of data. As described herein, the data 810(1) may include location data, map-streams, and/or any other type of data generated using the machine(s) 812(1). Additionally, the machine(s) 812(1) may send the data 810(1) to the local system(s) 808(1) based at least on the machine(s) 812(1) navigating within the first area of the environment.

The method 1300, at block B1304, may include determining, using the system and based at least on the one or more instances of data, to update at least a portion of a map corresponding to the first area of the environment. For instance, the local system(s) 808(1) (e.g., the map component 814(1)) may determine to update the portion of the map based at least on the data 810(1). In some examples, to make the determination, the local system(s) 808(1) may determine one or more metrics associated with the data 810(1). The local system(s) 808(1) may then determine that the metric(s) satisfies one or more thresholds. In some examples, before causing the update to occur, the local system(s) 808(1) may verify that there is not a lock associated with the portion of the map, such as a lock placed by one or more other local systems 808.

The method 1300, at block B1306, may include causing, using the system and based at least on the one or more instances of data, the portion of the map to be updated. For instance, the local system(s) 808(1) (e.g., the map component 814(1)) may cause the portion of the map to be updated using at least the data 810(1). As described herein, to cause the update to occur, the local system(s) 808(1) may store data associated with the update in a memory, where the data may include data identifying the portion of the map and/or the data 810(1) to use to perform the update. In some examples, the local system(s) 808(1) may perform one or more additional processes associated with the update, such as notifying the central system(s) 802 and/or the local system(s) 808(N).

FIG. 14 illustrates a flow diagram showing a method 1400 for replicating an update to a portion of a map, in accordance with some embodiments of the present disclosure. The method 1400, at block B1402, may include determining, using a first system associated with a first area of an environment, that a second system updated a portion of a map associated with a second area of the environment. For instance, the local system(s) 808(1) may determine that the local system 808(N) updated a portion of the second map. As described herein, in some examples, the local system(s) 808(1) may make the determination based at least on receiving a notification from the local system(s) 808(N) and/or the central system(s) 802 (e.g., using the log data 820).

The method 1400, at block B1404, may include determining, using the first system, to update a portion of an additional map that corresponds to the portion of the map. For instance, the local system(s) 808(1) may determine to update a portion of the first map that corresponds to the portion of the second map. As described herein, in some examples, the local system(s) 808(1) may determine to update the portion of the first map based at least on the update to the second map corresponding to an additional area of the environment that is located at least proximate to the area of the environment associated with the local system(s) 808(1). For instance, the additional area of the environment may at least partially border the area of the environment associated with the local system(s) 808(1).

The method 1400, at block B1406, may include retrieving, using the first system, data associated with the portion of the map being updated. For instance, the local system(s) 808(1) may receive the data associated with the update to the portion of the second map, where the data may include the data 810(O) and/or the update data 818(N). In some examples, the local system(s) 808(1) receives the data from the local system(s) 808(N) while, in some examples, the local system(s) 808(1) receives the data from the central system(s) 802.

The method 1400, at block B1408, may include causing, using the first system and based at least on the data, the portion of the additional map to be updated. For instance, the local system(s) 808(1) (e.g., the map component 814(1)) may cause the portion of the first map to be updated using at least the retrieved data. As described herein, to cause the update to occur, the local system(s) 808(1) may store the data associated with the update in a memory. In some examples, the local system(s) 808(1) may perform one or more additional processes associated with the update, such as notifying the central system(s) 802 and/or the local system(s) 808(N).

Figure 15:
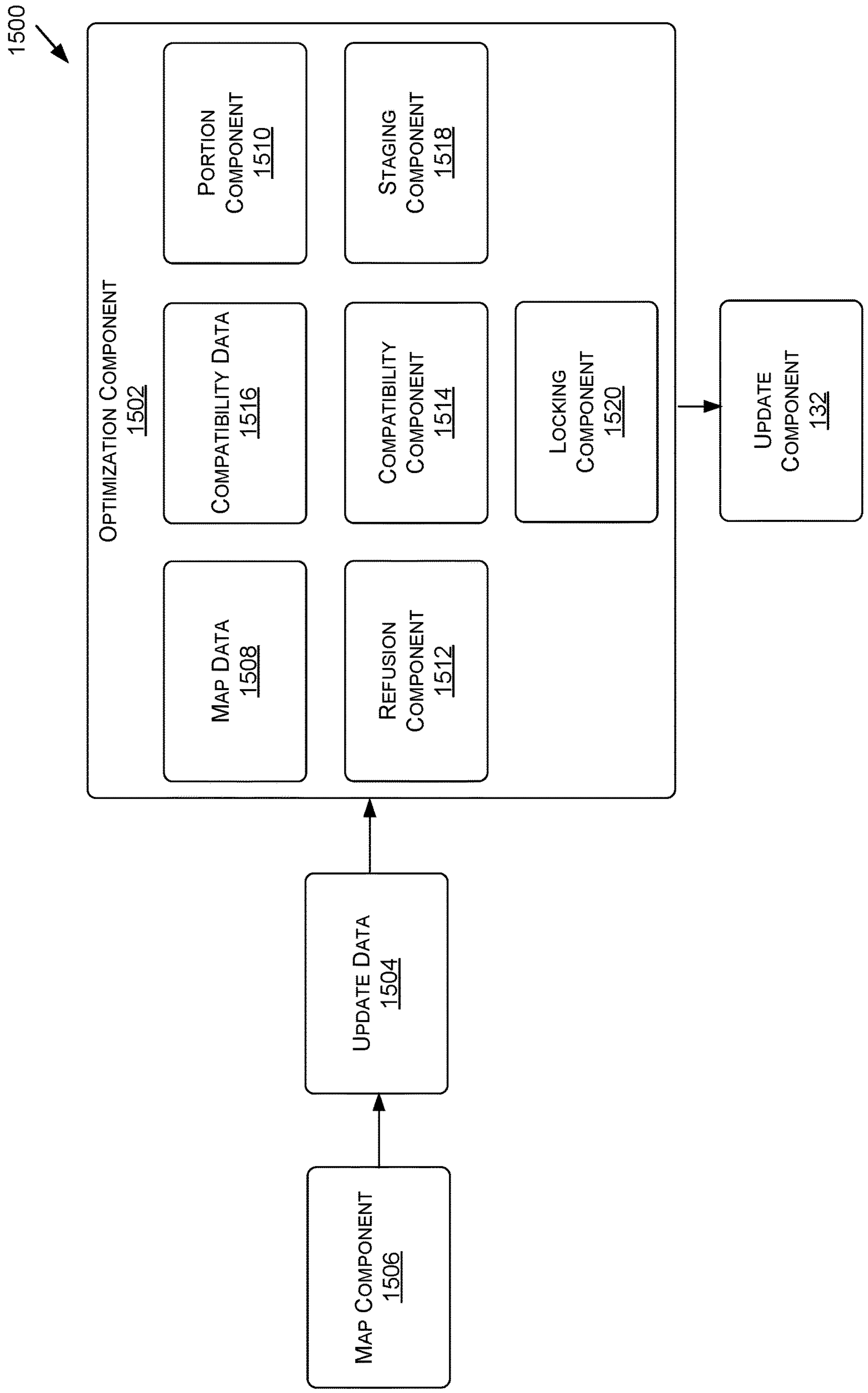
FIG. 15 illustrates an example data flow diagram for a process of updating portions of a map using one or more stages, in accordance with some embodiments of the present disclosure.

FIG. 15 illustrates an example data flow diagram for a process 1500 of updating portions of a map using one or more stages, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 2100 of FIGS. 21A-21D, example computing device 2200 of FIG. 22, and/or example data center 2300 of FIG. 23.

The process 1500 may include an optimization component 1502 receiving update data 1504 from a map component 1506 (which may represent, and/or include, one or more of the map component 102, the map component 814(1), the map component 814(N), or the map component 826). As described herein, the update data 1504 may indicate at least a portion of a map to be updated, where the map may be represented by map data 1508 (which may represent, and/or include, one or more of the map data 110, the map data 816(1), the map data 816(N), or the map data 828). For instance, the update data 1504 may represent at least an identifier associated with a portion to be updated and/or the data to use to perform the update. In some examples, the map component 1506 may determine the portion using one or more of the processes described herein.

While the example of FIG. 15 illustrates the optimization component 1502 as being separate from the map component 1506, in other examples, the map component 1506 may include the optimization component 1502. Additionally, while the example of FIG. 15 illustrates the optimization component 1502 as being separate from the update component 132, in other examples, the optimization component 1502 may include the update component 132.

The process 1500 may then include the optimization component 1502 performing one or more processes to cause the update to a portion of the map to be synchronized and/or compatible with one or more other portions of the map. For instance, the process 1500 may include the optimization component 1502 using a portion component 1510 to determine one or more portions (referred to, in some examples of FIG. 15, as the "first portion(s)") of the map to update. In some examples, the portion component 1510 may determine the first portion(s) of the map based at least on one or more identifiers of the portion(s) as represented by the update data 1504.

Figure 16:
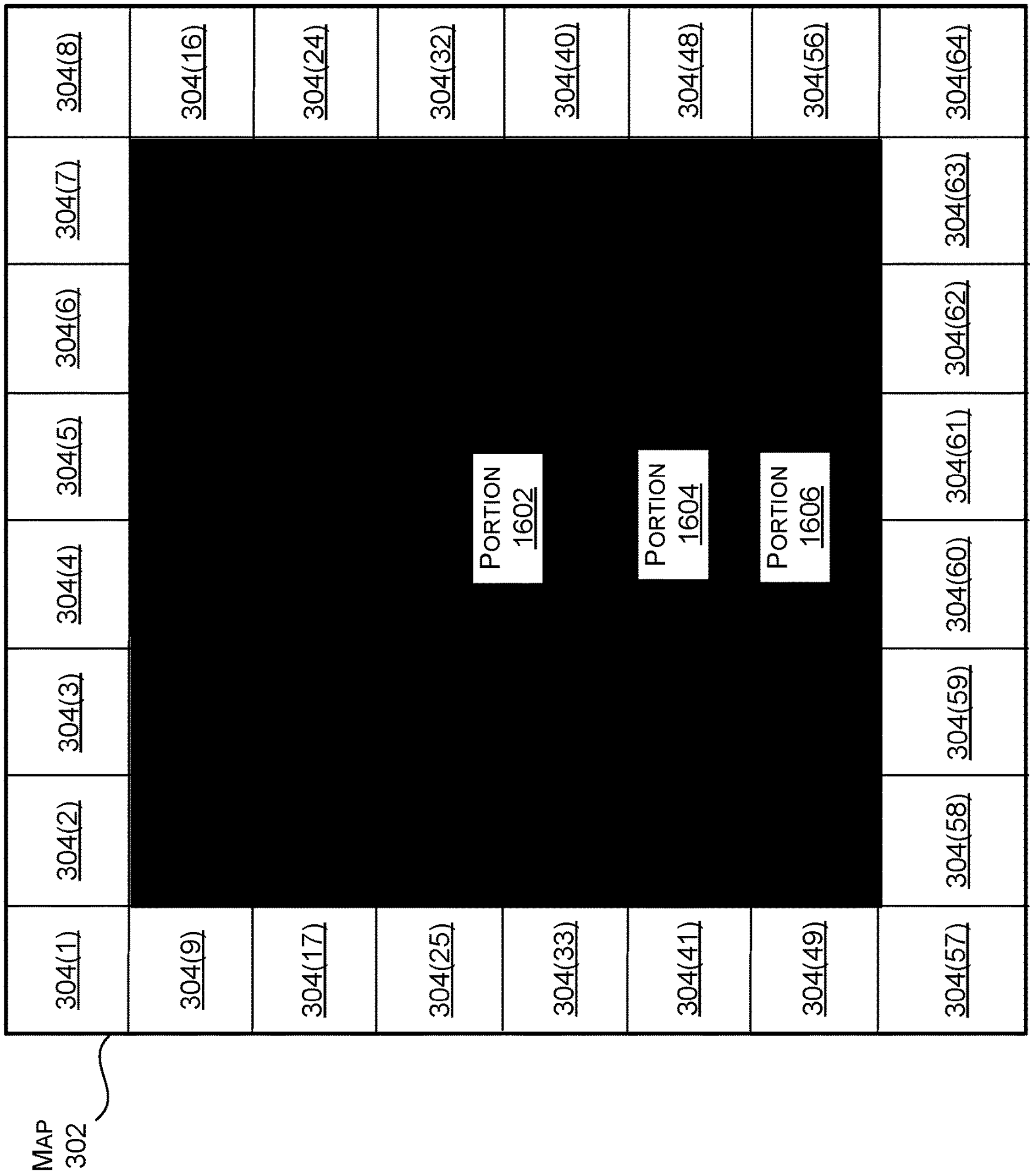
FIG. 16 illustrates an example of identifying a portion of a map for updating, in accordance with some embodiments of the present disclosure.

For instance, FIG. 16 illustrates an example of identifying a portion of a map for updating, in accordance with some embodiments of the present disclosure. As shown, the portion component 1510 may initially identify a portion 1602 of the map 302 that a map component identified as being ready for update. In the example of FIG. 16, the portion 1602 of the map 302 includes four portions 304(28), 304(29), 304 (36), and 304(37) that are configured in a square shape. However, in other example, the portion 1602 may include any number of portions 304 of the map 302. Additionally, in other example, the portion 1602 may include any other shape, such as a line shape of the portions 304 of the map 302 or a rectangular shape of the portions 304 of the map 302.

Referring back to the example of FIG. 15, the process 1500 may include the optimization component 1502 using a refusion component 1512 to determine one or more additional portions (referred to, in some examples of FIG. 15, as the "second portion(s)") of the map to update along with the first portion(s) of the map. As described herein, the refusion component 1512 may identify the second portion(s) of the map in order to ensure that the updates to the first portion(s) of the map synchronize with the surrounding portions of the map. For instance, the refusion component 1512 may identify the second portion(s) of the map as at least partially surrounding the first portion(s) of the map.

For instance, and referring back to the example of FIG. 16, the refusion component 1512 may use the portion 1602 of the map 302 in order to identify an additional portion 1604 of the map 302 for updating. As shown, the portion 1604 of the map 302 may include the portions 304(19)-(22), 304(27), 304(30), 304(35), 304(38), and 304(43)-304(46) of the map 302 that surround the portion 1602 of the map 302. While the example of FIG. 16 illustrates that the portion 1604 of the map 302 includes one portion 304 in each direction around the portion 1602 of the map 302, in other examples, the portion 1604 of the map 302 may include any number of portions 304 in any number of directions. For example, the portion 1604 of the map 302 may include two portions 304, three portions 304, five portions 304, and/or the like surrounding the portion 1602 of the map 302.

Referring back to the example of FIG. 15, the process 1500 may include the optimization component 1502 using a compatibility component 1514 to determine one or more additional portions (referred to, in some examples of FIG. 15, as the "third portion(s)") of the map to update along with the first portion(s) of the map and/or the second portion(s) of the map. As described herein, the compatibility component 1514 may identify the third portion(s) of the map in order to update compatibility data 1516 to indicate that the third portion(s) of the map is still compatible with the updated second portion(s) of the map and/or the updated first portion(s) of the map. For instance, the compatibility data 1516, which may represent one or more compatibility matrices, may be updated after the updating of the second portion(s) of the map. In some examples, the compatibility component 1514 may identify the third portion(s) of the map as at least partially surrounding the second portion(s) of the map.

For instance, and referring back to the example of FIG. 16, the compatibility component 1514 may use the portion 1604 of the map 302 in order to identify an additional portion 1606 of the map 302 for updating. As shown, the portion 1606 of the map 302 may include the portions 304(10)-(15), 304(18), 304(23), 304(26), 304(31), 304(34), 304(39), 304(42), 304(47), and 304(50)-304(55) of the map 302 that surround the portion 1604 of the map 302. While the example of FIG. 16 illustrates that the portion 1606 of the map 302 includes one portion 304 in each direction around the portion 1604 of the map 302, in other examples, the portion 1606 of the map 302 may include any number of portions 304 in any number of directions. For example, the portion 1606 of the map 302 may include two portions 304, three portions 304, five portions 304, and/or the like surrounding the portion 1604 of the map 302.

Referring back to the example of FIG. 15, the process 1500 may include the optimization component 1502 using a staging component 1518 to cause the update of the portions (e.g., the first portion(s), the second portion(s), and/or the third portion(s)) of the map using one or more stages. As described more herein, in some examples, the staging component 1518 may cause the update to occur using a single stage of locking. Additionally, or alternatively, in some examples, the staging component 1518 may cause the update to occur using multiple stages of locking, such as two stages of locking.

In any of the examples, the process 1500 may include the optimization component 1502 using a locking component 1520 to cause states associated with the portions and/or compatibility data 1516 being updated to switch from at least a first state to a second state. As described herein, in some examples, the first state for a portion of the map may include an unlocked state in which the update component 132 is not able to update the portion of the map and/or other systems and/or components are able to retrieve the portion of the map for updating. Additionally, the second state for the portion of the map may include a locked state in which the update component 132 is able to update the portion of the map and/or other systems and/or components are not able to retrieve the portion of the map for updating. For example, while the portions of the map are in the second state, other system(s) and/or components may not retrieve the portions of the map to also update the portions of the map.

For instance, FIG. 17A illustrates an example of updating portions 1702(1)-(24) (also referred to singularly as "portion 1702" or in plural as "portions 1702") of a map using a single stage of locking, in accordance with some embodiments of the present disclosure. In the example of FIG. 17A, the columns may be associated with the portions 1702 of a map. For instance, the portions 1702 may correspond to a row of the portions 304 of the map 302. For example, the portions 1702(3)-(10) may correspond respectively to the portions 304(33)-(40) of the map 302. Additionally, the rows may correspond to different time intervals T(1)-(9).

As such, during the single stage of locking, the optimization component 1502 (e.g., the portion component 1510) may determine that the portions 1702(5)-(8) and the portions 1702(17)-(20) are to be updated during the first time interval T(1), which is respectively indicated by A and B. As such, the optimization component 1502 (e.g., the refusion component 1512) may determine that refusion needs to occur with the portions 1702(3)-(10) for the portions 1702(5)-(8) and needs to occur with the portions 1702(15)-(22) for the portions 1702(17)-(20) during the second time interval T(2), which is respectively indicated by RA and RB. Furthermore, the optimization component 1502 (e.g., the compatibility component 1514) may determine that optimization needs to occur with the portions 1702(2)-(11) for the portions 1702(5)-(8) and needs to occur with the portions 1702(14)-(23) for the portions 1702(17)-(20) during the third time interval T(3), which is respectively indicated by LA and LB.

As such, and as described herein, the optimization component 1502 (e.g., the locking component 1520) may cause the portions 1702(2)-(11) and the portions 1702(14)-(23) to switch from being associated with the first state (e.g., the unlocked state) to being associated with the second state (e.g., the locked state) during at least a portion of the instances in time T(1)-(3) to perform the updates. As described herein, the update at the first time interval T(1) may include updating the content (e.g., the locations of objects) of the portions 1702(5)-(8) and the portions 1702(17)-(20). The update at the second time interval T(2) may then include updating the content (e.g., the locations of objects) of the portions 1702(3)-(10) and the portions 1702(15)-(22) in order to synchronize the updates. For example, the update may include connecting one or more roads between at least the portion 1702(8) and the portion 1702(9).

Additionally, the update at the third time interval T(3) may include updating data (e.g., compatibility matrices) associated with the portions 1702(2)-(11) and the portions

1702(14)-(23) in order to indicate that the portions 1702(2)-(11) are still compatible after the content updates to the portions 1702(3)-(10) and the portions 1702(14)-(23) are still compatible after the content updates to the portions 1702(15)-(22). For example, since the content of the portion 1702(10) was at least partially updated and the content of the portion 1702(11) was not updated, then the data (e.g., the compatibility matrix) for the portion 1702(10) may be updated to indicate that the updated portion 1702(10) is still compatible with the portion 1702(11) and the data (e.g., the compatibility matrix) for the portion 1702(11) may be updated to indicate that the portion 1702(11) is still compatible with the updated portion 1702(10). In some examples, the data may be updated since the part of the portion 1702(10) that is proximate to the border between the portions 1702(10)-(11) (which may be indicated by the line between the portions 1702(10)-(11)) was not updated. As such, any objects, such as roads, that stretch between the portions 1702(10)-(11) should still be accurately represented by the map.

In some examples, after performing the updates to the portions 1702(2)-(11) and the portions 1702(14)-(23), the optimization component 1502 (e.g., the locking component 1520) may cause the portions 1702(2)-(11) and the portions 1702(14)-(23) to switch from being associated with the second state to being associated with the first state. Additionally, the optimization component 1502 may then perform similar processes with respect to the portions 1702(6)-15) and the portions 1702(18)-(24) during the time intervals T(4)-(6), which is indicated by C, RC, LC, D, RD, and LD, and with respect to the portions 1702(1)-(7) and the portions 1702(10)-(19) during the time intervals T(7)-(9), which is indicated by E, RE, LE, F, RF, and LF. As such, in order to update the portions 1702 of the map using the single stage of locking, the optimization component 1502 may use three separate updating processes.

FIG. 17B illustrates an example of updating the portions 1702 of the map using multiple stages of locking, in accordance with some embodiments of the present disclosure. Similar to the example of FIG. 17A, in the example of FIG. 17B, the columns may be associated with portions 1702 of a map. For instance, the portions 1702 may correspond to a row of the portions 304 of the map 302. For example, the portions 1702(3)-(10) may correspond respectively to the portions 304(33)-(40) of the map 302. Additionally, the rows may correspond to different time intervals T(1)-(12).

During the multiple stages of locking, the optimization component 1502 (e.g., the portion component 1510) may determine that the portions 1702(5)-(8), the portions 1702(13)-(16), and the portions 1702(21)-(24) are to be updated the first time interval T(1), which is respectively indicated by A, B, and C. As such, the optimization component 1502 (e.g., the refusion component 1512) may determine that refusion needs to occur with the portions 1702(3)-(10) for the portions 1702(5)-(8), needs to occur with the portions 1702(11)-(18) for the portions 1702(13)-(16), and needs to occur with the portions 1702(19)-(24) for the portions 1702(21)-(24) at the second time interval T(2), which is respectively indicated by RA, RB, and RC. As such, during a first locking stage that is occurs during the time intervals T(1)-(3), the optimization component 1502 (e.g., the locking component 1520) may determine to switch the portions 1702(3)-(10), the portions 1702(11)-(18), and the portions 1702(19)-(24) from being associated with the first state to being associated with the second state, which is respectively indicated by LCA, LCB, and LCC, in order to provide content updates.

While the portions 1702(3)-(24) are locked during the first locking stage, the portions 1702(5)-(8), the portions 1702(13)-(16), and the portions 1702(21)-(24) are then updated during the first time intervals T(1). As described herein, the updates at the first time interval T(1) may include updating the content (e.g., the locations of objects) of the portions 1702(5)-(8), the portions 1702(13)-(16), and the portions 1702(21)-(24). Additionally, while the portions 1702(3)-(24) are locked during the first locking stage, the portions 1702(3)-(10), the portions 1702(11)-(18), and the portions 1702(19)-(24) are updated in order to synchronization updates. For instance, the update at the second time interval T(2) may then include updating the content (e.g., the locations of objects) of the portions 1702(3)-(10), the portions 1702(11)-(18), and the portions 1702(19)-(24) in order to synchronize the updates. For example, the update may include connecting one or more roads between at least the portion 1702(8) and the portion 1702(9).

After the content updates are complete, the optimization component 1502 (e.g., the locking component 1520) may determine to switch the portions 1702(3)-(10), the portions 1702(11)-(18), and the portions 1702(19)-(24) from being associated with the second state to being associated with the first state. A second locking stage that occurs during the time intervals T(4)-(6) may then include updating the data (e.g., the compatibility matrices) associated with the portions 1702(2)-(11), the portions 1702(10)-(19), and the portions 1702(18)-(24) to reflect the updates using different stages. For instance, during the fourth time interval T(4), the optimization component 1502 (e.g., the locking component 1520) may cause the portions 1702(2)-(11) and/or the data associated with the portions 1702(2)-(11) to switch from being associated with the first state to being associated with the second state, which is represented by LMA. The optimization component 1502 may then cause the data to update to indicate that the portions 1702(2)-(11) are still compatible after the updates to the portions 1702(3)-(10). After performing the updates, the optimization component 1502 (e.g., the locking component 1520) may cause the portions 1702(2)-(11) and/or the data associated with the portions 1702(2)-(11) to switch from being associated with the second state to being associated with the first state.

Additionally, during the fifth time interval T(5), the optimization component 1502 (e.g., the locking component 1520) may cause the portions 1702(10)-(19) and/or the data associated with the portions 1702(10)-(19) to switch from being associated with the first state to being associated with the second state, which is represented by LMB. The optimization component 1502 may then cause the data to update to indicate that the portions 1702(10)-(19) are still compatible after the updates to the portions 1702(11)-(18). After performing the updates, the optimization component 1502 (e.g., the locking component 1520) may cause the portions 1702(10)-(19) and/or the data associated with the portions 1702(10)-(19) to switch from being associated with the second state to being associated with the first state. Furthermore, during the fifth time instance T(5), the optimization component 1502 (e.g., the locking component 1520) may cause the portions 1702(18)-(24) and/or the data associated with the portions 1702(18)-(24) to switch from being associated with the first state to being associated with the second state, which is represented by LMC. The optimization component 1502 may then cause the data to update to indicate that the portions 1702(18)-(24) are still compatible after the updates to the portions 1702(19)-(24). After performing the updates, the optimization component 1502 (e.g., the locking component 1520) may cause the portions 1702(18)-(24)

and/or the data associated with the portions 1702(18)-(24) to switch from being associated with the second state to being associated with the first state.

In some examples, the optimization component 1502 is able to perform the multiple stage updates based on one or more rules. For instance, a first rule may include not updating parts of portions 1702 that are located proximate to one another and in different groups. For example, the parts of portion 1702(10) (which is included in group A) and portion 1702(11) (which is included in group B) that border one another may not be updated in order to keep the portions 1702(10)-(11) compatible. Additionally, and for similar reasons, the updates to the data for the portions 1702(10)-(11) during the fourth time interval T(4) may indicate that the updated portion 1702(10) is still compatible with the portion 1702(11) and the updates to the data for the portions 1702(10)-(11) during the fifth time interval T(5) may indicate that the updated portion 1702(11) is still compatible with the portion 1702(10).

Additionally, a second rule may indicate that the order to the locking remains the same in order to avoid a deadlock situation. For instance, the second rule may indicate that the content locks occur first follow by the data locks. Additionally, the second rule may indicate that the data locks occur one after the other, as shown by the example of FIG. 17B. For instance, the second rule may indicate that the content locks occur during the first locking stage and the data locks (e.g., the compatibility matrices) occur during the second locking stage.

As further illustrated by the example of FIG. 17B, after updating the portions 1702(5)-(8), the portions 1702(12)-(16), and the portions 1702(21)-(24), the optimization component may perform similar processes with respect to the portions 1702(1)-(4), the portions 1702(9)-(11), and the portions 1702(17)-20) during the time intervals T(7)-(12), which is indicated by D, RD, LCD, LMD, E, RE, LCE, LME, F, RF, LCF, and LMF. As such, in order to update the portions 1702 of the map, the optimization component 1502 may use only use two separate updating processes as compared to the three separate updating processes from the example of FIG. 17A. As such, even though the process of FIG. 17A includes performing nine different types of processing at nine different time intervals T(1)-(9), the process of FIG. 17B may be quicker even though the process includes performing twelve different processes at twelve different time intervals T(1)-(12).

For instance, in some examples, the content updates associated with the selected portions 1702, as indicated by A, B, C, D, E, and F, may take the longest time to perform. As such, since the process in the example of FIG. 17B is able to perform these content updates using only two separate time intervals T(1) and T(7), the process in the example of FIG. 17A may take longer since it performs these content updates using three separate time intervals T(1), T(4), and T(7). Additionally, in some examples, the content updates associated with the refusion, as indicated by RA, RB, RC, RD, RE, and RF, may take the second longest time to perform. As such, since the process in the example of FIG. 17B is able to perform these content updates again using only two separate time intervals T(2) and T(8), the process in the example of FIG. 17A may take longer since it performs these content updates using three separate time intervals T(2), T(5), and T(8).

Furthermore, in some examples, the data updates, as indicated by LA, LB, LC, LD, LE, and LF in the example of FIG. 17A and LMA, LMB, LMC, LMD, LME, and LMF in the example of FIG. 17B, may take the shortest time intervals to perform. As such, even though the process in the example of FIG. 17B is able to perform these data updates using six separate time intervals T(4)-(6) and T(9)-(12) and the process of FIG. 17A is able to perform these data updates using three separate time intervals T(3), T(6), and T(9), the overall time it takes to perform the process of FIG. 17B is still shorter than the overall time it takes to perform the process of FIG. 17A.

Figure 18A:
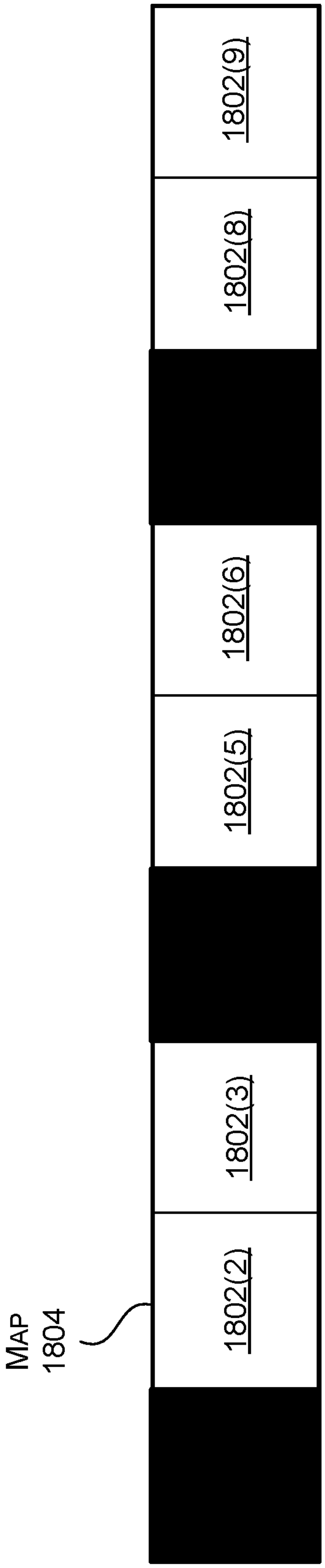
FIGS. 18A-18B illustrate one-dimensional examples of updating portions of a map that corresponds to an environment, in accordance with some embodiments of the present disclosure.

Now referring to FIG. 18A, FIG. 18A illustrates a first one-dimensional example of updating portions 1802(1)-(9) (also referred to singularly as "portion 1802" or in plural as "portions 1802") of a map 1804 associated with an environment, in accordance with some embodiments of the present disclosure. In the example of FIG. 18A, one or more (e.g., each) of the portions 1802 of the map 1804 may be similar to any of the portions described herein, such as the portions 1602-1606 of the map 302. As shown, during a first time interval, the optimization component 1502 may cause the portion 1802(1), the portion 1802(4), and the portion 1802(7) to update, as indicated by the grey shading. Additionally, during a second time interval, the optimization component 1502 may cause the portion 1802(2), the portion 1802(5), and the portion 1802(8) to update. Furthermore, during a third time interval, the optimization component 1502 may cause the portion 1802(3), the portion 1802(5), and the portion 1802(9) to update. In some examples, the optimization component 1502 causes the updates to the portions 1802 using the single stage of locking technique in the example of FIG. 18A.

Figure 18B:
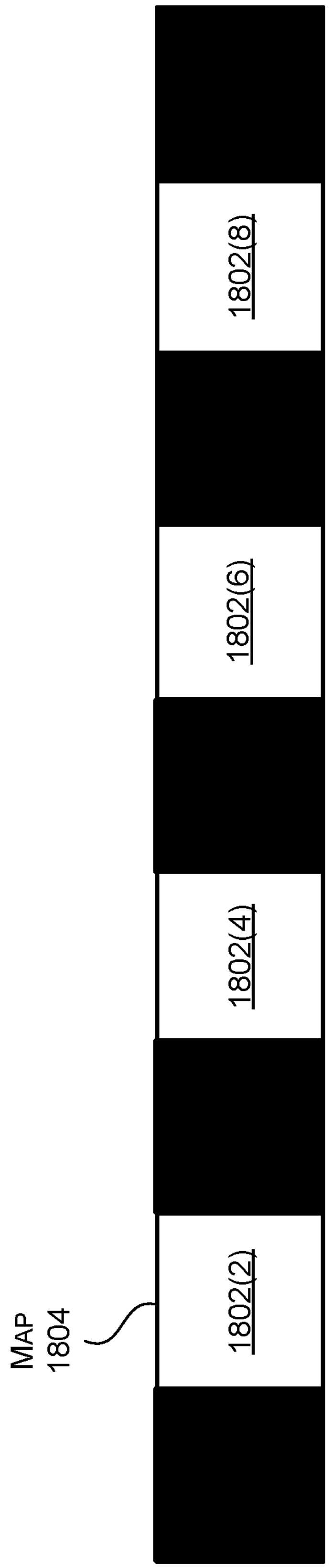

FIG. 18B illustrates a second one-dimensional example of updating the portions 1802 of the map 1804 associated with an environment, in accordance with some embodiments of the present disclosure. In the example of FIG. 18B, during a first time interval, the optimization component 1502 may cause the portion 1802(1), the portion 1802(3), the portion 1802(5), the portion 1802(7), and the portion 1802(9) to update, as indicated by the grey shading. Additionally, during a second time interval, the optimization component 1502 may cause the portion 1802(2), the portion 1802(4), the portion 1802(6), and the portion 1802(8) to update. In some examples, the optimization component 1502 causes the updates to the portions 1802 using the multiple stages of locking technique in the example of FIG. 18B.

Figure 18C:
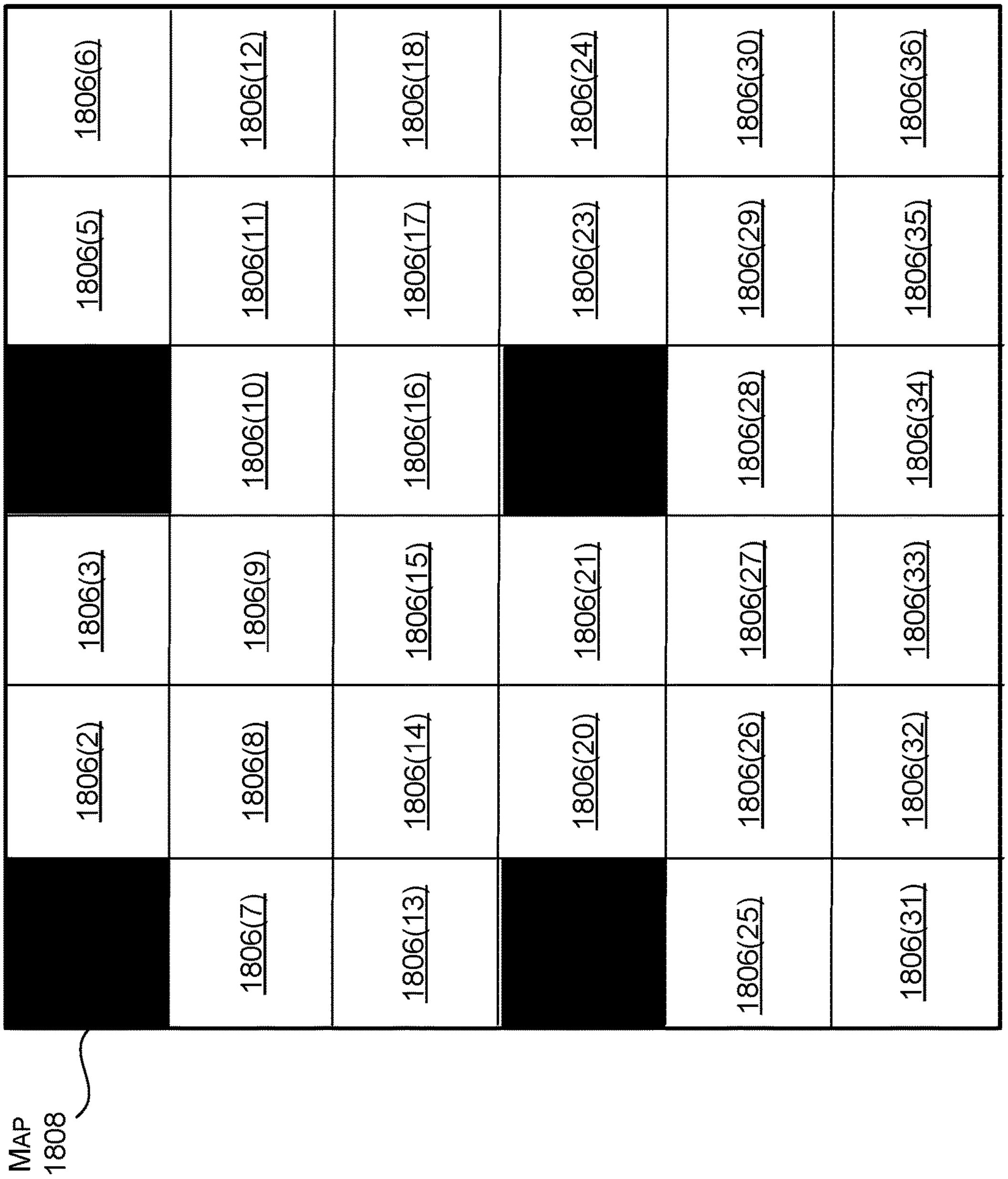
FIGS. 18C-18D illustrate two-dimensional examples of updating portions of a map that corresponds to an environment, in accordance with some embodiments of the present disclosure.

FIG. 18C illustrates a first two-dimensional example of updating portions 1806(1)-(36) (also referred to singularly as "portion 1806" or in plural as "portions 1806") of a map 1808 associated with an environment, in accordance with some embodiments of the present disclosure. Similar to the examples of FIGS. 18A-18B, in the example of FIG. 18C, one or more (e.g., each) of the portions 1806 of the map 1804 may be similar to any of the portions described herein, such as the portions 1602-1606 of the map 302.

As shown, the optimization component 1502 may initially cause updates to portions 1806 associated with first rows. For instance, during a first time interval, the optimization component 1502 may cause the portion 1806(1), the portion 1806(4), the portion 1806(19), and the portion 1806(22) to update, as indicated by the grey shading. Additionally, during a second time interval, the optimization component 1502 may cause the portion 1802(2), the portion 1802(5), the portion 1802(20), and the portion 1806(23) to update. Furthermore, during a third time interval, the optimization component 1502 may cause the portion 1802(3), the portion 1802(5), the portion 1802(21), and the portion 1802(24) to update.

The optimization component 1502 may then cause updates to portions 1806 associated with second rows. For instance, during a fourth time interval, the optimization component 1502 may cause the portion 1806(7), the portion 1806(10), the portion 1806(25), and the portion 1806(28) to update. Additionally, during a fifth time interval, the optimization component 1502 may cause the portion 1802(8), the portion 1802(11), the portion 1802(26), and the portion 1806(29) to update. Furthermore, during a sixth time interval, the optimization component 1502 may cause the portion 1802(9), the portion 1802(11), the portion 1802(27), and the portion 1802(30) to update.

The optimization component 1502 may then cause updates to portions 1806 associated with third rows. For instance, during a seventh time interval, the optimization component 1502 may cause the portion 1806(13), the portion 1806(16), the portion 1806(31), and the portion 1806 (34) to update. Additionally, during an eighth time interval, the optimization component 1502 may cause the portion 1802(14), the portion 1802(17), the portion 1802(32), and the portion 1806(35) to update. Furthermore, during a ninth time interval, the optimization component 1502 may cause the portion 1802(15), the portion 1802(18), and the portion 1802(33), and the portion 1802(36) to update. In some examples, the optimization component 1502 causes the updates to the portions 1802 using the single stage of locking technique in the example of FIG. 18C.

Figure 18D:
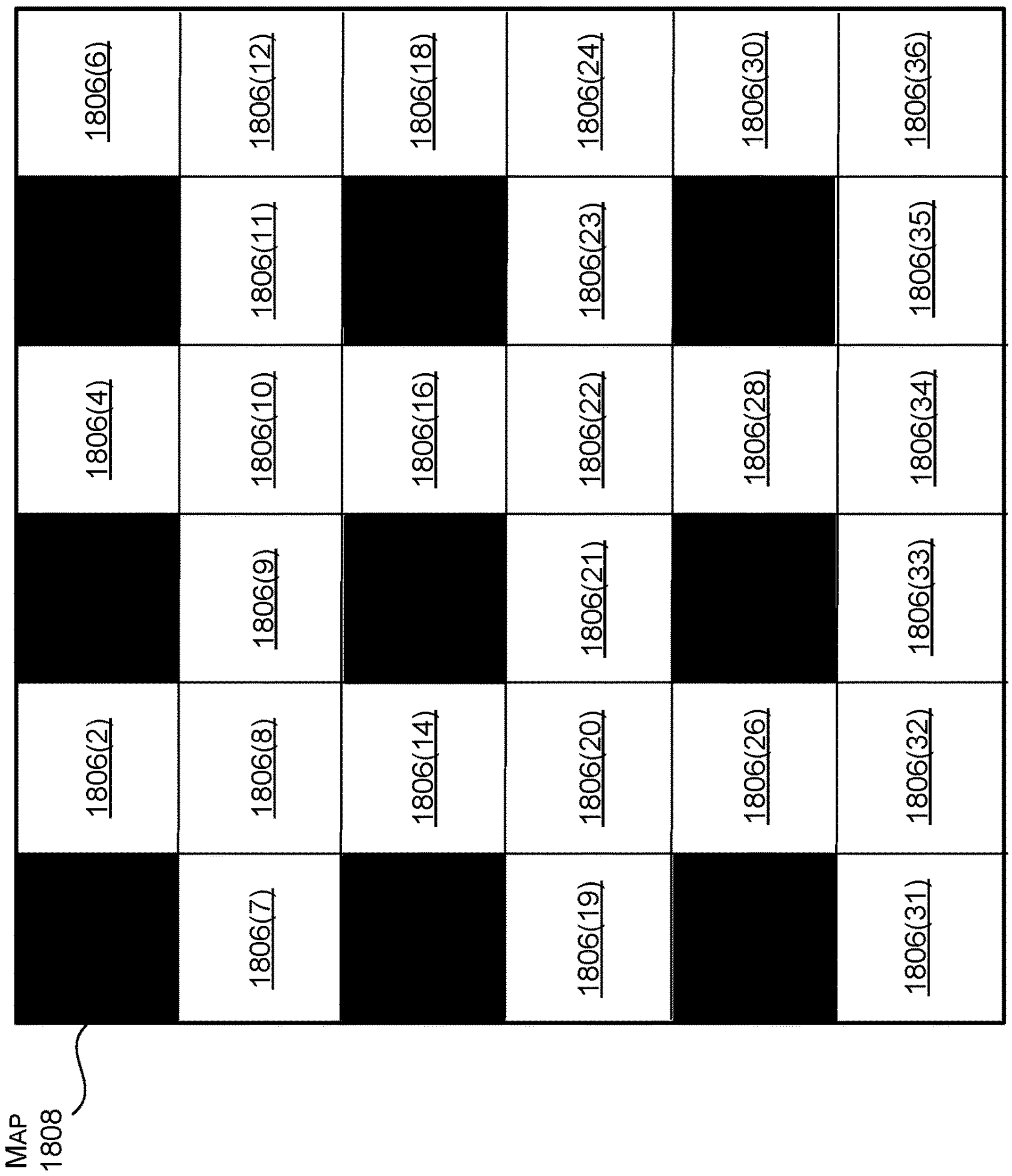

FIG. 18D illustrates a second two-dimensional example of updating portions 1806 of the map 1808 associated with an environment, in accordance with some embodiments of the present disclosure. As shown, the optimization component 1502 may initially cause updates to portions 1806 associated with first rows. For instance, during a first time interval, the optimization component 1502 may cause the portion 1806(1), the portion 1806(3), the portion 1806(5), the portion 1806(13), the portion 1806(15), the portion 1806(17), the portion 1806(25), the portion 1806(27), and the portion 1806(29) to update, as indicated by the grey shading. Additionally, during a second time interval, the optimization component 1502 may cause the portion 1802 (2), the portion 1802(4), the portion 1802(6), the portion 1806(14), the portion 1806(16), the portion 1806(18), the portion 1806(26), the portion 1806(28), and the portion 1806(30) to update.

The optimization component 1502 may then cause updates to portions 1806 associated with second rows. For instance, during a third time interval, the optimization component 1502 may cause the portion 1806(7), the portion 1806(9), the portion 1806(11), the portion 1806(19), the portion 1806(21), the portion 1806(23), the portion 1806 (31), the portion 1806(33), and the portion 1806(35) to update. Additionally, during a fourth time interval, the optimization component 1502 may cause the portion 1802 (8), the portion 1802(10), the portion 1802(12), the portion 1806(20), the portion 1806(22), the portion 1806(24), the portion 1806(32), the portion 1806(34), and the portion 1806(36) to update. In some examples, the optimization component 1502 causes the updates to the portions 1802 using the multiple stages of locking technique in the example of FIG. 18D.

Figure 19:
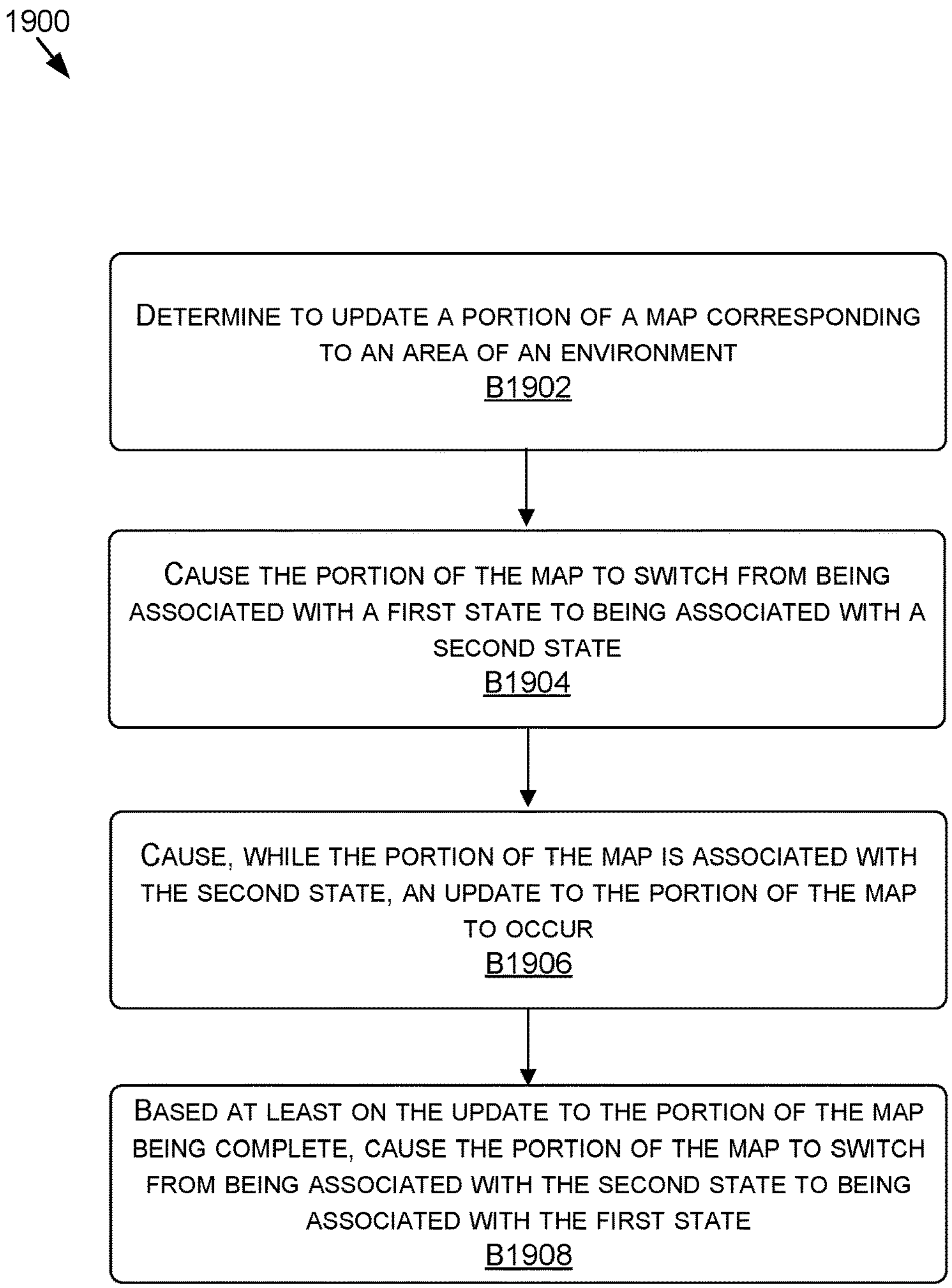
FIG. 19 illustrates a flow diagram showing a method to updating a portion of a map using one or more stages of locking, in accordance with some embodiments of the present disclosure.

Now referring to FIGS. 19 and 20, each block of methods 1900 and 2000, described herein, comprises a computing process that may be performed using any combination of hardware, firmware, and/or software. For instance, various functions may be carried out by a processor executing instructions stored in memory. The methods 1900 and 2000 may also be embodied as computer-usable instructions stored on computer storage media. The methods 1900 and 2000 may be provided by a standalone application, a service or hosted service (standalone or in combination with another hosted service), or a plug-in to another product, to name a few. In addition, the methods 1900 and 2000 are described, by way of example, with respect to FIG. 15. However, these methods 1900 and 2000 may additionally or alternatively be executed by any one system, or any combination of systems, including, but not limited to, those described herein.

FIG. 19 illustrates a flow diagram showing a method 1900 to updating a portion of a map using one or more stages of locking, in accordance with some embodiments of the present disclosure. The method 1900, at block B1902, may include determining to update a portion of a map corresponding to an area of an environment. For instance, the optimization component 1502 (e.g., the portion component 1510) may determine to the update the portion of the map. As described herein, in some examples, the optimization component 1502 (e.g., the refusion component 1512) may further determine to update one or more related portions of the map, such as one or more surrounding portions of the map for refusion. Furthermore, in some examples, the optimization component 1502 may determine one or more additional portion of the map to update along with the portion of the map, such as by updating the portions 1702 (5)-(8) with the portions 1702(13)-(16).

The method 1900, at block B1904, may include causing the portion of the map to switch from being associated with a first state to being associated with a second state. For instance, the optimization component 1502 (e.g., the locking component 1520) may cause the portion of the map to switch from being associated with the first state to being associated with the second state. As described herein, in some examples, the first state for a portion of the map may include an unlocked state in which the update component 132 is not able to update the portion of the map and/or other systems and/or components are able to retrieve the portion of the map for updating. Additionally, the second state for the portion of the map may include a locked state in which the update component 132 is able to update the portion of the map and/or other systems and/or components are not able to retrieve the portion of the map for updating.

The method 1900, at block B1906, may include causing, while the portion of the map is associated with the second state, an update to the portion of the map. For instance, the optimization component 1502 may cause the portion of the map to be updated while the portion of the map is associated with the second state. As described herein, in some examples, to cause the update, the optimization component 1502 may store data (e.g., location data, mapstreams, etc.) associated with the update in one or more memories, such as a queue. Additionally, in some examples, such as when performing a single stage of locking, the optimization component 1502 may cause compatibility data 1516 associated with the portion and/or one or more related portions to also update.

The method 1900, at block B1908, may include, based at least on the update to the portion of the map being complete, causing the portion of the map to switch from being associated with the second state to being associated with the first state. For instance, once the update is complete, the optimization component 1502 (e.g., the locking component 1520) may cause the portion of the map to switch from being associated with the second state to being associated with the first state. Additionally, in some examples, such as when performing multiple stages of locking, the optimization component 1502 (e.g., the locking component 1520) may cause the compatibility data 1516 to switch from being associated with the first state to being associated with the second state. The optimization component 1502 may then cause the data to also update.

FIG. 20 illustrates a flow diagram showing a method 2000 for updating portions of a map multiple stages of locking, in accordance with some embodiments of the present disclosure. The method 2000, at block B2002, may include causing, during a first time interval, at least a first portion and a second portion of a map to be updated. For instance, the optimization component 1502 may cause the first portion and the second portion of the map to be updated during the first time interval. As described herein, in some examples, the optimization component 1502 (e.g., the locking component 1520) may initially cause the first portion and/or the second portion of the map to switch from being associated with the first state to being associated with the second state before causing the update to the first portion and/or the second portion.

The method 2000, at block B2004, may include causing, during a second time interval, first data associated with the first portion to be updated to indicate that the first portion as updated is compatible with the second portion. For instance, the optimization component 1502 may cause first compatibility data 1516 associated with the first portion to be updated to indicate that the first portion as updated is still compatible with the second portion. As described herein, in some examples, the optimization component 1502 (e.g., the locking component 1520) may initially cause the first portion and/or the second portion of the map to switch from being associated with the second state to being associated with the first state before causing the update to the first compatibility data 1516. Additionally, in some examples, the optimization component 1502 (e.g., the locking component 1520) may initially cause the first compatibility data 1516 to switch from being associated with the first state to being associated with the second state before causing the update to the first compatibility data 1516.

The method 2000, at block B2006, may include causing, during a third time interval, second data associated with the second portion to be updated to indicate that the second portion as updated is compatible with the first portion. For instance, the optimization component 1502 may cause second compatibility data 1516 associated with the second portion to be updated to indicate that the second portion as updated is still compatible with the first portion. As described herein, in some examples, the optimization component 1502 (e.g., the locking component 1520) may initially cause the first compatibility data 1516 to switch from being associated with the second state to being associated with the first state before causing the update to the second compatibility data 1516. Additionally, in some examples, the optimization component 1502 (e.g., the locking component 1520) may initially cause the second compatibility data 1516 to switch from being associated with the first state to being associated with the second state before causing the update to the second compatibility data 1516.

Example Autonomous Vehicle

Figure 21A:
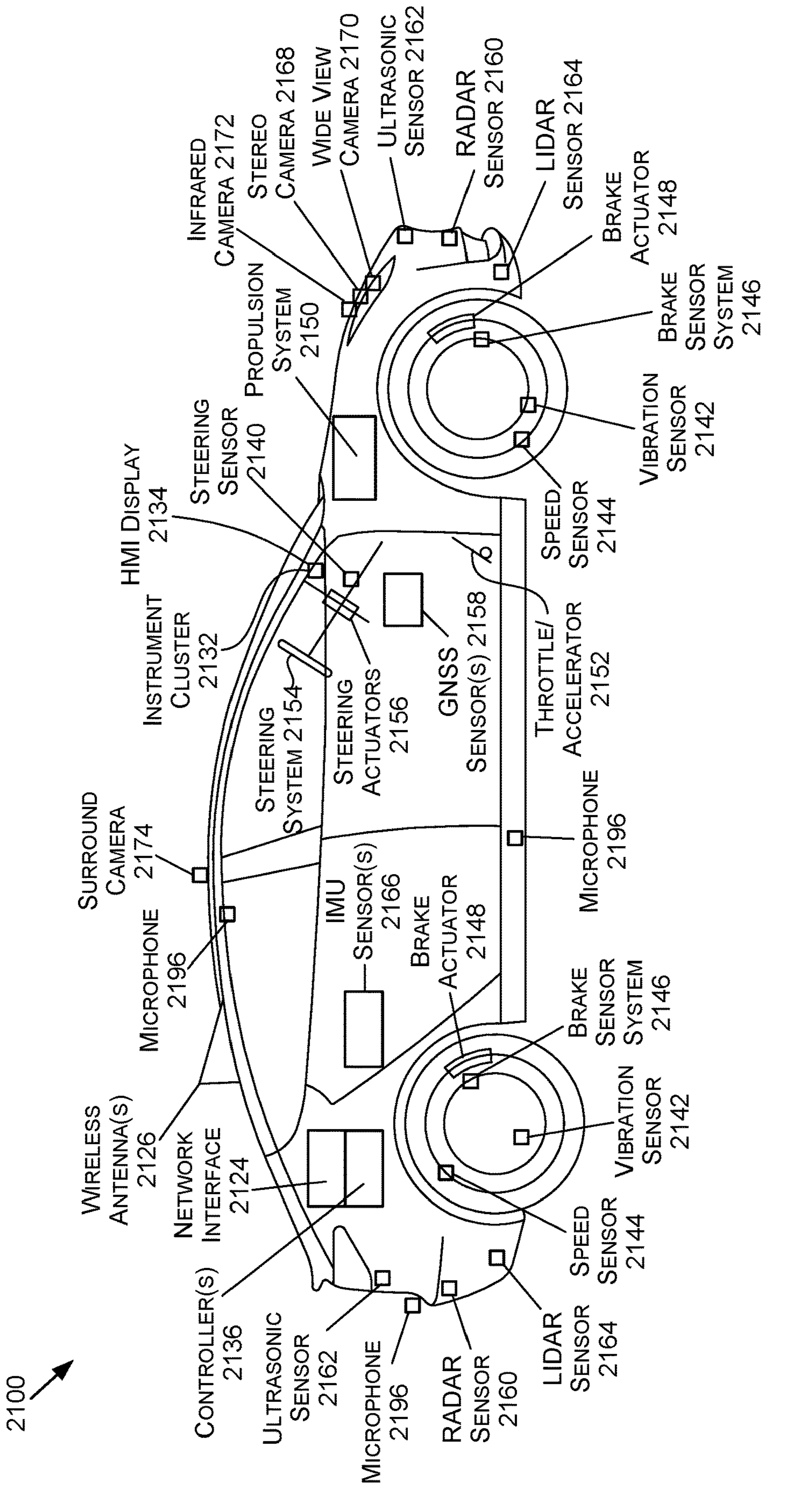
FIG. 21A is an illustration of an example autonomous vehicle, in accordance with some embodiments of the present disclosure.

FIG. 21A is an illustration of an example autonomous vehicle 2100, in accordance with some embodiments of the present disclosure. The autonomous vehicle 2100 (alternatively referred to herein as the "vehicle 2100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 2100 may be capable of functionality in accordance with one or more of Level 3-Level 5 of the autonomous driving levels. The vehicle 2100 may be capable of functionality in accordance with one or more of Level 1-Level 5 of the autonomous driving levels. For example, the vehicle 2100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 2100 or other machine, such as being fully autonomous, being highly autonomous, being conditionally autonomous, being partially autonomous, providing assistive autonomy, being semi-autonomous, being primarily autonomous, or other designation.

The vehicle 2100 may include components such as a chassis, a vehicle body, wheels (e.g., 2, 4, 6, 8, 18, etc.), tires, axles, and other components of a vehicle. The vehicle 2100 may include a propulsion system 2150, such as an internal combustion engine, hybrid electric power plant, an all-electric engine, and/or another propulsion system type. The propulsion system 2150 may be connected to a drive train of the vehicle 2100, which may include a transmission, to enable the propulsion of the vehicle 2100. The propulsion system 2150 may be controlled in response to receiving signals from the throttle/accelerator 2152.

A steering system 2154, which may include a steering wheel, may be used to steer the vehicle 2100 (e.g., along a desired path or route) when the propulsion system 2150 is operating (e.g., when the vehicle is in motion). The steering system 2154 may receive signals from a steering actuator 2156. The steering wheel may be optional for full automation (Level 5) functionality.

The brake sensor system 2146 may be used to operate the vehicle brakes in response to receiving signals from the brake actuators 2148 and/or brake sensors.

Controller(s) 2136, which may include one or more system on chips (SoCs) 2104 (FIG. 21C) and/or GPU(s), may provide signals (e.g., representative of commands) to one or more components and/or systems of the vehicle 2100. For example, the controller(s) may send signals to operate the vehicle brakes via one or more brake actuators 2148, to operate the steering system 2154 via one or more steering actuators 2156, to operate the propulsion system 2150 via one or more throttle/accelerators 2152. The controller(s) 2136 may include one or more onboard (e.g., integrated) computing devices (e.g., supercomputers) that process sensor signals, and output operation commands (e.g., signals representing commands) to enable autonomous driving and/or to assist a human driver in driving the vehicle 2100. The controller(s) 2136 may include a first controller 2136 for autonomous driving functions, a second controller 2136 for functional safety functions, a third controller 2136 for artificial intelligence functionality (e.g., computer vision), a fourth controller 2136 for infotainment functionality, a fifth controller 2136 for redundancy in emergency conditions, and/or other controllers. In some examples, a single controller 2136 may handle two or more of the above functionalities, two or more controllers 2136 may handle a single functionality, and/or any combination thereof.

The controller(s) 2136 may provide the signals for controlling one or more components and/or systems of the vehicle 2100 in response to sensor data received from one or more sensors (e.g., sensor inputs). The sensor data may be received from, for example and without limitation, global navigation satellite systems ("GNSS") sensor(s) 2158 (e.g., Global Positioning System sensor(s)), RADAR sensor(s) 2160, ultrasonic sensor(s) 2162, LIDAR sensor(s) 2164, inertial measurement unit (IMU) sensor(s) 2166 (e.g., accelerometer(s), gyroscope(s), magnetic compass(es), magnetometer(s), etc.), microphone(s) 2196, stereo camera(s) 2168, wide-view camera(s) 2170 (e.g., fisheye cameras), infrared camera(s) 2172, surround camera(s) 2174 (e.g., 360 degree cameras), long-range and/or mid-range camera(s) 2198, speed sensor(s) 2144 (e.g., for measuring the speed of the vehicle 2100), vibration sensor(s) 2142, steering sensor(s) 2140, brake sensor(s) (e.g., as part of the brake sensor system 2146), and/or other sensor types.

One or more of the controller(s) 2136 may receive inputs (e.g., represented by input data) from an instrument cluster 2132 of the vehicle 2100 and provide outputs (e.g., represented by output data, display data, etc.) via a human-machine interface (HMI) display 2134, an audible annunciator, a loudspeaker, and/or via other components of the vehicle 2100. The outputs may include information such as vehicle velocity, speed, time, map data (e.g., the High Definition ("HD") map 2122 of FIG. 21C), location data (e.g., the vehicle's 2100 location, such as on a map), direction, location of other vehicles (e.g., an occupancy grid), information about objects and status of objects as perceived by the controller(s) 2136, etc. For example, the HMI display 2134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 2100 further includes a network interface 2124 which may use one or more wireless antenna(s) 2126 and/or modem(s) to communicate over one or more networks. For example, the network interface 2124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 2126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 21B:
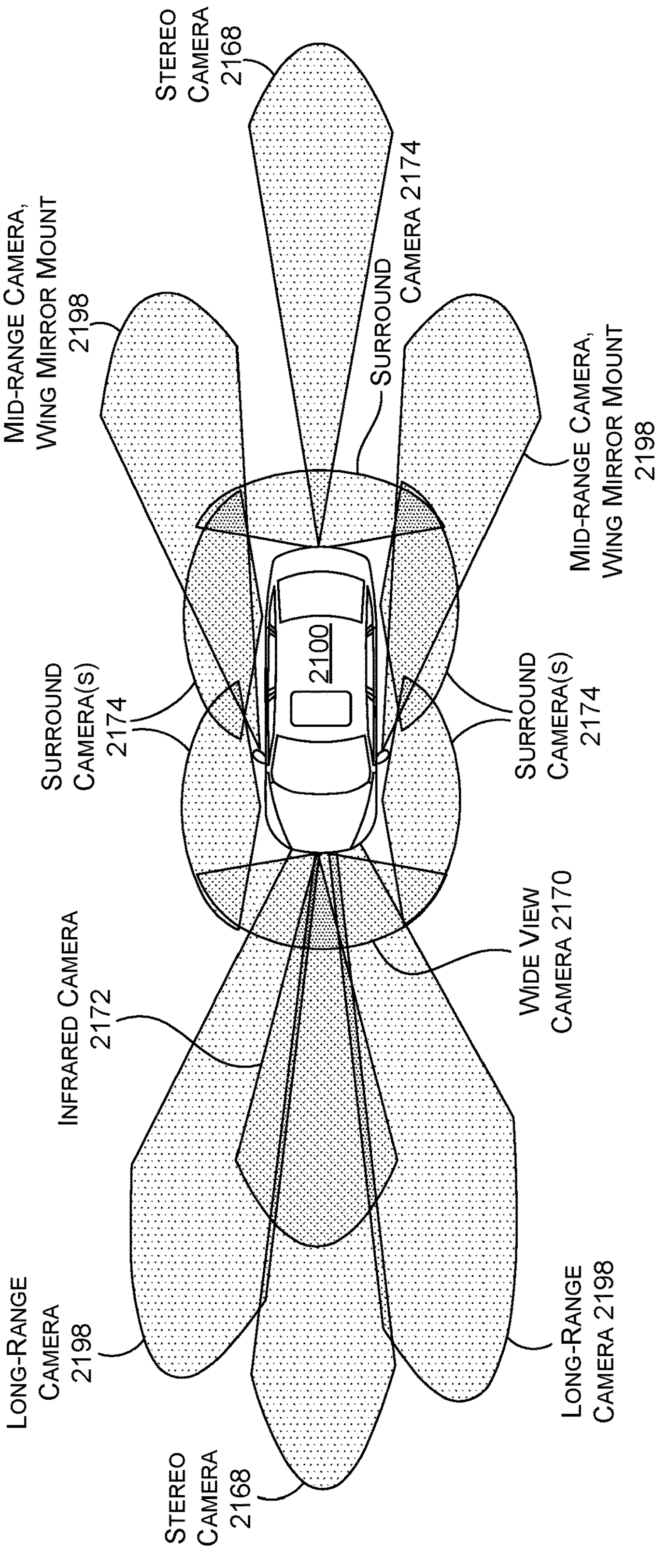
FIG. 21B is an example of camera locations and fields of view for the example autonomous vehicle of FIG. 21A, in accordance with some embodiments of the present disclosure.

FIG. 21B is an example of camera locations and fields of view for the example autonomous vehicle 2100 of FIG. 21A, in accordance with some embodiments of the present disclosure. The cameras and respective fields of view are one example embodiment and are not intended to be limiting. For example, additional and/or alternative cameras may be included and/or the cameras may be located at different locations on the vehicle 2100.

The camera types for the cameras may include, but are not limited to, digital cameras that may be adapted for use with the components and/or systems of the vehicle 2100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 2100 (e.g., front-facing cameras) may be used for surround view, to help identify forward facing paths and obstacles, as well aid in, with the help of one or more controllers 2136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 2170 that may be used to perceive objects coming into view from the periphery (e.g., pedestrians, crossing traffic or bicycles). Although only one wide-view camera is illustrated in FIG. 21B, there may be any number (including zero) of wide-view cameras 2170 on the vehicle 2100. In addition, any number of long-range camera(s) 2198 (e.g., a long-view stereo camera pair) may be used for depth-based object detection, especially for objects for which a neural network has not yet been trained. The long-range camera(s) 2198 may also be used for object detection and classification, as well as basic object tracking.

Any number of stereo cameras 2168 may also be included in a front-facing configuration. In at least one embodiment, one or more of stereo camera(s) 2168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 2168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 2168 may be used in addition to, or alternatively from, those described herein.

Cameras with a field of view that include portions of the environment to the side of the vehicle 2100 (e.g., side-view cameras) may be used for surround view, providing information used to create and update the occupancy grid, as well as to generate side impact collision warnings. For example, surround camera(s) 2174 (e.g., four surround cameras 2174 as illustrated in FIG. 21B) may be positioned to on the vehicle 2100. The surround camera(s) 2174 may include wide-view camera(s) 2170, fisheye camera(s), 360 degree camera(s), and/or the like. Four example, four fisheye cameras may be positioned on the vehicle's front, rear, and sides. In an alternative arrangement, the vehicle may use three surround camera(s) 2174 (e.g., left, right, and rear), and may leverage one or more other camera(s) (e.g., a forward-facing camera) as a fourth surround view camera.

Cameras with a field of view that include portions of the environment to the rear of the vehicle 2100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 2198, stereo camera(s) 2168), infrared camera(s) 2172, etc.), as described herein.

Figure 21C:
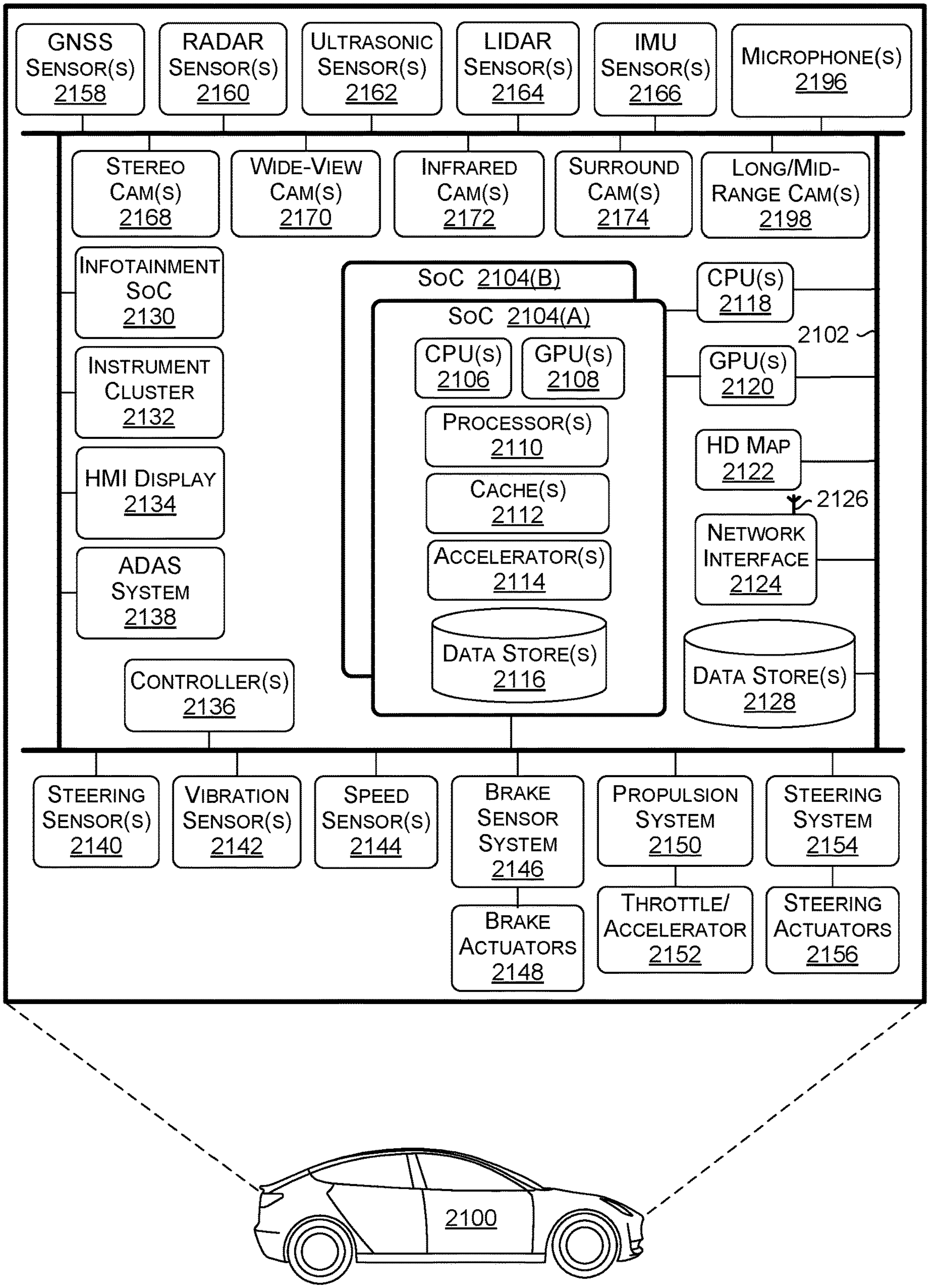
FIG. 21C is a block diagram of an example system architecture for the example autonomous vehicle of FIG. 21A, in accordance with some embodiments of the present disclosure.

FIG. 21C is a block diagram of an example system architecture for the example autonomous vehicle 2100 of FIG. 21A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 2100 in FIG. 21C are illustrated as being connected via bus 2102. The bus 2102 may include a Controller Area Network (CAN) data interface (alternatively referred to herein as a "CAN bus"). A CAN may be a network inside the vehicle 2100 used to aid in control of various features and functionality of the vehicle 2100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 2102 is described herein as being a CAN bus, this is not intended to be limiting. For example, in addition to, or alternatively from, the CAN bus, FlexRay and/or Ethernet may be used. Additionally, although a single line is used to represent the bus 2102, this is not intended to be limiting. For example, there may be any number of busses 2102, which may include one or more CAN busses, one or more FlexRay busses, one or more Ethernet busses, and/or one or more other types of busses using a different protocol. In some examples, two or more busses 2102 may be used to perform different functions, and/or may be used for redundancy. For example, a first bus 2102 may be used for collision avoidance functionality and a second bus 2102 may be used for actuation control. In any example, each bus 2102 may communicate with any of the components of the vehicle 2100, and two or more busses 2102 may communicate with the same components. In some examples, each SoC 2104, each controller 2136, and/or each computer within the vehicle may have access to the same input data (e.g., inputs from sensors of the vehicle 2100), and may be connected to a common bus, such the CAN bus.

The vehicle 2100 may include one or more controller(s) 2136, such as those described herein with respect to FIG. 21A. The controller(s) 2136 may be used for a variety of functions. The controller(s) 2136 may be coupled to any of the various other components and systems of the vehicle 2100, and may be used for control of the vehicle 2100, artificial intelligence of the vehicle 2100, infotainment for the vehicle 2100, and/or the like.

The vehicle 2100 may include a system(s) on a chip (SoC) 2104. The SoC 2104 may include CPU(s) 2106, GPU(s) 2108, processor(s) 2110, cache(s) 2112, accelerator(s) 2114, data store(s) 2116, and/or other components and features not illustrated. The SoC(s) 2104 may be used to control the vehicle 2100 in a variety of platforms and systems. For example, the SoC(s) 2104 may be combined in a system (e.g., the system of the vehicle 2100) with an HD map 2122 which may obtain map refreshes and/or updates via a network interface 2124 from one or more servers (e.g., server(s) 2178 of FIG. 21D).

The CPU(s) 2106 may include a CPU cluster or CPU complex (alternatively referred to herein as a "CCPLEX"). The CPU(s) 2106 may include multiple cores and/or L2 caches. For example, in some embodiments, the CPU(s) 2106 may include eight cores in a coherent multi-processor configuration. In some embodiments, the CPU(s) 2106 may include four dual-core clusters where each cluster has a dedicated L2 cache (e.g., a 2 MB L2 cache). The CPU(s) 2106 (e.g., the CCPLEX) may be configured to support simultaneous cluster operation enabling any combination of the clusters of the CPU(s) 2106 to be active at any given time.

The CPU(s) 2106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 2106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 2108 may include an integrated GPU (alternatively referred to herein as an "iGPU"). The GPU(s) 2108 may be programmable and may be efficient for parallel workloads. The GPU(s) 2108, in some examples, may use an enhanced tensor instruction set. The GPU(s) 2108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 2108 may include at least eight streaming microprocessors. The GPU(s) 2108 may use compute application programming interface(s) (API(s)). In addition, the GPU(s) 2108 may use one or more parallel computing platforms and/or programming models (e.g., NVIDIA's CUDA).

The GPU(s) 2108 may be power-optimized for best performance in automotive and embedded use cases. For example, the GPU(s) 2108 may be fabricated on a Fin field-effect transistor (FinFET). However, this is not intended to be limiting and the GPU(s) 2108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 2108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 2108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 2108 to access the CPU(s) 2106 page tables directly. In such examples, when the GPU(s) 2108 memory management unit (MMU) experiences a miss, an address translation request may be transmitted to the CPU(s) 2106. In response, the CPU(s) 2106 may look in its page tables for the virtual-to-physical mapping for the address and transmits the translation back to the GPU(s) 2108. As such, unified memory technology may allow a single unified virtual address space for memory of both the CPU(s) 2106 and the GPU(s) 2108, thereby simplifying the GPU(s) 2108 programming and porting of applications to the GPU(s) 2108.

In addition, the GPU(s) 2108 may include an access counter that may keep track of the frequency of access of the GPU(s) 2108 to memory of other processors. The access counter may help ensure that memory pages are moved to the physical memory of the processor that is accessing the pages most frequently.

The SoC(s) 2104 may include any number of cache(s) 2112, including those described herein. For example, the cache(s) 2112 may include an L3 cache that is available to both the CPU(s) 2106 and the GPU(s) 2108 (e.g., that is connected both the CPU(s) 2106 and the GPU(s) 2108). The cache(s) 2112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 2104 may include an arithmetic logic unit(s) (ALU(s)) which may be leveraged in performing processing with respect to any of the variety of tasks or operations of the vehicle 2100—such as processing DNNs. In addition, the SoC(s) 2104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 2106 and/or GPU(s) 2108.

The SoC(s) 2104 may include one or more accelerators 2114 (e.g., hardware accelerators, software accelerators, or a combination thereof). For example, the SoC(s) 2104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 2108 and to off-load some of the tasks of the GPU(s) 2108 (e.g., to free up more cycles of the GPU(s) 2108 for performing other tasks). As an example, the accelerator(s) 2114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 2114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 2108, and by using an inference accelerator, for example, a designer may target either the DLA(s) or the GPU(s) 2108 for any function. For example, the designer may focus processing of CNNs and floating point operations on the DLA(s) and leave other functions to the GPU(s) 2108 and/or other accelerator(s) 2114.

The accelerator(s) 2114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 2106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 2114 (e.g., the hardware acceleration cluster) may include a computer vision network on-chip and SRAM, for providing a high-bandwidth, low latency SRAM for the accelerator(s) 2114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 2104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 2114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 2166 output that correlates with the vehicle 2100 orientation, distance, 3D location estimates of the object obtained from the neural network and/or other sensors (e.g., LIDAR sensor(s) 2164 or RADAR sensor(s) 2160), among others.

The SoC(s) 2104 may include data store(s) 2116 (e.g., memory). The data store(s) 2116 may be on-chip memory of the SoC(s) 2104, which may store neural networks to be executed on the GPU and/or the DLA. In some examples, the data store(s) 2116 may be large enough in capacity to store multiple instances of neural networks for redundancy and safety. The data store(s) 2112 may comprise L2 or L3 cache(s) 2112. Reference to the data store(s) 2116 may include reference to the memory associated with the PVA, DLA, and/or other accelerator(s) 2114, as described herein.

The SoC(s) 2104 may include one or more processor(s) 2110 (e.g., embedded processors). The processor(s) 2110 may include a boot and power management processor that may be a dedicated processor and subsystem to handle boot power and management functions and related security enforcement. The boot and power management processor may be a part of the SoC(s) 2104 boot sequence and may provide runtime power management services. The boot power and management processor may provide clock and voltage programming, assistance in system low power state transitions, management of SoC(s) 2104 thermals and temperature sensors, and/or management of the SoC(s) 2104 power states. Each temperature sensor may be implemented as a ring-oscillator whose output frequency is proportional to temperature, and the SoC(s) 2104 may use the ring-oscillators to detect temperatures of the CPU(s) 2106, GPU(s) 2108, and/or accelerator(s) 2114. If temperatures are determined to exceed a threshold, the boot and power management processor may enter a temperature fault routine and put the SoC(s) 2104 into a lower power state and/or put the vehicle 2100 into a chauffeur to safe stop mode (e.g., bring the vehicle 2100 to a safe stop).

The processor(s) 2110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 2110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 2110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 2110 may further include a real-time camera engine that may include a dedicated processor subsystem for handling real-time camera management.

The processor(s) 2110 may further include a high-dynamic range signal processor that may include an image signal processor that is a hardware engine that is part of the camera processing pipeline.

The processor(s) 2110 may include a video image compositor that may be a processing block (e.g., implemented on a microprocessor) that implements video post-processing functions needed by a video playback application to produce the final image for the player window. The video image compositor may perform lens distortion correction on wide-view camera(s) 2170, surround camera(s) 2174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 2108 is not required to continuously render new surfaces. Even when the GPU(s) 2108 is powered on and active doing 3D rendering, the video image compositor may be used to offload the GPU(s) 2108 to improve performance and responsiveness.

The SoC(s) 2104 may further include a mobile industry processor interface (MIPI) camera serial interface for receiving video and input from cameras, a high-speed interface, and/or a video input block that may be used for camera and related pixel input functions. The SoC(s) 2104 may further include an input/output controller(s) that may be controlled by software and may be used for receiving I/O signals that are uncommitted to a specific role.

The SoC(s) 2104 may further include a broad range of peripheral interfaces to enable communication with peripherals, audio codecs, power management, and/or other devices. The SoC(s) 2104 may be used to process data from cameras (e.g., connected over Gigabit Multimedia Serial Link and Ethernet), sensors (e.g., LIDAR sensor(s) 2164, RADAR sensor(s) 2160, etc. that may be connected over Ethernet), data from bus 2102 (e.g., speed of vehicle 2100, steering wheel position, etc.), data from GNSS sensor(s) 2158 (e.g., connected over Ethernet or CAN bus). The SoC(s) 2104 may further include dedicated high-performance mass storage controllers that may include their own DMA engines, and that may be used to free the CPU(s) 2106 from routine data management tasks.

The SoC(s) 2104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 2104 may be faster, more reliable, and even more energy-efficient and space-efficient than conventional systems. For example, the accelerator(s) 2114, when combined with the CPU(s) 2106, the GPU(s) 2108, and the data store(s) 2116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 2120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 2108.

In some examples, a CNN for facial recognition and vehicle owner identification may use data from camera sensors to identify the presence of an authorized driver and/or owner of the vehicle 2100. The always on sensor processing engine may be used to unlock the vehicle when the owner approaches the driver door and turn on the lights, and, in security mode, to disable the vehicle when the owner leaves the vehicle. In this way, the SoC(s) 2104 provide for security against theft and/or carjacking.

In another example, a CNN for emergency vehicle detection and identification may use data from microphones 2196 to detect and identify emergency vehicle sirens. In contrast to conventional systems, that use general classifiers to detect sirens and manually extract features, the SoC(s) 2104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 2158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 2162, until the emergency vehicle(s) passes.

The vehicle may include a CPU(s) 2118 (e.g., discrete CPU(s), or dCPU(s)), that may be coupled to the SoC(s) 2104 via a high-speed interconnect (e.g., PCIe). The CPU(s) 2118 may include an X86 processor, for example. The CPU(s) 2118 may be used to perform any of a variety of functions, including arbitrating potentially inconsistent results between ADAS sensors and the SoC(s) 2104, and/or monitoring the status and health of the controller(s) 2136 and/or infotainment SoC 2130, for example.

The vehicle 2100 may include a GPU(s) 2120 (e.g., discrete GPU(s), or dGPU(s)), that may be coupled to the SoC(s) 2104 via a high-speed interconnect (e.g., NVIDIA's NVLINK). The GPU(s) 2120 may provide additional artificial intelligence functionality, such as by executing redundant and/or different neural networks, and may be used to train and/or update neural networks based on input (e.g., sensor data) from sensors of the vehicle 2100.

The vehicle 2100 may further include the network interface 2124 which may include one or more wireless antennas 2126 (e.g., one or more wireless antennas for different communication protocols, such as a cellular antenna, a Bluetooth antenna, etc.). The network interface 2124 may be used to enable wireless connectivity over the Internet with the cloud (e.g., with the server(s) 2178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 2100 information about vehicles in proximity to the vehicle 2100 (e.g., vehicles in front of, on the side of, and/or behind the vehicle 2100). This functionality may be part of a cooperative adaptive cruise control functionality of the vehicle 2100.

The network interface 2124 may include a SoC that provides modulation and demodulation functionality and enables the controller(s) 2136 to communicate over wireless networks. The network interface 2124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 2100 may further include data store(s) 2128 which may include off-chip (e.g., off the SoC(s) 2104) storage. The data store(s) 2128 may include one or more storage elements including RAM, SRAM, DRAM, VRAM, Flash, hard disks, and/or other components and/or devices that may store at least one bit of data.

The vehicle 2100 may further include GNSS sensor(s) 2158. The GNSS sensor(s) 2158 (e.g., GPS, assisted GPS sensors, differential GPS (DGPS) sensors, etc.), to assist in mapping, perception, occupancy grid generation, and/or path planning functions. Any number of GNSS sensor(s) 2158 may be used, including, for example and without limitation, a GPS using a USB connector with an Ethernet to Serial (RS-232) bridge.

The vehicle 2100 may further include RADAR sensor(s) 2160. The RADAR sensor(s) 2160 may be used by the vehicle 2100 for long-range vehicle detection, even in darkness and/or severe weather conditions. RADAR functional safety levels may be ASIL B. The RADAR sensor(s) 2160 may use the CAN and/or the bus 2102 (e.g., to transmit data generated by the RADAR sensor(s) 2160) for control and to access object tracking data, with access to Ethernet to access raw data in some examples. A wide variety of RADAR sensor types may be used. For example, and without limitation, the RADAR sensor(s) 2160 may be suitable for front, rear, and side RADAR use. In some example, Pulse Doppler RADAR sensor(s) are used.

The RADAR sensor(s) 2160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 2160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 2100 surroundings at higher speeds with minimal interference from traffic in adjacent lanes. The other two antennae may expand the field of view, making it possible to quickly detect vehicles entering or leaving the vehicle's 2100 lane.

Mid-range RADAR systems may include, as an example, a range of up to 2160 m (front) or 80 m (rear), and a field of view of up to 42 degrees (front) or 2150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 2100 may further include ultrasonic sensor(s) 2162. The ultrasonic sensor(s) 2162, which may be positioned at the front, back, and/or the sides of the vehicle 2100, may be used for park assist and/or to create and update an occupancy grid. A wide variety of ultrasonic sensor(s) 2162 may be used, and different ultrasonic sensor(s) 2162 may be used for different ranges of detection (e.g., 2.5 m, 4 m). The ultrasonic sensor(s) 2162 may operate at functional safety levels of ASIL B.

The vehicle 2100 may include LIDAR sensor(s) 2164. The LIDAR sensor(s) 2164 may be used for object and pedestrian detection, emergency braking, collision avoidance, and/or other functions. The LIDAR sensor(s) 2164 may be functional safety level ASIL B. In some examples, the vehicle 2100 may include multiple LIDAR sensors 2164 (e.g., two, four, six, etc.) that may use Ethernet (e.g., to provide data to a Gigabit Ethernet switch).

In some examples, the LIDAR sensor(s) 2164 may be capable of providing a list of objects and their distances for a 360-degree field of view. Commercially available LIDAR sensor(s) 2164 may have an advertised range of approximately 2100 m, with an accuracy of 2 cm-3 cm, and with support for a 2100 Mbps Ethernet connection, for example. In some examples, one or more non-protruding LIDAR sensors 2164 may be used. In such examples, the LIDAR sensor(s) 2164 may be implemented as a small device that may be embedded into the front, rear, sides, and/or corners of the vehicle 2100. The LIDAR sensor(s) 2164, in such examples, may provide up to a 120-degree horizontal and 35-degree vertical field-of-view, with a 200 m range even for low-reflectivity objects. Front-mounted LIDAR sensor(s) 2164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 2100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 2164 may be less susceptible to motion blur, vibration, and/or shock.

The vehicle may further include IMU sensor(s) 2166. The IMU sensor(s) 2166 may be located at a center of the rear axle of the vehicle 2100, in some examples. The IMU sensor(s) 2166 may include, for example and without limitation, an accelerometer(s), a magnetometer(s), a gyroscope(s), a magnetic compass(es), and/or other sensor types. In some examples, such as in six-axis applications, the IMU sensor(s) 2166 may include accelerometers and gyroscopes, while in nine-axis applications, the IMU sensor(s) 2166 may include accelerometers, gyroscopes, and magnetometers.

In some embodiments, the IMU sensor(s) 2166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 2166 may enable the vehicle 2100 to estimate heading without requiring input from a magnetic sensor by directly observing and correlating the changes in velocity from GPS to the IMU sensor(s) 2166. In some examples, the IMU sensor(s) 2166 and the GNSS sensor(s) 2158 may be combined in a single integrated unit.

The vehicle may include microphone(s) 2196 placed in and/or around the vehicle 2100. The microphone(s) 2196 may be used for emergency vehicle detection and identification, among other things.

The vehicle may further include any number of camera types, including stereo camera(s) 2168, wide-view camera(s) 2170, infrared camera(s) 2172, surround camera(s) 2174, long-range and/or mid-range camera(s) 2198, and/or other camera types. The cameras may be used to capture image data around an entire periphery of the vehicle 2100. The types of cameras used depends on the embodiments and requirements for the vehicle 2100, and any combination of camera types may be used to provide the necessary coverage around the vehicle 2100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 21A and FIG. 21B.

The vehicle 2100 may further include vibration sensor(s) 2142. The vibration sensor(s) 2142 may measure vibrations of components of the vehicle, such as the axle(s). For example, changes in vibrations may indicate a change in road surfaces. In another example, when two or more vibration sensors 2142 are used, the differences between the vibrations may be used to determine friction or slippage of the road surface (e.g., when the difference in vibration is between a power-driven axle and a freely rotating axle).

The vehicle 2100 may include an ADAS system 2138. The ADAS system 2138 may include a SoC, in some examples. The ADAS system 2138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 2160, LIDAR sensor(s) 2164, and/or a camera(s). The ACC systems may include longitudinal ACC and/or lateral ACC. Longitudinal ACC monitors and controls the distance to the vehicle immediately ahead of the vehicle 2100 and automatically adjust the vehicle speed to maintain a safe distance from vehicles ahead. Lateral ACC performs distance keeping, and advises the vehicle 2100 to change lanes when necessary. Lateral ACC is related to other ADAS applications such as LCA and CWS.

CACC uses information from other vehicles that may be received via the network interface 2124 and/or the wireless antenna(s) 2126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 2100), while the I2V communication concept provides information about traffic further ahead. CACC systems may include either or both I2V and V2V information sources. Given the information of the vehicles ahead of the vehicle 2100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 2160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 2160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 2100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 2100 if the vehicle 2100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 2160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 2100 is backing up. Some RCTW systems include AEB to ensure that the vehicle brakes are applied to avoid a crash. RCTW systems may use one or more rear-facing RADAR sensor(s) 2160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 2100, the vehicle 2100 itself must, in the case of conflicting results, decide whether to heed the result from a primary computer or a secondary computer (e.g., a first controller 2136 or a second controller 2136). For example, in some embodiments, the ADAS system 2138 may be a backup and/or secondary computer for providing perception information to a backup computer rationality module. The backup computer rationality monitor may run a redundant diverse software on hardware components to detect faults in perception and dynamic driving tasks. Outputs from the ADAS system 2138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 2104.

In other examples, ADAS system 2138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 2138 may be fed into the primary computer's perception block and/or the primary computer's dynamic driving task block. For example, if the ADAS system 2138 indicates a forward crash warning due to an object immediately ahead, the perception block may use this information when identifying objects. In other examples, the secondary computer may have its own neural network which is trained and thus reduces the risk of false positives, as described herein.

The vehicle 2100 may further include the infotainment SoC 2130 (e.g., an in-vehicle infotainment system (IVI)). Although illustrated and described as a SoC, the infotainment system may not be a SoC, and may include two or more discrete components. The infotainment SoC 2130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 2100. For example, the infotainment SoC 2130 may radios, disk players, navigation systems, video players, USB and Bluetooth connectivity, carputers, in-car entertainment, Wi-Fi, steering wheel audio controls, hands free voice control, a heads-up display (HUD), an HMI display 2134, a telematics device, a control panel (e.g., for controlling and/or interacting with various components, features, and/or systems), and/or other components. The infotainment SoC 2130 may further be used to provide information (e.g., visual and/or audible) to a user(s) of the vehicle, such as information from the ADAS system 2138, autonomous driving information such as planned vehicle maneuvers, trajectories, surrounding environment information (e.g., intersection information, vehicle information, road information, etc.), and/or other information.

The infotainment SoC 2130 may include GPU functionality. The infotainment SoC 2130 may communicate over the bus 2102 (e.g., CAN bus, Ethernet, etc.) with other devices, systems, and/or components of the vehicle 2100. In some examples, the infotainment SoC 2130 may be coupled to a supervisory MCU such that the GPU of the infotainment system may perform some self-driving functions in the event that the primary controller(s) 2136 (e.g., the primary and/or backup computers of the vehicle 2100) fail. In such an example, the infotainment SoC 2130 may put the vehicle 2100 into a chauffeur to safe stop mode, as described herein.

The vehicle 2100 may further include an instrument cluster 2132 (e.g., a digital dash, an electronic instrument cluster, a digital instrument panel, etc.). The instrument cluster 2132 may include a controller and/or supercomputer (e.g., a discrete controller or supercomputer). The instrument cluster 2132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 2130 and the instrument cluster 2132. In other words, the instrument cluster 2132 may be included as part of the infotainment SoC 2130, or vice versa.

Figure 21D:
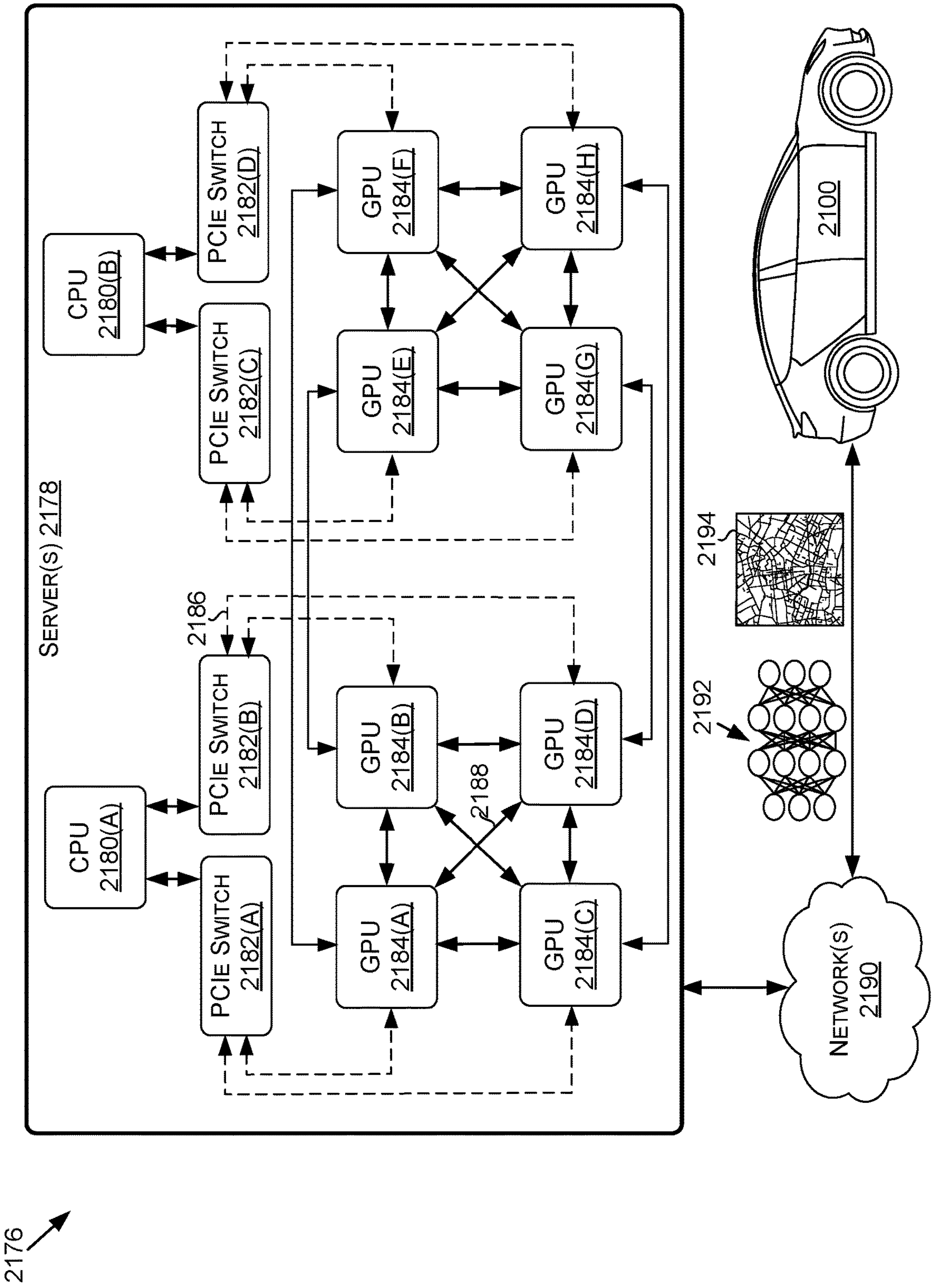
FIG. 21D is a system diagram for communication between cloud-based server(s) and the example autonomous vehicle of FIG. 21A, in accordance with some embodiments of the present disclosure.

FIG. 21D is a system diagram for communication between cloud-based server(s) and the example autonomous vehicle 2100 of FIG. 21A, in accordance with some embodiments of the present disclosure. The system 2176 may include server(s) 2178, network(s) 2190, and vehicles, including the vehicle 2100. The server(s) 2178 may include a plurality of GPUs 2184(A)-2184(H) (collectively referred to herein as GPUs 2184), PCIe switches 2182(A)-2182(H) (collectively referred to herein as PCIe switches 2182), and/or CPUs 2180(A)-2180(B) (collectively referred to herein as CPUs 2180). The GPUs 2184, the CPUs 2180, and the PCIe switches may be interconnected with high-speed interconnects such as, for example and without limitation, NVLink interfaces 2188 developed by NVIDIA and/or PCIe connections 2186. In some examples, the GPUs 2184 are connected via NVLink and/or NVSwitch SoC and the GPUs 2184 and the PCIe switches 2182 are connected via PCIe interconnects. Although eight GPUs 2184, two CPUs 2180, and two PCIe switches are illustrated, this is not intended to be limiting. Depending on the embodiment, each of the server(s) 2178 may include any number of GPUs 2184, CPUs 2180, and/or PCIe switches. For example, the server(s) 2178 may each include eight, sixteen, thirty-two, and/or more GPUs 2184.

The server(s) 2178 may receive, over the network(s) 2190 and from the vehicles, image data representative of images showing unexpected or changed road conditions, such as recently commenced road-work. The server(s) 2178 may transmit, over the network(s) 2190 and to the vehicles, neural networks 2192, updated neural networks 2192, and/or map information 2194, including information regarding traffic and road conditions. The updates to the map information 2194 may include updates for the HD map 2122, such as information regarding construction sites, potholes, detours, flooding, and/or other obstructions. In some examples, the neural networks 2192, the updated neural networks 2192, and/or the map information 2194 may have resulted from new training and/or experiences represented in data received from any number of vehicles in the environment, and/or based on training performed at a datacenter (e.g., using the server(s) 2178 and/or other servers).

The server(s) 2178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 2190, and/or the machine learning models may be used by the server(s) 2178 to remotely monitor the vehicles.

In some examples, the server(s) 2178 may receive data from the vehicles and apply the data to up-to-date real-time neural networks for real-time intelligent inferencing. The server(s) 2178 may include deep-learning supercomputers and/or dedicated AI computers powered by GPU(s) 2184, such as a DGX and DGX Station machines developed by NVIDIA. However, in some examples, the server(s) 2178 may include deep learning infrastructure that use only CPU-powered datacenters.

The deep-learning infrastructure of the server(s) 2178 may be capable of fast, real-time inferencing, and may use that capability to evaluate and verify the health of the processors, software, and/or associated hardware in the vehicle 2100. For example, the deep-learning infrastructure may receive periodic updates from the vehicle 2100, such as a sequence of images and/or objects that the vehicle 2100 has located in that sequence of images (e.g., via computer vision and/or other machine learning object classification techniques). The deep-learning infrastructure may run its own neural network to identify the objects and compare them with the objects identified by the vehicle 2100 and, if the results do not match and the infrastructure concludes that the AI in the vehicle 2100 is malfunctioning, the server(s) 2178 may transmit a signal to the vehicle 2100 instructing a fail-safe computer of the vehicle 2100 to assume control, notify the passengers, and complete a safe parking maneuver.

For inferencing, the server(s) 2178 may include the GPU(s) 2184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 22:
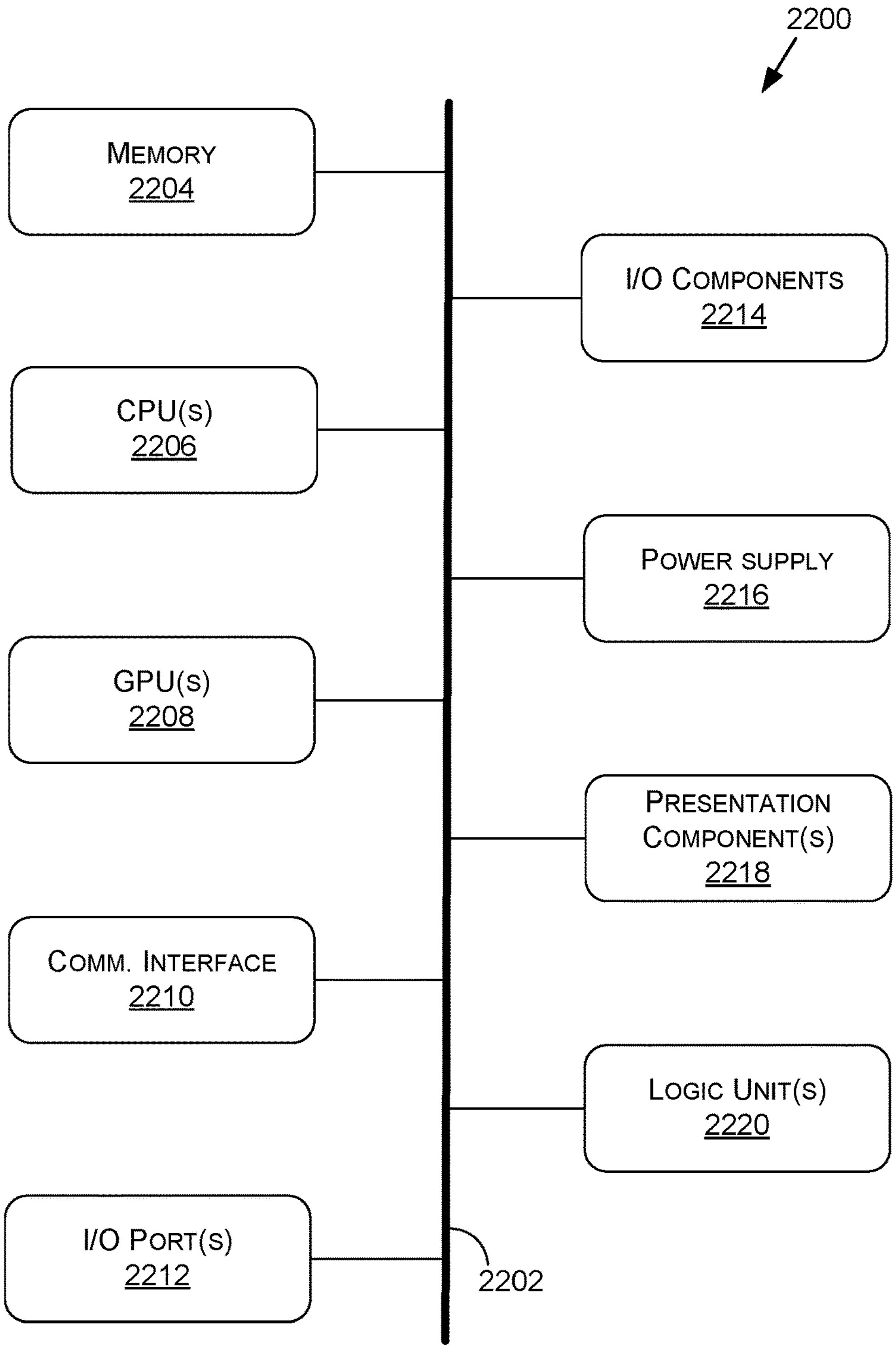
FIG. 22 is a block diagram of an example computing device suitable for use in implementing some embodiments of the present disclosure.

FIG. 22 is a block diagram of an example computing device(s) 2200 suitable for use in implementing some embodiments of the present disclosure. Computing device 2200 may include an interconnect system 2202 that directly or indirectly couples the following devices: memory 2204, one or more central processing units (CPUs) 2206, one or more graphics processing units (GPUs) 2208, a communication interface 2210, input/output (I/O) ports 2212, input/output components 2214, a power supply 2216, one or more presentation components 2218 (e.g., display(s)), and one or more logic units 2220. In at least one embodiment, the computing device(s) 2200 may comprise one or more virtual machines (VMs), and/or any of the components thereof may comprise virtual components (e.g., virtual hardware components). For non-limiting examples, one or more of the GPUs 2208 may comprise one or more vGPUs, one or more of the CPUs 2206 may comprise one or more vCPUs, and/or one or more of the logic units 2220 may comprise one or more virtual logic units. As such, a computing device(s) 2200 may include discrete components (e.g., a full GPU dedicated to the computing device 2200), virtual components (e.g., a portion of a GPU dedicated to the computing device 2200), or a combination thereof.

Although the various blocks of FIG. 22 are shown as connected via the interconnect system 2202 with lines, this is not intended to be limiting and is for clarity only. For example, in some embodiments, a presentation component 2218, such as a display device, may be considered an I/O component 2214 (e.g., if the display is a touch screen). As another example, the CPUs 2206 and/or GPUs 2208 may include memory (e.g., the memory 2204 may be representative of a storage device in addition to the memory of the GPUs 2208, the CPUs 2206, and/or other components). In other words, the computing device of FIG. 22 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 22.

The interconnect system 2202 may represent one or more links or busses, such as an address bus, a data bus, a control bus, or a combination thereof. The interconnect system 2202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 2206 may be directly connected to the memory 2204. Further, the CPU 2206 may be directly connected to the GPU 2208. Where there is direct, or point-to-point connection between components, the interconnect system 2202 may include a PCIe link to carry out the connection. In these examples, a PCI bus need not be included in the computing device 2200.

The memory 2204 may include any of a variety of computer-readable media. The computer-readable media may be any available media that may be accessed by the computing device 2200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 2204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 2200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 2206 may be configured to execute at least some of the computer-readable instructions to control one or more components of the computing device 2200 to perform one or more of the methods and/or processes described herein. The CPU(s) 2206 may each include one or more cores (e.g., one, two, four, eight, twenty-eight, seventy-two, etc.) that are capable of handling a multitude of software threads simultaneously. The CPU(s) 2206 may include any type of processor, and may include different types of processors depending on the type of computing device 2200 implemented (e.g., processors with fewer cores for mobile devices and processors with more cores for servers). For example, depending on the type of computing device 2200, the processor may be an Advanced RISC Machines (ARM) processor implemented using Reduced Instruction Set Computing (RISC) or an x86 processor implemented using Complex Instruction Set Computing (CISC). The computing device 2200 may include one or more CPUs 2206 in addition to one or more microprocessors or supplementary co-processors, such as math co-processors.

In addition to or alternatively from the CPU(s) 2206, the GPU(s) 2208 may be configured to execute at least some of the computer-readable instructions to control one or more components of the computing device 2200 to perform one or more of the methods and/or processes described herein. One or more of the GPU(s) 2208 may be an integrated GPU (e.g., with one or more of the CPU(s) 2206 and/or one or more of the GPU(s) 2208 may be a discrete GPU. In embodiments, one or more of the GPU(s) 2208 may be a coprocessor of one or more of the CPU(s) 2206. The GPU(s) 2208 may be used by the computing device 2200 to render graphics (e.g., 3D graphics) or perform general purpose computations. For example, the GPU(s) 2208 may be used for General-Purpose computing on GPUs (GPGPU). The GPU(s) 2208 may include hundreds or thousands of cores that are capable of handling hundreds or thousands of software threads simultaneously. The GPU(s) 2208 may generate pixel data for output images in response to rendering commands (e.g., rendering commands from the CPU(s) 2206 received via a host interface). The GPU(s) 2208 may include graphics memory, such as display memory, for storing pixel data or any other suitable data, such as GPGPU data. The display memory may be included as part of the memory 2204. The GPU(s) 2208 may include two or more GPUs operating in parallel (e.g., via a link). The link may directly connect the GPUs (e.g., using NVLINK) or may connect the GPUs through a switch (e.g., using NVSwitch). When combined together, each GPU 2208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 2206 and/or the GPU(s) 2208, the logic unit(s) 2220 may be configured to execute at least some of the computer-readable instructions to control one or more components of the computing device 2200 to perform one or more of the methods and/or processes described herein. In embodiments, the CPU(s) 2206, the GPU(s) 2208, and/or the logic unit(s) 2220 may discretely or jointly perform any combination of the methods, processes and/or portions thereof. One or more of the logic units 2220 may be part of and/or integrated in one or more of the CPU(s) 2206 and/or the GPU(s) 2208 and/or one or more of the logic units 2220 may be discrete components or otherwise external to the CPU(s) 2206 and/or the GPU(s) 2208. In embodiments, one or more of the logic units 2220 may be a coprocessor of one or more of the CPU(s) 2206 and/or one or more of the GPU(s) 2208.

Examples of the logic unit(s) 2220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 2210 may include one or more receivers, transmitters, and/or transceivers that enable the computing device 2200 to communicate with other computing devices via an electronic communication network, included wired and/or wireless communications. The communication interface 2210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 2220 and/or communication interface 2210 may include one or more data processing units (DPUs) to transmit data received over a network and/or through interconnect system 2202 directly to (e.g., a memory of) one or more GPU(s) 2208.

The I/O ports 2212 may enable the computing device 2200 to be logically coupled to other devices including the I/O components 2214, the presentation component(s) 2218, and/or other components, some of which may be built in to (e.g., integrated in) the computing device 2200. Illustrative I/O components 2214 include a microphone, mouse, keyboard, joystick, game pad, game controller, satellite dish, scanner, printer, wireless device, etc. The I/O components 2214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 2200. The computing device 2200 may be include depth cameras, such as stereoscopic camera systems, infrared camera systems, RGB camera systems, touchscreen technology, and combinations of these, for gesture detection and recognition. Additionally, the computing device 2200 may include accelerometers or gyroscopes (e.g., as part of an inertia measurement unit (IMU)) that enable detection of motion. In some examples, the output of the accelerometers or gyroscopes may be used by the computing device 2200 to render immersive augmented reality or virtual reality.

The power supply 2216 may include a hard-wired power supply, a battery power supply, or a combination thereof. The power supply 2216 may provide power to the computing device 2200 to enable the components of the computing device 2200 to operate.

The presentation component(s) 2218 may include a display (e.g., a monitor, a touch screen, a television screen, a heads-up-display (HUD), other display types, or a combination thereof), speakers, and/or other presentation components. The presentation component(s) 2218 may receive data from other components (e.g., the GPU(s) 2208, the CPU(s) 2206, DPUs, etc.), and output the data (e.g., as an image, video, sound, etc.).

Example Data Center

Figure 23:
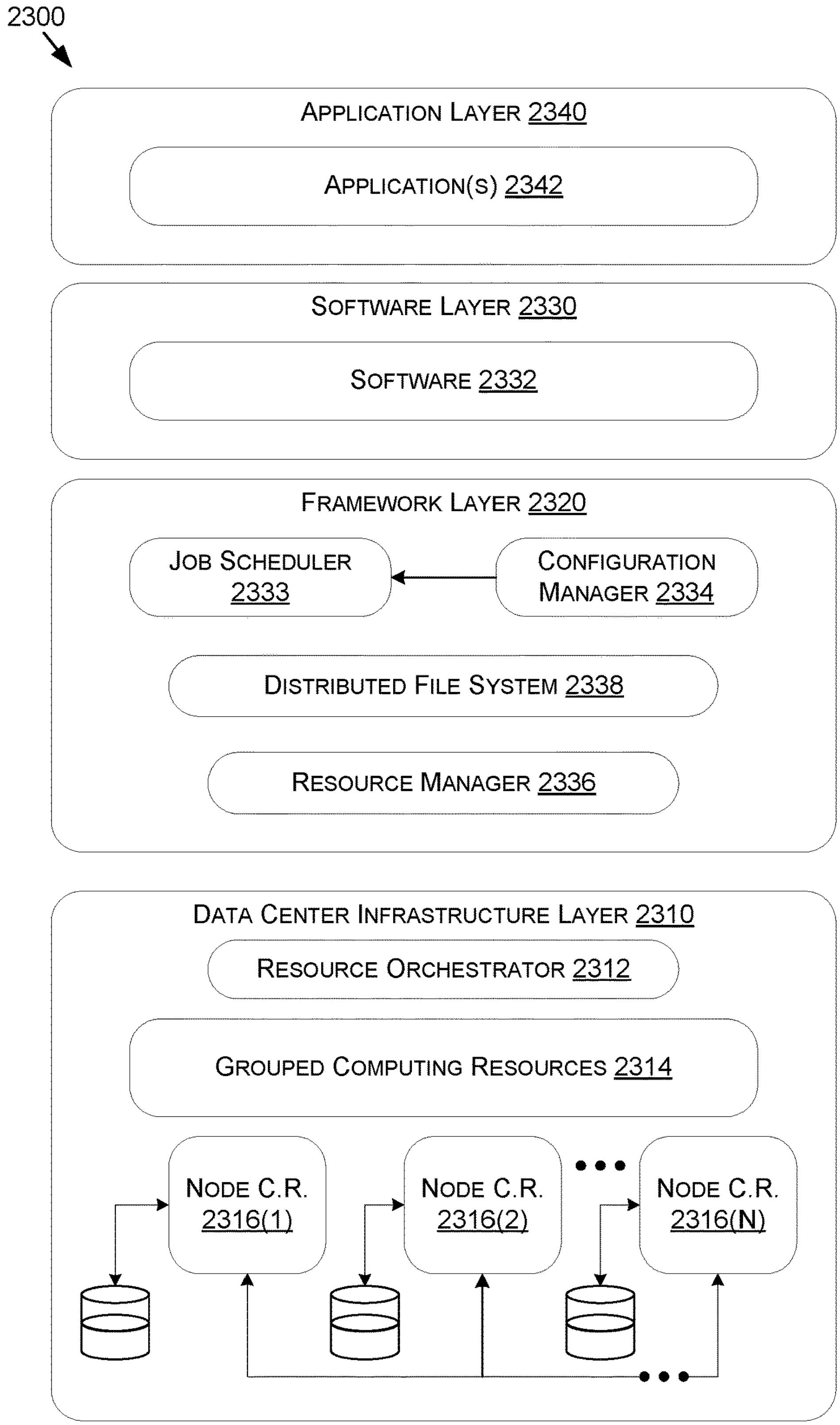
FIG. 23 is a block diagram of an example data center suitable for use in implementing some embodiments of the present disclosure.

FIG. 23 illustrates an example data center 2300 that may be used in at least one embodiments of the present disclosure. The data center 2300 may include a data center infrastructure layer 2310, a framework layer 2320, a software layer 2330, and/or an application layer 2340.

As shown in FIG. 23, the data center infrastructure layer 2310 may include a resource orchestrator 2312, grouped computing resources 2314, and node computing resources ("node C.R.s") 2316(1)-2316(N), where "N" represents any whole, positive integer. In at least one embodiment, node C.R.s 2316(1)-2316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 2316(1)-2316(N) may correspond to a server having one or more of the above-mentioned computing resources. In addition, in some embodiments, the node C.R.s 2316(1)-23161(N) may include one or more virtual components, such as vGPUs, vCPUs, and/or the like, and/or one or more of the node C.R.s 2316(1)-2316(N) may correspond to a virtual machine (VM).

In at least one embodiment, grouped computing resources 2314 may include separate groupings of node C.R.s 2316 housed within one or more racks (not shown), or many racks housed in data centers at various geographical locations (also not shown). Separate groupings of node C.R.s 2316 within grouped computing resources 2314 may include grouped compute, network, memory or storage resources that may be configured or allocated to support one or more workloads. In at least one embodiment, several node C.R.s 2316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 2312 may configure or otherwise control one or more node C.R.s 2316(1)-2316(N) and/or grouped computing resources 2314. In at least one embodiment, resource orchestrator 2312 may include a software design infrastructure (SDI) management entity for the data center 2300. The resource orchestrator 2312 may include hardware, software, or some combination thereof.

In at least one embodiment, as shown in FIG. 23, framework layer 2320 may include a job scheduler 2333, a configuration manager 2334, a resource manager 2336, and/or a distributed file system 2338. The framework layer 2320 may include a framework to support software 2332 of software layer 2330 and/or one or more application(s) 2342 of application layer 2340. The software 2332 or application(s) 2342 may respectively include web-based service software or applications, such as those provided by Amazon Web Services, Google Cloud and Microsoft Azure. The framework layer 2320 may be, but is not limited to, a type of free and open-source software web application framework such as Apache Spark™ (hereinafter "Spark") that may utilize distributed file system 2338 for large-scale data processing (e.g., "big data"). In at least one embodiment, job scheduler 2333 may include a Spark driver to facilitate scheduling of workloads supported by various layers of data center 2300. The configuration manager 2334 may be capable of configuring different layers such as software layer 2330 and framework layer 2320 including Spark and distributed file system 2338 for supporting large-scale data processing. The resource manager 2336 may be capable of managing clustered or grouped computing resources mapped to or allocated for support of distributed file system 2338 and job scheduler 2333. In at least one embodiment, clustered or grouped computing resources may include grouped computing resource 2314 at data center infrastructure layer 2310. The resource manager 2336 may coordinate with resource orchestrator 2312 to manage these mapped or allocated computing resources.

In at least one embodiment, software 2332 included in software layer 2330 may include software used by at least portions of node C.R.s 2316(1)-2316(N), grouped computing resources 2314, and/or distributed file system 2338 of framework layer 2320. One or more types of software may include, but are not limited to, Internet web page search software, e-mail virus scan software, database software, and streaming video content software.

In at least one embodiment, application(s) 2342 included in application layer 2340 may include one or more types of applications used by at least portions of node C.R.s 2316(1)-2316(N), grouped computing resources 2314, and/or distributed file system 2338 of framework layer 2320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 2334, resource manager 2336, and resource orchestrator 2312 may implement any number and type of self-modifying actions based on any amount and type of data acquired in any technically feasible fashion. Self-modifying actions may relieve a data center operator of data center 2300 from making possibly bad configuration decisions and possibly avoiding underutilized and/or poor performing portions of a data center.

The data center 2300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 2300. In at least one embodiment, trained or deployed machine learning models corresponding to one or more neural networks may be used to infer or predict information using resources described above with respect to the data center 2300 by using weight parameters calculated through one or more training techniques, such as but not limited to those described herein.

In at least one embodiment, the data center 2300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 2200 of FIG. 22—e.g., each device may include similar components, features, and/or functionality of the computing device(s) 2200. In addition, where backend devices (e.g., servers, NAS, etc.) are implemented, the backend devices may be included as part of a data center 2300, an example of which is described in more detail herein with respect to FIG. 23.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 2200 described herein with respect to FIG. 22. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A: A method comprising: obtaining one or more instances of data generated using one or more machines navigating within an environment; determining to associate the one or more instances of data with a portion of a map that is associated with a portion of the environment; determining, based at least on the one or more instances of data being associated with the portion of the map, to update the portion of the map; and causing, using the one or more instances of data, the portion of the map to be updated.

B: The method of paragraph A, wherein the determining to update the portion of the map comprises: determining that a number of instances associated with the one or more instances of data satisfies a threshold number of instances; and determining, based at least on the number of instances satisfying the threshold number of instances, to update the portion of the map.

C: The method of paragraph A or paragraph B, further comprising: based at least on the determining to associate the one or more instances of data with the portion of the map, updating a metric associated with the portion of the map from a first value to a second value, wherein the determining to update the portion of the map is based at least on the metric indicating the second value.

D: The method of any one of paragraphs A-C, further comprising: obtaining location data associated with the one or more machines when navigating within the environment, wherein the determining to associate the one or more instances of data with the portion of the map is based at least on the location data.

E: The method of any one of paragraphs A-D, wherein an instance of data from the one or more instances of data comprises one or more of: sensor data generated using a machine of the one or more machines; or processed data representing one or more locations of one or more objects or one or more features identified within the environment.

F: The method of any one of paragraphs A-E, further comprising, based at least on the causing the portion of the map to be updated, performing at least one of: storing at least a portion of the one or more instances of data in association with the portion of the map; or removing the one or more instances of data from association with the portion of the map.

G: The method of any one of paragraphs A-F, further comprising: receiving a plurality of instances of data generated using a plurality of machines navigating within the environment, the plurality of instances of data including the one or more instances of data generated using the one or more machines from the plurality of machines; and filtering the plurality of instances of data using one or more criteria, wherein the obtaining the one or more instances of data is based at least on the filtering.

H: The method of any one of paragraphs A-G, wherein: the causing the portion of the map to be updated comprises at least storing the one or more instances of data in one or more memories associated with map updates; and the method further comprises: determining, based at least on one or more second instances of data being associated with a second portion of the map that is associated with a second portion of the environment, to update the second portion of the map; and storing the one or more second instances of data in the one or more memories such that the portion of the map is updated followed by the second portion of the map being updated.

I: The method of any one of paragraphs A-H, further comprising: based at least on the determining to update the portion of the map, determining to update at least a second portion of the map that at least partially borders the portion of the map; and causing the second portion of the map to be updated.

J: The method of any one of paragraphs A-I, further comprising, based at least on the determining to update the portion of the map, determining to refrain from updating at least a second portion of the map that is related to the portion of the map.

K: A system comprising: one or more processors to: store one or more instances of data representing a portion of an environment that is associated with a portion of a map; determine, based at least on the one or more instances of data, at least a metric value associated with the portion of the map; determine that the metric value satisfies a threshold; and cause, based at least on the metric value satisfying the threshold and using the one or more instances of data, the portion of the map to be updated.

L: The system of paragraph K, wherein: the metric value comprises a number of instances associated with the one or more instances of data; the threshold comprises a threshold number of instances; and the determination that the metric value satisfies the threshold comprises determining that the number of instances is equal to or greater than the threshold number of instances.

M: The system of paragraph K or paragraph L, wherein the one or more processing units are further to: associate the one or more instances of data with the portion of the map; and based at least on the one or more instances of data being associated with the portion of the map, updating a tracker associated with a metric value from a first value to a second value, wherein the determination of the metric value comprises determining that the metric value includes the second value.

N: The system of any one of paragraphs K-M, wherein the one or more processing units are further to: obtain location data associated with one or more machines that generated the one or more instances of data; and determine, based at least on the location data, that the one or more instances of data are associated with the portion of the map, wherein the determination of the metric value is further based at least on the one or more instances of data being associated with the portion of the map.

O: The system of any one of paragraphs K-N, wherein an instance of data from the one or more instances of data comprises one or more of: sensor data representing a portion of an environment that corresponds to the portion of the map; or processed data representing one or more locations of one or more objects located within the portion of the environment.

P: The system of any one of paragraphs K-O, wherein the one or more processing units are further to: determine that a threshold period of time has elapsed since a previous update associated with the portion of the map, wherein the causation of the portion of the map to be updated is further based at least on the threshold period of time having elapsed.

Q: The system of any one of paragraphs K-P, wherein the one or more processing units are further to: associate a plurality of instances of data with the portion of the map; based at least on the metric value satisfying the threshold, filter the plurality of instances of data using one or more criteria; and identify, based at least on the plurality of instances of data being filtered, the one or more instances of data from the plurality of instances of data.

R: The system of any one of paragraphs K-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more conversational AI operations; a system implementing one or more large language models (LLMs); a system for performing one or more generative AI operations; a system for generating synthetic data; a system incorporating one or more virtual machines (VMs); a system implemented at least partially in a data center; or a system implemented at least partially using cloud computing resources.

S: One or more processors comprising: one or more processing units to cause a portion of map to be updated using one or more instances of data representing a portion of an environment that is associated with the portion of the map, wherein the portion of the map is caused to be updated based at least on a number of instances associated with the one or more instances of data satisfying a threshold number of instances.

T: The one or more processors of paragraph S, wherein the one or more processors is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more conversational AI operations; a system implementing one or more large language models (LLMs); a system for performing one or more generative AI operations; a system for generating synthetic data; a system incorporating one or more virtual machines (VMs); a system implemented at least partially in a data center; or a system implemented at least partially using cloud computing resources.

U: A method comprising: receiving, using a first system that is associated with a first area of an environment that is different than a second area of the environment associated with a second system, one or more instances of data generated using one or more machines navigating within the first area; determining, using the first system and based at least on the one or more instances of data, to perform an update to a portion of a map corresponding to the first area; and causing, using the first system, the update to the portion of the map.

V: The method of paragraph U, wherein the causing the update to the portion of the map comprises one or more of: updating, using the first system and based at least on the one or more instances of data, the portion of the map; or sending, using the first system and to a third system, the one or more instances of data in order to cause the third system to perform the update to the portion of the map.

W: The method of paragraph U or paragraph V, further comprising causing, using the first system, at least the second system associated with the second area to refrain from updating a portion of a second map that is related to the portion of the map X: The method of any one of paragraphs U-W, further comprising one or more of: sending, using the first system and to the second system associated with the second area of the environment, a first indication that the portion of the map has been updated; or sending, using the first system and to a third system associated with the environment, a second indication that the portion of the map has been updated.

Y: The method of any one of paragraphs U-X, further comprising, based at least on the causing the update to the portion of the map, causing a log associated with the environment to be updated to indicate one or more of: that the portion of the map has been updated; or a version number associated with the portion of the map as updated.

Z: The method of any one of paragraphs U-Y, further comprising: receiving, using the first system and from the second system, an indication that a portion of a second map has been updated, the portion of the second map corresponding to the second area; obtaining, using the first system, data associated with the update to the portion of the second map; and causing, using the first system and based at least on the data, a second portion of the map to be updated, the second portion of the map corresponding to the portion of the second map.

AA: The method of any one of paragraphs U-Z, further comprising: processing, using the first system, the one or more instances of data in order to generate processed data; and sending, using the first system, the processed data to at least one of the second system associated with the second area or a third system associated with first area and the second area.

AB: The method of any one of paragraphs U-AA, further comprising sending, using the first system, data representing the map as updated to one or more second machines located within the first area of the environment.

AC: The method of any one of paragraphs U-AB, further comprising: determining, using the first system and based at least on the one or more instances of data, one or more metrics associated with updating the portion of the map; and determining, using the first system, that the one or more metrics satisfy one or more thresholds, wherein the causing the update to the portion of the map is based at least on the one or more metrics satisfying the one or more thresholds.

AD: The method of any one of paragraphs U-AC, wherein an instance of data from the one or more instances of data comprises one or more of: sensor data representing the first area of the environment; or processed data representing one or more locations of one or more objects located within the first area of the environment.

AE: A first system comprising: one or more processing units to: store a first map corresponding to a first area of an environment that is associated with the first system; receive an indication that a second system updated a portion of a second map corresponding to a second area of the environment; obtain one or more instances of data associated with using one or more machines navigating within the second area, the one or more instances of data associated with updating the portion of the second map; and cause, based at least on the one or more instances of data, an update to a portion of the first map that corresponds to the portion of the second map.

AF: The system of paragraph AE, wherein the indication is received from one or more of: the second system associated with the second area of the environment; or a third system that is associated with at least the first area of the environment and the second area of the environment.

AG: The system of paragraph AE or paragraph AF, wherein the one or more processing units are further to: receive a second indication to refrain from updating the portion of the first map while the second system is updating the portion of the first map, wherein the update to the portion of the first map is caused after the second system is finished updating the portion of the first map.

AH: The system of any one of paragraphs AE-AG, wherein the one or more processing units are further to: determine that the portion of the second map corresponds to a part of the second area that at least partially borders the first area; and determine to update the portion of the first map based at least on the portion of the second map corresponding to the part of the second area that at least partially borders the first area.

AI: The system of any one of paragraphs AE-AH, wherein the one or more processing units are further to: receive one or more second instances of data generated using one or more second machines navigating within the first area; determine, based at least on the one or more second instances of data, to perform a second update to at least one of the portion of the first map or a second portion of the first map; and cause, based at least on the one or more second instances of data, the second update to the at least one of the portion of the map or the second portion of the map.

AJ: The system of paragraph AI, wherein the determination to perform the second update comprises: determining one or more metrics associated with the one or more second instances of data; and determining that the one or more metrics satisfy one or more thresholds associated with updating the first map.

AK: The system of paragraph AI, wherein the one or more processing units are further to perform one or more of: sending, to the second system associated with the second area of the environment, a first indication that the at least one of portion of the first map or the second portion of the first map has been updated; or sending, to a third system associated with the environment, a second indication that the at least one of the portion of the first map or the second portion of the first map has been updated.

AL: The system of any one of paragraphs AE-AJ, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more conversational AI operations; a system implementing one or more large language models (LLMs); a system for performing one or more generative AI operations; a system for generating synthetic data; a system incorporating one or more virtual machines (VMs); a system implemented at least partially in a data center; or a system implemented at least partially using cloud computing resources.

AM: One or more processors comprising: one or more processing units to determine to update a portion of a map associated with a first area of an environment based at least on one or more instances of data generated using one or more machines navigating within the first area of the environment, wherein the one or more instances of data are obtained using a first system associated with the first area of the environment that is different than a second system associated with a second area of the environment.

AN: The one or more paragraphs of paragraph AM, wherein the one or more paragraphs are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more conversational AI operations; a system implementing one or more large language models (LLMs); a system for performing one or more generative AI operations; a system for generating synthetic data; a system incorporating one or more virtual machines (VMs); a system implemented at least partially in a data center; or a system implemented at least partially using cloud computing resources.

AO: A method comprising: determining to update a portion of a map corresponding to an area of an environment; causing the portion of the map to switch from being associated with a first state to being associated with a second state; causing, while the portion of the map is associated with the second state, an update to the portion of the map to occur; and based at least on the update to the portion of the map being complete, causing the portion of the map to switch from being associated with the second state to being associated with the first state.

AP: The method of paragraph AO, wherein: the first state is associated with unlocking the portion of the map such that the portion of the map may not be updated; and the second state is associated with locking the portion of the map such that the portion of the map may be updated.

AQ: The method of paragraph AO or paragraph AP, further comprising: while causing the portion of the map to switch from being associated with the first state to being associated with the second state, causing data associated with the portion of the map to also switch from being associated with the first state to being associated with the second state; causing, while the data is associated with the second state, an update to the data to indicate that the portion of the map is compatible with one or more additional portions of the map; and based at least on the update to the data being complete, causing the data to switch from being associated with the second state to being associated with the first state.

AR: The method of any one of paragraphs AO-AQ, further comprising: after causing the portion of the map to switch from being associated with the second state to being associated with the first state, causing data associated with the portion of the map to switch from being associated with the first state to being associated with the second state; causing, while the data is associated with the second state, an update to the data to indicate that the portion of the map is compatible with one or more additional portions of the map; and based at least on the update to the data being complete, causing the data to switch from being associated with the second state to being associated with the first state.

AS: The method of any one of paragraphs AO-AR, further comprising: determining, based at least on the portion of the map, a second portion of the map corresponding to a second area of the environment; causing the second portion of the map to switch from being associated with the first state to being associated with the second state; causing, while the second portion of the map is associated with the second state, an update to the second portion of the map to occur; and based at least on the update to the second portion of the map being complete, causing the second portion of the map to switch from being associated with the second state to being associated with the first state.

AT: The method of any one of paragraphs AO-AS, further comprising: determining that the second portion of the map includes at least one border with the portion of the map, wherein the determining the second portion of the map is based at least on the second portion of the map including the at least one border with the portion of the map.

AU: The method of any one of paragraphs AO-AT, further comprising: determining, based at least on the portion of the map, a second portion of the map corresponding to a second area of the environment; causing data associated with the second portion of the map to switch from being associated with the first state to being associated with the second state; causing, while the data is associated with the second state, an update to data to indicate that the second portion of the map is compatible with the portion of the map as updated; and based at least on the update to the data being complete, causing the data to switch from being associated with the second state to being associated with the first state.

AV: The method of paragraph AU, further comprising: after the portion of the map switches from being associated with the second state to being associated with the first state, causing the second portion of the map to switch from being associated with the first state to being associated with the second state; causing, while the second portion of the map is associated with the second state, an update to the second portion of the map to occur; and based at least on the update to the second portion of the map being complete, causing the second portion of the map to switch from being associated with the second state to being associated with the first state.

AW: The method of any one of paragraphs AO-AV, further comprising: determining to update a second portion of map corresponding to a second area of the environment; causing the second portion of the map to switch from being associated with the first state to being associated with the second state; causing, while the second portion of the map is associated with the second state and the portion of the map is being updated, an update to the second portion of the map to occur; and based at least on the update to the second portion of the map being complete, causing the second portion of the map to switch from being associated with the second state to being associated with the first state.

AX: The method of paragraph AW, further comprising: determining that a first part of the portion of the map is proximate to a second part of the second portion of the map; causing the first part of the portion of the map to not update based at least on the first part being proximate to the second part; and causing the second part of the second portion of the map to not update based at least on the second part being proximate to the first part.

AY: A system comprising: one or more processing units to: determine to update a first portion of a map corresponding to a first area of an environment; cause, during a first time interval, an update to the first portion of the map; and cause, during a second time interval, an update to data to indicate that the first portion of the map as updated is still compatible with a second portion of a map corresponding to a second area of the environment.

AZ: The system of paragraph AY, wherein the one or more processing units are further to: before the update to the first portion of the map, cause the first portion of the map and the data to switch from being associated with a first state to being associated with a second state; and after the update to the data is complete, cause the first portion of the map and the data to switch from being associated with the second state to being associated with the first state.

BA: The system of paragraph AY or paragraph AZ, wherein the one or more processing units are further to: before the update to the first portion of the map, cause the first portion of the map to switch from being associated with a first state to being associated with a second state; after the update to the first portion of the map is complete, cause the first portion of the map to switch from being associated with the second state to being associated with the first state; after the first portion of the map is switched to the second state, cause the data to switch from being associated with the first state to being associated with the second state; and after the update to the data is complete, cause the data to switch from being associated with the second state to being associated with the first state.

BB: The system of any one of paragraphs AY-BA, wherein the one or more processing units are further to: determine, based at least on the first portion of the map, that the second portion of the map is related to the first portion of the map; and cause, during at least one of the first time interval or a third time interval, an update to the second portion of the map such that the second portion of the map as updated is compatible with the first portion of the map as updated.

BC: The system of any one of paragraphs AY-BB, wherein the one or more processing units are further to refrain from updating the second portion of the map during at least one of the first time interval or the second time interval.

BD: The system of any one of paragraphs AY-BC, wherein the data is associated with the first portion of the map, and wherein the one or more processing units are further to cause, during at least one of the second time interval or a third time interval, an update to second data to indicate that the second portion of the map is still compatible with the first portion of the map as updated, the second data being associated with the second portion of the map.

BE: The system of any one of paragraphs AY-BC, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more conversational AI operations; a system implementing one or more large language models (LLMs); a system for performing one or more generative AI operations; a system for generating synthetic data; a system incorporating one or more virtual machines (VMs); a system implemented at least partially in a data center; or a system implemented at least partially using cloud computing resources.

BF: One or more processors comprising: one or more processing units to cause a portion of a map corresponding to an area of an environment to be locked while updating the portion of the map using one or more instances of data generated using one or more machines navigating within the area of the environment.

BG: The one or more processors of paragraph BF, wherein the one or more processing units are further to cause the portion of the map to be unlocked after the updating the portion of the map is complete.

BH: The one or more processors of paragraph BF or paragraph BG, wherein the one or more processors is comprised in at least one of: AL: The system of any one of paragraphs AE-AJ, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more conversational AI operations; a system implementing one or more large language models (LLMs); a system for performing one or more generative AI operations; a system for generating synthetic data; a system incorporating one or more virtual machines (VMs); a system implemented at least partially in a data center; or a system implemented at least partially using cloud computing resources.

What is claimed is:

1. A system comprising:

one or more processors to cause a machine to navigate between locations within an environment using at least a first portion of a map associated with a first portion of the environment, wherein the map is updated, at least, by:

storing first mapstreams representing the first portion of the environment that is associated with the first portion of the map and second mapstreams representing a second portion of the environment that is associated with a second portion of the map;

determining, based at least on associating the first mapstreams with the first portion of the map, at least a first total number of mapstreams that are associated with the first portion of the map;

determining, based at least on associating the second mapstreams with the second portion of the map, at least a second total number of mapstreams that are associated with the second portion of the map;

determining, based at least on the first total number of mapstreams being equal to or greater than a threshold number of mapstreams and the second total number of mapstreams being less the threshold number of mapstreams, to update the first portion of the map while refraining from updating the second portion of the map; and causing the first portion of the map to be updated using at least a portion of the first mapstreams.

2. The system of claim 1, wherein the map is further updated by:

determining, based at least on associating one or more third mapstreams with the second portion of the map, a third number of mapstreams by increasing the second total number of mapstreams; and determining, based at least on the third number of mapstreams being equal to or greater than the threshold number of mapstreams, to update the second portion of the map.

3. The system of claim 1, wherein the map is further updated by:

updating a first value associated with the first total number of mapstreams to a second value based at least on associating at least a portion of the first mapstreams with the first portion of the map; and determining that the first total number of mapstreams is equal to or greater than the threshold number of mapstreams based at least on the second value being equal to or greater than a third value associated with the threshold number of mapstreams.

4. The system of claim 1, wherein the map is further updated by:

obtaining first location data associated with one or more second machines that obtained the first mapstreams and second location data associated with one or more third machines that obtained the second mapstreams;

determining, based at least on the first location data, that the first mapstreams are associated with the first portion of the map; and determining, based at least on the second location data, that the second mapstreams are associated with the second portion of the map.

5. The system of claim 1, wherein a mapstream from the first mapstreams comprises one or more of:

sensor data representing the first portion of the environment that corresponds to the first portion of the map; or processed data representing one or more locations of one or more objects located within the first portion of the environment.

6. The system of claim 1, wherein the map is further updated by:

determining that a threshold period of time has elapsed since a previous update associated with the second portion of the map; and determining, based at least on the threshold period of time elapsing, to update the second portion of the map.

7. The system of claim 1, wherein the map is further updated by:

associating a plurality of mapstreams with the first portion of the map;

filtering the plurality of mapstreams using one or more criteria; and identifying, based at least on the plurality of mapstreams being filtered, the first mapstreams from the plurality of mapstreams.

8. The system of claim 1, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more conversational AI operations;

a system implementing one or more large language models (LLMs);

a system for performing one or more generative AI operations;

a system for generating synthetic data;

a system incorporating one or more virtual machines (VMs);

a system implemented at least partially in a data center; or a system implemented at least partially using cloud computing resources.

9. One or more processors comprising processing circuitry to cause a machine to navigate using a first portion of a map associated with a first portion of an environment, wherein the map is updated, at least, by:

storing one or more first mapstreams representing the first portion of the environment that is associated with the first portion of the map and one or more second mapstreams representing a second portion of the environment that is associated with a second portion of the map;

determining, based at least on associating the one or more first mapstreams with the first portion of the map, at least first total number of mapstreams that are associated with the first portion of the map;

determining, based at least on associating the one or more second mapstreams with the second portion of the map, at least a second total number of mapstreams that are associated with the second portion of the map;

determining, based at least on the first total number of mapstreams being equal to or greater than a threshold number of mapstreams and the second total number of mapstreams being less the threshold number of mapstreams, to update the first portion of the map while refraining from updating the second portion of the map; and causing the first portion of the map to be updated using at least the one or more first mapstreams.

10. The one or more processors of claim 9, wherein the one or more processors is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more conversational AI operations;

a system implementing one or more large language models (LLMs);

a system for performing one or more generative AI operations;

a system for generating synthetic data;

a system incorporating one or more virtual machines (VMs);

a system implemented at least partially in a data center; or a system implemented at least partially using cloud computing resources.

11. The system of claim 1, wherein the one or more processors are further to receive, from one or more computing devices, data representing at least the first portion of the map as updated for navigating within at least the first portion of the environment.

12. A method comprising:

causing a machine to navigate within an environment based at least on a first portion of a map representing a first portion of the environment, wherein the map is updated, at least, by:

storing one or more first mapstreams representing the first portion of the environment that is associated with the first portion of the map and one or more second mapstreams representing a second portion of the environment that is associated with a second portion of the map;

determining, based at least on associating the one or more first mapstreams with the first portion of the map, at least a first number of mapstreams associated with the first portion of the map;

determining, based at least on associating the one or more second mapstreams with the second portion of the map, at least a second number of mapstreams associated with the second portion of the map;

determining, based at least on the first number of mapstreams being equal to or greater than a threshold number of mapstreams and the second number of mapstreams being less the threshold number of mapstreams, to update the first portion of the map while refraining from updating the second portion of the map; and causing the first portion of the map to be updated using at least the one or more first mapstreams.

13. The method of claim 12, wherein map is further updated by:

determining, based at least on associating one or more third mapstreams with the second portion of the map, a third number of mapstreams by increasing the second number of mapstreams; and determining, based at least on the third number of mapstreams being equal to or greater than the threshold number of mapstreams, to update the second portion of the map.

14. The method of claim 12, wherein the map is further updated by:

updating a first value associated with the first number of mapstreams to a second value based at least on the associating the one or more first mapstreams with the first portion of the map; and determining that the first number of mapstreams is equal to or greater than the threshold number of mapstreams based at least on the second value being equal to or greater than a third value associated with the threshold number of mapstreams.

15. The method of claim 12, wherein the map is further updated by:

obtaining first location data associated with one or more second machines that obtained the one or more first mapstreams and second location data associated with one or more third machines that obtained the one or more second mapstreams;

determining, based at least on the first location data, that the one or more first mapstreams are associated with the first portion of the map; and determining, based at least on the second location data, that the one or more second mapstreams are associated with the second portion of the map.

16. The method of claim 12, wherein a mapstream from the one or more first mapstreams comprises one or more of:

sensor data representing the first portion of the environment that corresponds to the first portion of the map; or processed data representing one or more locations of one or more objects located within the first portion of the environment.

17. The method of claim 12, wherein the map is further updated by:

determining that a threshold period of time has elapsed since a previous update associated with the second portion of the map; and determining, based at least on the threshold period of time having elapsed, to update the second portion of the map.

18. The method of claim 12, wherein the map is further updated by:

associating a plurality of mapstreams with the first portion of the map;

filtering the plurality of mapstreams using one or more criteria; and identifying, based at least on the filtering the plurality of mapstreams, the one or more first mapstreams from the plurality of mapstreams.

19. The method of claim 12, wherein the method is executed in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more conversational AI operations;

a system implementing one or more large language models (LLMs);

a system for performing one or more generative AI operations;

a system for generating synthetic data;

a system incorporating one or more virtual machines (VMs);

a system implemented at least partially in a data center; or a system implemented at least partially using cloud computing resources.

20. The method of claim 12, wherein the map is further updated by determining at least the first portion of the map and the second portion of the map by at least dividing the map.

* * * * *